(12) United States Patent
Jhang et al.

(10) Patent No.: US 10,705,319 B2
(45) Date of Patent: Jul. 7, 2020

(54) OPTICAL IMAGING LENS

(71) Applicant: Genius Electronic Optical (Xiamen) Co., Ltd., Xiamen, Fujian (CN)

(72) Inventors: Jia-Sin Jhang, Taichung (TW); Maozong Lin, Fujian (CN); Huifeng Pan, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 0 days.

(21) Appl. No.: 15/918,239

(22) Filed: Mar. 12, 2018

(65) Prior Publication Data

US 2019/0204560 A1   Jul. 4, 2019

(30) Foreign Application Priority Data

Dec. 29, 2017 (CN) .......................... 2017 1 1481864

(51) Int. Cl.
*G02B 13/04* (2006.01)
*G02B 9/00* (2006.01)
*G02B 13/00* (2006.01)
*G02B 1/04* (2006.01)
*G02B 9/64* (2006.01)

(52) U.S. Cl.
CPC ......... *G02B 13/0045* (2013.01); *G02B 1/041* (2013.01); *G02B 9/64* (2013.01)

(58) Field of Classification Search
CPC ....... G02B 13/0045; G02B 1/041; G02B 9/64
USPC ....................................... 359/708, 750, 754
See application file for complete search history.

(56) References Cited

U.S. PATENT DOCUMENTS

2019/0056568 A1* 2/2019 Huang ............... G02B 13/0045

* cited by examiner

*Primary Examiner* — William Choi
(74) *Attorney, Agent, or Firm* — Huffman Law Group, PC

(57) ABSTRACT

An optical imaging lens may include eight lens elements positioned in an order from an object side to an image side. Through designing concave and/or convex surfaces of the eight lens elements, the optical imaging lens may provide improved imaging quality and optical characteristics while the total length of the optical imaging lens may be shortened.

20 Claims, 46 Drawing Sheets

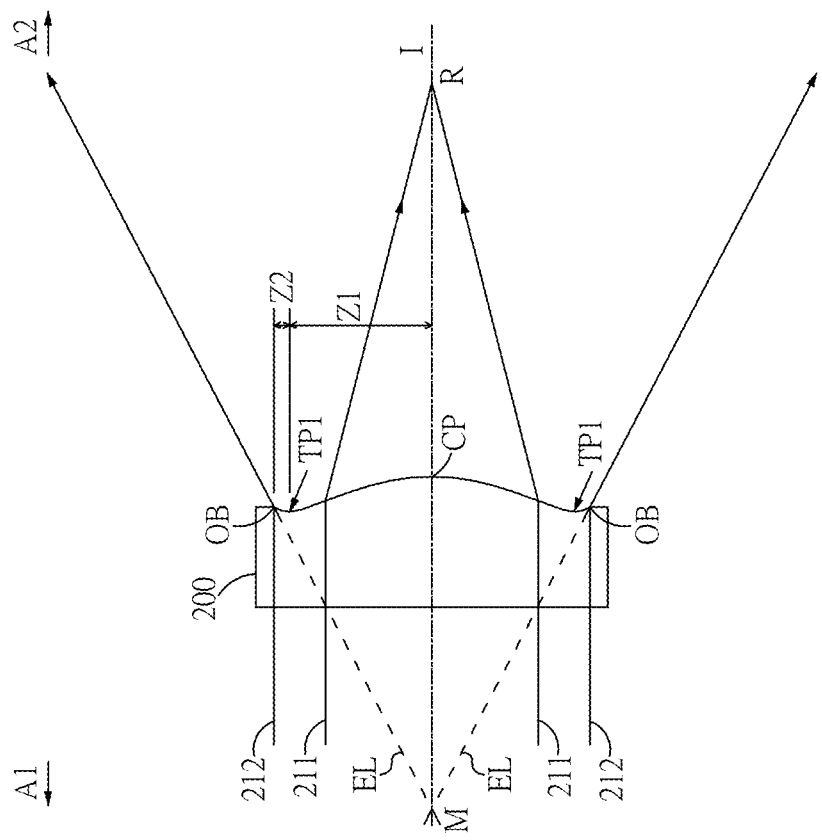
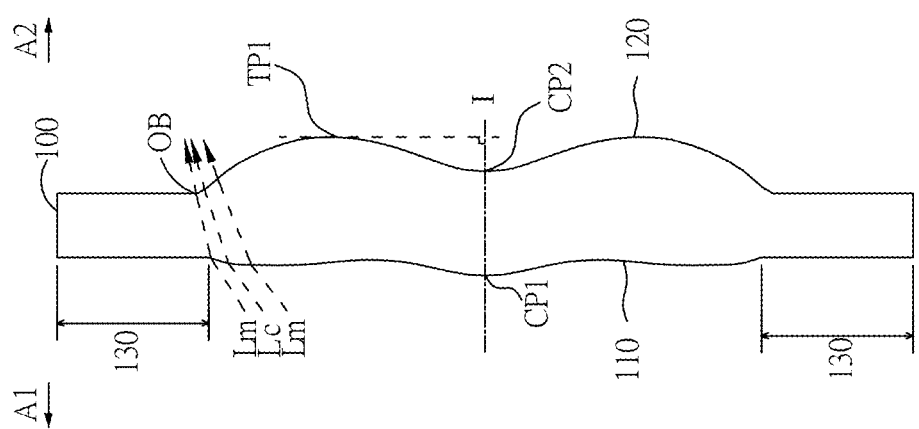
FIG. 1
FIG. 2

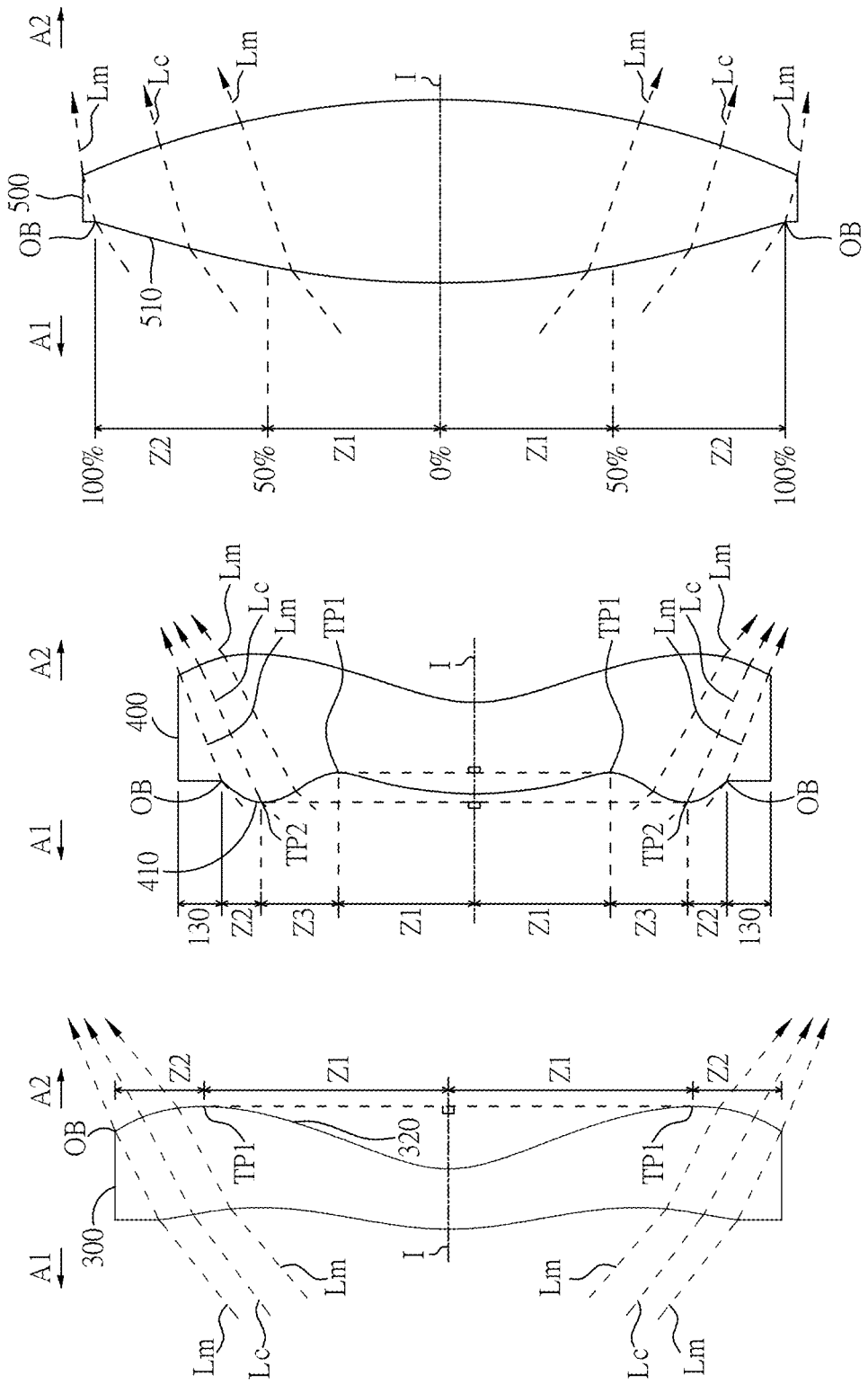

| Effective focal length (EFL) = 4.319 mm, HFOV (Half field of view) = 37.043dge., TTL = 5.308 mm, Image height= 3.238 mm, Fno = 1.600 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 1'00 | Aperture stop | INFINITY | -0.459 | | | | |
| 1'11 | 1st lens element | 1.969 | 0.695 | 1.545 | 55.987 | 4.839 | Plastic |
| 1'12 | | 6.759 | 0.071 | | | | |
| 1'21 | 2nd lens element | 3.830 | 0.214 | 1.661 | 20.412 | -10.369 | Plastic |
| 1'22 | | 2.410 | 0.295 | | | | |
| 1'31 | 3rd lens element | 3.504 | 0.364 | 1.545 | 55.987 | 11.914 | Plastic |
| 1'32 | | 7.314 | 0.518 | | | | |
| 1'41 | 4th lens element | 7.328 | 0.237 | 1.661 | 20.412 | -46.976 | Plastic |
| 1'42 | | 5.862 | 0.141 | | | | |
| 1'51 | 5th lens element | -3.279 | 0.408 | 1.545 | 55.987 | 6.792 | Plastic |
| 1'52 | | -1.817 | 0.118 | | | | |
| 1'61 | 6th lens element | 10.877 | 0.288 | 1.661 | 20.412 | -37.591 | Plastic |
| 1'62 | | 7.506 | 0.080 | | | | |
| 1'71 | 7th lens element | 2.788 | 0.272 | 1.545 | 55.987 | 9.241 | Plastic |
| 1'72 | | 6.013 | 0.477 | | | | |
| 1'81 | 8th lens element | -2.714 | 0.241 | 1.545 | 55.987 | -3.328 | Plastic |
| 1'82 | | 5.681 | 0.450 | | | | |
| 1'91 | IR cut filter | INFINITY | 0.210 | 1.517 | 64.167 | | |
| 1'92 | | INFINITY | 0.230 | | | | |
| 1'93 | Image plane | INFINITY | | | | | |

FIG. 8

| Aspherical parameters | | | | | |
|---|---|---|---|---|---|
| Surface # | K | $a_2$ | $a_4$ | $a_6$ | $a_8$ |
| 1'11 | 0.000000E+00 | 0.000000E+00 | 3.506172E-03 | -5.711026E-04 | 8.681394E-04 |
| 1'12 | 0.000000E+00 | 0.000000E+00 | -8.372400E-03 | -1.904890E-02 | 8.204764E-03 |
| 1'21 | 0.000000E+00 | 0.000000E+00 | -7.735860E-02 | -1.057833E-03 | 6.277162E-03 |
| 1'22 | 0.000000E+00 | 0.000000E+00 | -8.607963E-02 | 1.574029E-02 | -3.614019E-03 |
| 1'31 | 0.000000E+00 | 0.000000E+00 | -5.254632E-02 | -2.204478E-03 | -2.132980E-02 |
| 1'32 | 0.000000E+00 | 0.000000E+00 | -4.479986E-02 | -7.690000E-03 | -1.372569E-02 |
| 1'41 | 0.000000E+00 | 0.000000E+00 | -1.464792E-01 | 5.638224E-03 | -9.136991E-03 |
| 1'42 | 0.000000E+00 | 0.000000E+00 | -1.104280E-01 | -1.516597E-02 | -2.402142E-03 |
| 1'51 | 0.000000E+00 | 0.000000E+00 | 4.135707E-02 | -4.479218E-02 | 1.488945E-02 |
| 1'52 | 0.000000E+00 | 0.000000E+00 | 2.190923E-02 | -4.766929E-03 | 1.461655E-02 |
| 1'61 | 0.000000E+00 | 0.000000E+00 | 2.502435E-02 | -3.763616E-02 | -3.499609E-04 |
| 1'62 | 0.000000E+00 | 0.000000E+00 | -1.525000E-02 | -1.673297E-02 | 1.977097E-03 |
| 1'71 | 0.000000E+00 | 0.000000E+00 | -1.453345E-01 | 1.615797E-02 | 1.571121E-03 |
| 1'72 | 0.000000E+00 | 0.000000E+00 | -4.720099E-02 | -4.923168E-03 | 2.254922E-03 |
| 1'81 | 0.000000E+00 | 0.000000E+00 | 9.572534E-03 | 5.138266E-03 | -1.852699E-04 |
| 1'82 | 0.000000E+00 | 0.000000E+00 | -5.215584E-02 | 1.032806E-02 | -9.118604E-04 |
| Surface # | $a_{10}$ | $a_{12}$ | $a_{14}$ | $a_{16}$ | |
| 1'11 | -6.187315E-04 | 1.095716E-04 | 2.893479E-04 | -1.678783E-04 | |
| 1'12 | -1.301184E-04 | -6.942181E-04 | 4.813306E-04 | -1.608165E-04 | |
| 1'21 | 4.396927E-03 | -7.355531E-04 | -6.351380E-04 | 1.409336E-04 | |
| 1'22 | 5.203380E-03 | 3.177849E-03 | -3.536040E-03 | 1.031074E-03 | |
| 1'31 | -5.175382E-03 | 1.143815E-03 | 7.997390E-03 | -3.641855E-03 | |
| 1'32 | -5.844173E-03 | 2.778212E-03 | 3.819313E-03 | -1.916971E-03 | |
| 1'41 | -7.493611E-04 | 6.419407E-03 | -2.146566E-03 | 1.333675E-04 | |
| 1'42 | 5.051735E-03 | 1.103796E-02 | -1.169857E-02 | 3.045647E-03 | |
| 1'51 | 1.472434E-02 | -1.353337E-02 | 2.002543E-03 | 2.791121E-04 | |
| 1'52 | -2.342416E-03 | -7.948470E-04 | 2.487838E-04 | 1.900047E-05 | |
| 1'61 | 2.634534E-03 | -7.090199E-04 | 1.418667E-04 | -8.807033E-06 | |
| 1'62 | 3.274756E-04 | -2.489638E-05 | -6.000854E-06 | 6.383798E-07 | |
| 1'71 | -1.635594E-04 | -2.966186E-05 | 1.387364E-06 | 1.622174E-07 | |
| 1'72 | 1.258245E-04 | -3.387171E-05 | -7.944685E-06 | 1.101304E-06 | |
| 1'81 | -2.927460E-05 | -4.955396E-07 | -2.780099E-08 | 6.263331E-08 | |
| 1'82 | -2.385751E-05 | 4.975194E-06 | 7.629964E-07 | -8.547561E-08 | |

FIG. 9

| Effective focal length (EFL) = 4.287 mm, HFOV (Half field of view) = 37.045dge., TTL = 5.519 mm, Image height= 3.238 mm, Fno = 1.600 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 2'00 | Aperture stop | INFINITY | -0.446 | | | | |
| 2'11 | 1st lens element | 2.135 | 0.687 | 1.545 | 55.987 | 5.096 | Plastic |
| 2'12 | | 8.110 | 0.065 | | | | |
| 2'21 | 2nd lens element | 3.899 | 0.220 | 1.661 | 20.412 | -8.980 | Plastic |
| 2'22 | | 2.309 | 0.286 | | | | |
| 2'31 | 3rd lens element | 3.317 | 0.446 | 1.545 | 55.987 | 10.223 | Plastic |
| 2'32 | | 7.784 | 0.498 | | | | |
| 2'41 | 4th lens element | 10.551 | 0.253 | 1.661 | 20.412 | -26.115 | Plastic |
| 2'42 | | 6.508 | 0.119 | | | | |
| 2'51 | 5th lens element | -3.557 | 0.502 | 1.545 | 55.987 | 5.819 | Plastic |
| 2'52 | | -1.762 | 0.092 | | | | |
| 2'61 | 6th lens element | 5.494 | 0.278 | 1.661 | 20.412 | -60.917 | Plastic |
| 2'62 | | 4.742 | 0.120 | | | | |
| 2'71 | 7th lens element | 2.648 | 0.268 | 1.545 | 55.987 | 9.352 | Plastic |
| 2'72 | | 5.302 | 0.549 | | | | |
| 2'81 | 8th lens element | -2.686 | 0.240 | 1.545 | 55.987 | -3.309 | Plastic |
| 2'82 | | 5.705 | 0.450 | | | | |
| 2'91 | IR cut filter | INFINITY | 0.210 | 1.517 | 64.167 | | |
| 2'92 | | INFINITY | 0.237 | | | | |
| 2'93 | Image plane | INFINITY | | | | | |

FIG. 12

| Aspherical parameters | | | | |
|---|---|---|---|---|
| Surface # | K | $a_2$ | $a_4$ | $a_6$ | $a_8$ |
| 2'11 | 0.000000E+00 | 0.000000E+00 | 2.903094E-03 | -9.061518E-04 | 7.112809E-04 |
| 2'12 | 0.000000E+00 | 0.000000E+00 | -7.642919E-03 | -1.966342E-02 | 8.452556E-03 |
| 2'21 | 0.000000E+00 | 0.000000E+00 | -7.545321E-02 | -1.573898E-03 | 5.955694E-03 |
| 2'22 | 0.000000E+00 | 0.000000E+00 | -9.175452E-02 | 1.443971E-02 | -3.791288E-03 |
| 2'31 | 0.000000E+00 | 0.000000E+00 | -5.214485E-02 | -3.217355E-03 | -2.220044E-02 |
| 2'32 | 0.000000E+00 | 0.000000E+00 | -4.410726E-02 | -9.881641E-03 | -1.432788E-02 |
| 2'41 | 0.000000E+00 | 0.000000E+00 | -1.539301E-01 | 4.076902E-03 | -1.044114E-02 |
| 2'42 | 0.000000E+00 | 0.000000E+00 | -1.111780E-01 | -1.605258E-02 | -2.126789E-03 |
| 2'51 | 0.000000E+00 | 0.000000E+00 | 3.927271E-02 | -4.516638E-02 | 1.434240E-02 |
| 2'52 | 0.000000E+00 | 0.000000E+00 | 1.963430E-02 | -6.198555E-03 | 1.492611E-02 |
| 2'61 | 0.000000E+00 | 0.000000E+00 | 2.618820E-02 | -3.605782E-02 | -2.694705E-04 |
| 2'62 | 0.000000E+00 | 0.000000E+00 | -1.785519E-02 | -1.751327E-02 | 2.041686E-03 |
| 2'71 | 0.000000E+00 | 0.000000E+00 | -1.447797E-01 | 1.632137E-02 | 1.585358E-03 |
| 2'72 | 0.000000E+00 | 0.000000E+00 | -4.636372E-02 | -5.012063E-03 | 2.252882E-03 |
| 2'81 | 0.000000E+00 | 0.000000E+00 | 1.112639E-02 | 5.188613E-03 | -2.156397E-04 |
| 2'82 | 0.000000E+00 | 0.000000E+00 | -5.013834E-02 | 1.094450E-02 | -9.685638E-04 |
| Surface # | $a_{10}$ | $a_{12}$ | $a_{14}$ | $a_{16}$ | |
| 2'11 | -7.422617E-04 | 4.143189E-05 | 2.826014E-04 | -1.913147E-04 | |
| 2'12 | -6.248010E-04 | -7.303823E-04 | 4.445716E-04 | -1.344073E-04 | |
| 2'21 | 4.235147E-03 | -5.497278E-04 | -5.222826E-04 | 1.464917E-04 | |
| 2'22 | 3.526335E-03 | 4.521385E-03 | -3.616309E-03 | 1.196858E-03 | |
| 2'31 | -5.152847E-03 | 1.705318E-03 | 7.608167E-03 | -3.533706E-03 | |
| 2'32 | -5.832747E-03 | 2.755637E-03 | 3.781535E-03 | -1.738853E-03 | |
| 2'41 | -5.758873E-04 | 7.042805E-03 | -1.675522E-03 | 2.751205E-04 | |
| 2'42 | 5.182786E-03 | 1.105473E-02 | -1.171917E-02 | 3.011293E-03 | |
| 2'51 | 1.477978E-02 | -1.349146E-02 | 1.961736E-03 | 2.763407E-04 | |
| 2'52 | -2.357033E-03 | -7.726539E-04 | 2.718579E-04 | 2.460010E-05 | |
| 2'61 | 2.557427E-03 | -7.252282E-04 | 1.399798E-04 | -9.290559E-06 | |
| 2'62 | 3.431225E-04 | -2.493252E-05 | -5.684369E-06 | 8.981447E-07 | |
| 2'71 | -1.626148E-04 | -2.774304E-05 | 6.074461E-07 | 1.990250E-07 | |
| 2'72 | 1.267185E-04 | -3.073533E-05 | -8.567992E-06 | 1.192512E-06 | |
| 2'81 | -2.662311E-05 | -3.954580E-07 | -2.992355E-08 | 6.385764E-08 | |
| 2'82 | -2.689006E-05 | 5.055492E-06 | 7.988355E-07 | -8.576824E-08 | |

FIG. 13

| Effective focal length (EFL) = 4.312 mm, HFOV (Half field of view) = 36.945dge., TTL = 5.643 mm, Image height= 3.238 mm, Fno = 1.600 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 3'00 | Aperture stop | INFINITY | -0.494 | | | | |
| 3'11 | 1st lens element | 2.043 | 0.711 | 1.545 | 55.987 | 4.849 | Plastic |
| 3'12 | | 7.839 | 0.099 | | | | |
| 3'21 | 2nd lens element | 3.557 | 0.252 | 1.661 | 20.412 | -7.909 | Plastic |
| 3'22 | | 2.064 | 0.204 | | | | |
| 3'31 | 3rd lens element | 3.000 | 0.471 | 1.545 | 55.987 | 8.464 | Plastic |
| 3'32 | | 8.071 | 0.395 | | | | |
| 3'41 | 4th lens element | 92.126 | 0.329 | 1.661 | 20.412 | -26.625 | Plastic |
| 3'42 | | 14.871 | 0.104 | | | | |
| 3'51 | 5th lens element | -2.980 | 0.568 | 1.545 | 55.987 | 6.473 | Plastic |
| 3'52 | | -1.726 | 0.030 | | | | |
| 3'61 | 6th lens element | 10.664 | 0.279 | 1.661 | 20.412 | -17.907 | Plastic |
| 3'62 | | 5.576 | 0.035 | | | | |
| 3'71 | 7th lens element | 2.553 | 0.678 | 1.545 | 55.987 | 9.059 | Plastic |
| 3'72 | | 4.778 | 0.377 | | | | |
| 3'81 | 8th lens element | -2.776 | 0.240 | 1.545 | 55.987 | -3.995 | Plastic |
| 3'82 | | 10.521 | 0.450 | | | | |
| 3'91 | IR cut filter | INFINITY | 0.210 | 1.517 | 64.167 | | |
| 3'92 | | INFINITY | 0.210 | | | | |
| 3'93 | Image plane | INFINITY | | | | | |

FIG. 16

| Aspherical parameters | | | | | |
|---|---|---|---|---|---|
| Surface # | K | $a_2$ | $a_4$ | $a_6$ | $a_8$ |
| 3'11 | 0.000000E+00 | 0.000000E+00 | 6.263030E-03 | -1.951395E-03 | 1.704058E-03 |
| 3'12 | 0.000000E+00 | 0.000000E+00 | 3.370019E-03 | -1.950041E-02 | 7.495388E-03 |
| 3'21 | 0.000000E+00 | 0.000000E+00 | -7.761722E-02 | 3.333067E-03 | 6.675713E-03 |
| 3'22 | 0.000000E+00 | 0.000000E+00 | -1.118008E-01 | 1.705064E-02 | -5.252165E-03 |
| 3'31 | 0.000000E+00 | 0.000000E+00 | -4.185139E-02 | -1.580795E-02 | -2.004264E-02 |
| 3'32 | 0.000000E+00 | 0.000000E+00 | -2.721881E-02 | -1.693082E-02 | -1.456912E-02 |
| 3'41 | 0.000000E+00 | 0.000000E+00 | -1.491647E-01 | 4.596041E-03 | -1.701525E-02 |
| 3'42 | 0.000000E+00 | 0.000000E+00 | -1.036089E-01 | -1.189448E-02 | -1.086158E-03 |
| 3'51 | 0.000000E+00 | 0.000000E+00 | 5.726432E-02 | -4.632686E-02 | 1.443263E-02 |
| 3'52 | 0.000000E+00 | 0.000000E+00 | 2.644743E-02 | -2.885180E-03 | 1.149958E-02 |
| 3'61 | 0.000000E+00 | 0.000000E+00 | 3.270272E-02 | -4.025581E-02 | 5.579305E-04 |
| 3'62 | 0.000000E+00 | 0.000000E+00 | -1.578209E-02 | -1.724764E-02 | 1.547776E-03 |
| 3'71 | 0.000000E+00 | 0.000000E+00 | -1.398895E-01 | 1.551803E-02 | 1.537976E-03 |
| 3'72 | 0.000000E+00 | 0.000000E+00 | -5.012439E-02 | -4.284679E-03 | 2.252805E-03 |
| 3'81 | 0.000000E+00 | 0.000000E+00 | 8.340427E-03 | 5.247243E-03 | -1.258304E-04 |
| 3'82 | 0.000000E+00 | 0.000000E+00 | -3.542516E-02 | 1.026690E-02 | -1.161309E-03 |
| Surface # | $a_{10}$ | $a_{12}$ | $a_{14}$ | $a_{16}$ | |
| 3'11 | -7.842136E-04 | -1.342399E-04 | 2.529396E-04 | -1.505577E-04 | |
| 3'12 | -5.643610E-04 | -8.666197E-04 | 4.305983E-04 | -8.736888E-05 | |
| 3'21 | 3.589840E-03 | -8.535581E-04 | -5.029340E-04 | 2.270961E-04 | |
| 3'22 | 6.250485E-03 | 3.606495E-03 | -3.206624E-03 | 1.041078E-03 | |
| 3'31 | -2.569345E-03 | 2.721372E-03 | 7.830736E-03 | -4.154769E-03 | |
| 3'32 | -6.364217E-03 | 2.392347E-03 | 3.724542E-03 | -1.594983E-03 | |
| 3'41 | -2.459279E-03 | 7.773011E-03 | -1.164835E-03 | 3.330727E-04 | |
| 3'42 | 5.178850E-03 | 1.135280E-02 | -1.161201E-02 | 2.847955E-03 | |
| 3'51 | 1.530540E-02 | -1.368303E-02 | 1.844562E-03 | 3.306511E-04 | |
| 3'52 | -3.178251E-03 | -5.757678E-04 | 3.835951E-04 | 3.960751E-05 | |
| 3'61 | 2.346136E-03 | -8.502370E-04 | 1.271995E-04 | 4.262444E-06 | |
| 3'62 | 3.194166E-04 | -1.899018E-05 | -3.412339E-06 | 9.430057E-07 | |
| 3'71 | -1.616864E-04 | -2.894732E-05 | 1.292563E-06 | 7.131967E-08 | |
| 3'72 | 1.276474E-04 | -3.317575E-05 | -7.945098E-06 | 1.069141E-06 | |
| 3'81 | -2.756515E-05 | -1.514858E-06 | -1.922887E-07 | 7.373760E-08 | |
| 3'82 | -2.822842E-05 | 7.544233E-06 | 1.017323E-06 | -1.161223E-07 | |

FIG. 17

| Effective focal length (EFL) = 4.306 mm, HFOV (Half field of view) = 37.001dge., TTL = 5.614 mm, Image height= 3.238 mm, Fno = 1.600 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 4'00 | Aperture stop | INFINITY | -0.491 | | | | |
| 4'11 | 1st lens element | 2.051 | 0.687 | 1.545 | 55.987 | 5.565 | Plastic |
| 4'12 | | 5.559 | 0.127 | | | | |
| 4'21 | 2nd lens element | 4.004 | 0.220 | 1.661 | 20.412 | -9.726 | Plastic |
| 4'22 | | 2.422 | 0.145 | | | | |
| 4'31 | 3rd lens element | 2.923 | 0.466 | 1.545 | 55.987 | 7.573 | Plastic |
| 4'32 | | 9.397 | 0.483 | | | | |
| 4'41 | 4th lens element | 1071.756 | 0.404 | 1.661 | 20.412 | -22.864 | Plastic |
| 4'42 | | 15.038 | 0.095 | | | | |
| 4'51 | 5th lens element | -3.901 | 0.545 | 1.545 | 55.987 | 5.612 | Plastic |
| 4'52 | | -1.801 | 0.030 | | | | |
| 4'61 | 6th lens element | 9.271 | 0.396 | 1.661 | 20.412 | -18.546 | Plastic |
| 4'62 | | 5.209 | 0.067 | | | | |
| 4'71 | 7th lens element | 2.664 | 0.440 | 1.545 | 55.987 | 7.672 | Plastic |
| 4'72 | | 6.888 | 0.307 | | | | |
| 4'81 | 8th lens element | -2.774 | 0.277 | 1.545 | 55.987 | -3.188 | Plastic |
| 4'82 | | 4.841 | 0.450 | | | | |
| 4'91 | IR cut filter | INFINITY | 0.210 | 1.517 | 64.167 | | |
| 4'92 | | INFINITY | 0.263 | | | | |
| 4'93 | Image plane | INFINITY | | | | | |

FIG. 20

| Aspherical parameters | | | | | |
|---|---|---|---|---|---|
| Surface # | K | $a_2$ | $a_4$ | $a_6$ | $a_8$ |
| 4'11 | 0.000000E+00 | 0.000000E+00 | 2.077913E-03 | 1.402469E-03 | -2.347721E-03 |
| 4'12 | 0.000000E+00 | 0.000000E+00 | -1.410158E-02 | -1.722785E-02 | 1.041078E-02 |
| 4'21 | 0.000000E+00 | 0.000000E+00 | -8.696142E-02 | -7.984104E-04 | 1.025054E-02 |
| 4'22 | 0.000000E+00 | 0.000000E+00 | -1.065873E-01 | 9.310925E-03 | -3.518379E-03 |
| 4'31 | 0.000000E+00 | 0.000000E+00 | -4.949254E-02 | -1.711048E-02 | -1.655617E-02 |
| 4'32 | 0.000000E+00 | 0.000000E+00 | -3.329203E-02 | -1.173374E-02 | -1.362343E-02 |
| 4'41 | 0.000000E+00 | 0.000000E+00 | -1.220608E-01 | 1.734786E-02 | -3.039287E-02 |
| 4'42 | 0.000000E+00 | 0.000000E+00 | -8.519629E-02 | -1.848849E-02 | 1.595099E-03 |
| 4'51 | 0.000000E+00 | 0.000000E+00 | 2.976377E-02 | -4.685995E-02 | 1.914325E-02 |
| 4'52 | 0.000000E+00 | 0.000000E+00 | 1.827831E-02 | 1.875417E-03 | 9.384300E-03 |
| 4'61 | 0.000000E+00 | 0.000000E+00 | 1.118408E-02 | -3.616853E-02 | 1.091149E-03 |
| 4'62 | 0.000000E+00 | 0.000000E+00 | -2.162919E-02 | -1.549306E-02 | 1.901802E-03 |
| 4'71 | 0.000000E+00 | 0.000000E+00 | -1.329265E-01 | 1.275727E-02 | 1.446006E-03 |
| 4'72 | 0.000000E+00 | 0.000000E+00 | -4.721916E-02 | -5.041121E-03 | 2.023347E-03 |
| 4'81 | 0.000000E+00 | 0.000000E+00 | 6.002207E-03 | 5.494629E-03 | -1.003388E-04 |
| 4'82 | 0.000000E+00 | 0.000000E+00 | -5.316996E-02 | 1.164248E-02 | -1.097267E-03 |
| Surface # | $a_{10}$ | $a_{12}$ | $a_{14}$ | $a_{16}$ | |
| 4'11 | 1.304276E-03 | 3.080724E-04 | -4.251423E-04 | 5.159569E-05 | |
| 4'12 | -1.822836E-03 | -1.212395E-03 | 8.786196E-04 | -1.469224E-04 | |
| 4'21 | 5.219517E-03 | -1.904879E-03 | -1.464838E-03 | 7.313156E-04 | |
| 4'22 | 9.006434E-03 | 6.065662E-03 | -7.920104E-03 | 2.617738E-03 | |
| 4'31 | -3.181514E-03 | 2.598076E-03 | 8.492777E-03 | -4.605261E-03 | |
| 4'32 | -6.892406E-03 | 4.017020E-03 | 4.325162E-03 | -2.372688E-03 | |
| 4'41 | 7.285785E-03 | 3.824909E-03 | 7.676442E-04 | -5.145225E-04 | |
| 4'42 | 3.571228E-03 | 1.164644E-02 | -1.089873E-02 | 2.594388E-03 | |
| 4'51 | 1.605210E-02 | -1.381972E-02 | 1.668646E-03 | 3.623910E-04 | |
| 4'52 | -2.371858E-03 | -7.540790E-04 | 3.121727E-04 | 3.845451E-05 | |
| 4'61 | 1.448176E-03 | -8.198831E-04 | 2.152007E-04 | 2.161737E-07 | |
| 4'62 | 2.939728E-04 | -1.789318E-05 | -4.839777E-06 | 2.267089E-07 | |
| 4'71 | -1.370557E-04 | -2.150166E-05 | 1.589125E-06 | -1.480970E-08 | |
| 4'72 | 1.507909E-04 | -2.641207E-05 | -7.213030E-06 | 8.718860E-07 | |
| 4'81 | -4.735460E-05 | 3.413553E-07 | 1.050026E-07 | 4.176272E-08 | |
| 4'82 | -2.161917E-05 | 5.641765E-06 | 6.713281E-07 | -7.147459E-08 | |

FIG. 21

| Surface # | | Radius (mm) | Thickness / air gap (mm) | Refractive index | Abbe number | Focal length (mm) | Material |
|---|---|---|---|---|---|---|---|
| | Effective focal length (EFL) = 4.350 mm, HFOV (Half field of view) = 37.017dge., TTL = 5.963 mm, Image height= 3.238 mm, Fno = 1.600 | | | | | | |
| - | Object | INFINITY | INFINITY | | | | |
| 5'00 | Aperture stop | INFINITY | -0.384 | | | | |
| 5'11 | 1st lens element | 2.535 | 0.553 | 1.545 | 55.987 | 8.342 | Plastic |
| 5'12 | | 5.274 | 0.175 | | | | |
| 5'21 | 2nd lens element | 3.734 | 0.230 | 1.661 | 20.412 | -11.528 | Plastic |
| 5'22 | | 2.452 | 0.207 | | | | |
| 5'31 | 3rd lens element | 2.264 | 0.431 | 1.545 | 55.987 | 7.204 | Plastic |
| 5'32 | | 4.972 | 0.563 | | | | |
| 5'41 | 4th lens element | 1425.811 | 0.270 | 1.661 | 20.412 | -9.060 | Plastic |
| 5'42 | | 6.019 | 0.067 | | | | |
| 5'51 | 5th lens element | -10.224 | 0.653 | 1.545 | 55.987 | 5.863 | Plastic |
| 5'52 | | -2.494 | 0.030 | | | | |
| 5'61 | 6th lens element | 2.031 | 0.300 | 1.661 | 20.412 | 24.458 | Plastic |
| 5'62 | | 2.183 | 0.603 | | | | |
| 5'71 | 7th lens element | 2.212 | 0.312 | 1.545 | 55.987 | 6.636 | Plastic |
| 5'72 | | 5.393 | 0.260 | | | | |
| 5'81 | 8th lens element | -4.794 | 0.300 | 1.545 | 55.987 | -3.329 | Plastic |
| 5'82 | | 2.995 | 0.450 | | | | |
| 5'91 | IR cut filter | INFINITY | 0.210 | 1.517 | 64.167 | | |
| 5'92 | | INFINITY | 0.350 | | | | |
| 5'93 | Image plane | INFINITY | | | | | |

FIG. 24

| Aspherical parameters | | | | | |
|---|---|---|---|---|---|
| Surface # | K | $a_2$ | $a_4$ | $a_6$ | $a_8$ |
| 5'11 | 0.000000E+00 | 0.000000E+00 | 4.680555E-03 | -4.515189E-03 | 3.078127E-03 |
| 5'12 | 0.000000E+00 | 0.000000E+00 | -7.311708E-03 | -2.484696E-02 | 1.399832E-02 |
| 5'21 | 0.000000E+00 | 0.000000E+00 | -8.539773E-02 | -1.099558E-02 | 1.706755E-02 |
| 5'22 | 0.000000E+00 | 0.000000E+00 | -1.330822E-01 | 2.557012E-02 | -3.072096E-03 |
| 5'31 | 0.000000E+00 | 0.000000E+00 | -7.760102E-02 | -1.264213E-03 | -1.930618E-02 |
| 5'32 | 0.000000E+00 | 0.000000E+00 | -3.477809E-02 | -1.344981E-02 | -1.584173E-02 |
| 5'41 | 0.000000E+00 | 0.000000E+00 | -1.497967E-01 | 3.499172E-02 | -8.716536E-03 |
| 5'42 | 0.000000E+00 | 0.000000E+00 | -1.275298E-01 | 2.170517E-02 | -7.145699E-03 |
| 5'51 | 0.000000E+00 | 0.000000E+00 | 2.184323E-02 | -3.259798E-02 | -1.376612E-02 |
| 5'52 | 0.000000E+00 | 0.000000E+00 | -4.356849E-02 | 2.161731E-02 | 3.656372E-03 |
| 5'61 | 0.000000E+00 | 0.000000E+00 | -7.193592E-02 | 5.693380E-03 | -5.864014E-03 |
| 5'62 | 0.000000E+00 | 0.000000E+00 | -5.729365E-02 | -9.691009E-04 | -1.465279E-03 |
| 5'71 | 0.000000E+00 | 0.000000E+00 | -1.200593E-01 | 8.912633E-03 | -3.020157E-03 |
| 5'72 | 0.000000E+00 | 0.000000E+00 | -3.312460E-02 | -7.583542E-03 | 2.193709E-03 |
| 5'81 | 0.000000E+00 | 0.000000E+00 | 5.770619E-03 | -1.623054E-03 | 5.350798E-04 |
| 5'82 | 0.000000E+00 | 0.000000E+00 | -5.993915E-02 | 7.829994E-03 | -8.384245E-04 |
| Surface # | $a_{10}$ | $a_{12}$ | $a_{14}$ | $a_{16}$ | |
| 5'11 | -3.120257E-04 | -6.038984E-04 | 4.427977E-04 | -9.550757E-05 | |
| 5'12 | -1.574782E-03 | -1.127078E-03 | 3.429733E-04 | -8.753441E-06 | |
| 5'21 | -1.133507E-03 | -1.313753E-03 | -1.623357E-05 | 1.571358E-04 | |
| 5'22 | 2.510188E-03 | 3.513768E-03 | -3.853588E-03 | 1.107706E-03 | |
| 5'31 | 5.873474E-03 | -4.253195E-03 | 3.100723E-03 | -1.157961E-03 | |
| 5'32 | -1.328144E-05 | 1.428071E-03 | 8.935034E-04 | -4.662268E-04 | |
| 5'41 | -5.347383E-03 | 7.801611E-03 | -1.569930E-03 | -2.719058E-05 | |
| 5'42 | -7.158136E-03 | 1.756741E-02 | -9.368336E-03 | 1.614721E-03 | |
| 5'51 | 2.733954E-02 | -1.091291E-02 | 4.805178E-04 | 3.411395E-04 | |
| 5'52 | -5.314898E-03 | 7.604706E-04 | 3.084036E-04 | -5.836948E-05 | |
| 5'61 | 1.793705E-03 | -5.796844E-04 | 1.864490E-04 | -2.856861E-05 | |
| 5'62 | 2.057564E-04 | 4.716687E-05 | 4.109926E-06 | -3.596892E-06 | |
| 5'71 | 1.010171E-03 | -9.817155E-05 | -1.921588E-05 | 2.953386E-06 | |
| 5'72 | 4.954111E-05 | -2.332950E-05 | -1.099318E-05 | 1.629180E-06 | |
| 5'81 | 4.177759E-06 | -5.123554E-06 | -5.044028E-07 | 7.292177E-08 | |
| 5'82 | 1.884391E-05 | 3.266282E-06 | 3.722474E-07 | -6.320581E-08 | |

FIG. 25

| Surface # | | Radius (mm) | Thickness / air gap (mm) | Refractive index | Abbe number | Focal length (mm) | Material |
|---|---|---|---|---|---|---|---|
| | Effective focal length (EFL) = 4.265 mm, HFOV (Half field of view) = 36.994dge., TTL = 5.696 mm, Image height= 3.238 mm, Fno = 1.600 |
| - | Object | INFINITY | INFINITY | | | | |
| 600 | Aperture stop | INFINITY | -0.428 | | | | |
| 611 | 1st lens element | 2.192 | 0.619 | 1.545 | 55.987 | 5.343 | Plastic |
| 612 | | 7.930 | 0.131 | | | | |
| 621 | 2nd lens element | 4.039 | 0.233 | 1.661 | 20.412 | -9.750 | Plastic |
| 622 | | 2.434 | 0.116 | | | | |
| 631 | 3rd lens element | 3.287 | 0.624 | 1.545 | 55.987 | 9.083 | Plastic |
| 632 | | 9.083 | 0.351 | | | | |
| 641 | 4th lens element | 10.712 | 0.348 | 1.661 | 20.412 | -41.203 | Plastic |
| 642 | | 7.608 | 0.092 | | | | |
| 651 | 5th lens element | -4.167 | 0.727 | 1.545 | 55.987 | 5.305 | Plastic |
| 652 | | -1.815 | 0.030 | | | | |
| 661 | 6th lens element | 15.410 | 0.368 | 1.661 | 20.412 | -26.216 | Plastic |
| 662 | | 8.114 | 0.030 | | | | |
| 671 | 7th lens element | 2.628 | 0.354 | 1.545 | 55.987 | 7.501 | Plastic |
| 672 | | 6.977 | 0.305 | | | | |
| 681 | 8th lens element | -2.693 | 0.398 | 1.545 | 55.987 | -2.902 | Plastic |
| 682 | | 4.054 | 0.450 | | | | |
| 691 | IR cut filter | INFINITY | 0.210 | 1.517 | 64.167 | | |
| 692 | | INFINITY | 0.309 | | | | |
| 693 | Image plane | INFINITY | | | | | |

FIG. 28

| Aspherical parameters | | | | | |
|---|---|---|---|---|---|
| Surface # | K | $a_2$ | $a_4$ | $a_6$ | $a_8$ |
| 611 | 0.000000E+00 | 0.000000E+00 | 3.165640E-03 | -2.352141E-03 | 3.483456E-04 |
| 612 | 0.000000E+00 | 0.000000E+00 | -9.367110E-03 | -1.663048E-02 | 9.498265E-03 |
| 621 | 0.000000E+00 | 0.000000E+00 | -7.268553E-02 | 1.378670E-04 | 6.587533E-03 |
| 622 | 0.000000E+00 | 0.000000E+00 | -9.297487E-02 | 8.485250E-03 | -7.674975E-03 |
| 631 | 0.000000E+00 | 0.000000E+00 | -4.460302E-02 | 2.439499E-03 | -1.931299E-02 |
| 632 | 0.000000E+00 | 0.000000E+00 | -4.786205E-02 | -1.982330E-03 | -1.218587E-02 |
| 641 | 0.000000E+00 | 0.000000E+00 | -1.587185E-01 | -9.842603E-04 | -1.435614E-02 |
| 642 | 0.000000E+00 | 0.000000E+00 | -1.023424E-01 | -1.535881E-02 | -2.037725E-03 |
| 651 | 0.000000E+00 | 0.000000E+00 | 5.145771E-02 | -4.578227E-02 | 1.401990E-02 |
| 652 | 0.000000E+00 | 0.000000E+00 | 2.249682E-02 | -5.025674E-03 | 1.444034E-02 |
| 661 | 0.000000E+00 | 0.000000E+00 | 1.986941E-02 | -3.713759E-02 | -4.930084E-04 |
| 662 | 0.000000E+00 | 0.000000E+00 | -1.739525E-02 | -1.618508E-02 | 2.199216E-03 |
| 671 | 0.000000E+00 | 0.000000E+00 | -1.458602E-01 | 1.597252E-02 | 1.547313E-03 |
| 672 | 0.000000E+00 | 0.000000E+00 | -4.508199E-02 | -4.707997E-03 | 2.260913E-03 |
| 681 | 0.000000E+00 | 0.000000E+00 | 1.382074E-02 | 5.129333E-03 | -1.998769E-04 |
| 682 | 0.000000E+00 | 0.000000E+00 | -5.266349E-02 | 1.035082E-02 | -9.516837E-04 |
| Surface # | $a_{10}$ | $a_{12}$ | $a_{14}$ | $a_{16}$ | |
| 611 | -7.171969E-04 | 1.094540E-04 | 3.351072E-04 | -1.128583E-04 | |
| 612 | 1.203353E-04 | -8.447161E-04 | 2.965987E-04 | -1.113098E-04 | |
| 621 | 3.986196E-03 | -8.449655E-04 | -7.197487E-04 | 3.141348E-05 | |
| 622 | 4.431648E-03 | 3.678722E-03 | -2.609329E-03 | 1.294605E-03 | |
| 631 | -4.013634E-03 | 2.385238E-03 | 8.418282E-03 | -3.095496E-03 | |
| 632 | -6.637656E-03 | 1.980770E-03 | 3.428579E-03 | -1.381002E-03 | |
| 641 | -2.390418E-03 | 6.610128E-03 | -1.375845E-03 | 5.613175E-04 | |
| 642 | 5.103390E-03 | 1.087916E-02 | -1.180687E-02 | 3.035811E-03 | |
| 651 | 1.483208E-02 | -1.335622E-02 | 2.029240E-03 | 1.685665E-04 | |
| 652 | -2.444613E-03 | -8.258262E-04 | 2.655783E-04 | 3.258376E-05 | |
| 661 | 2.318329E-03 | -7.917632E-04 | 1.420744E-04 | 7.465953E-06 | |
| 662 | 3.547962E-04 | -2.535251E-05 | -7.067778E-06 | 2.923044E-07 | |
| 671 | -1.675380E-04 | -3.013834E-05 | 1.321796E-06 | 1.630725E-07 | |
| 672 | 1.258821E-04 | -3.415851E-05 | -8.026379E-06 | 1.085340E-06 | |
| 681 | -3.234805E-05 | -8.070820E-07 | -1.545385E-08 | 8.011944E-08 | |
| 682 | -2.580371E-05 | 4.989219E-06 | 7.928546E-07 | -7.782283E-08 | |

FIG. 29

| Surface # | | Radius (mm) | Thickness / air gap (mm) | Refractive index | Abbe number | Focal length (mm) | Material |
|---|---|---|---|---|---|---|---|
| | Effective focal length (EFL) = 4.199 mm, HFOV (Half field of view) = 36.948dge., TTL = 5.356 mm, Image height= 3.238 mm, Fno = 1.600 | | | | | | |
| - | Object | INFINITY | INFINITY | | | | |
| 700 | Aperture stop | INFINITY | -0.363 | | | | |
| 711 | 1st lens element | 2.323 | 0.486 | 1.545 | 55.987 | 5.528 | Plastic |
| 712 | | 9.321 | 0.158 | | | | |
| 721 | 2nd lens element | 3.292 | 0.216 | 1.661 | 20.412 | -9.566 | Plastic |
| 722 | | 2.115 | 0.283 | | | | |
| 731 | 3rd lens element | 3.549 | 0.556 | 1.545 | 55.987 | 8.062 | Plastic |
| 732 | | 17.260 | 0.410 | | | | |
| 741 | 4th lens element | 7.671 | 0.240 | 1.661 | 20.412 | -295.951 | Plastic |
| 742 | | 7.292 | 0.209 | | | | |
| 751 | 5th lens element | -2.934 | 0.236 | 1.545 | 55.987 | 10.587 | Plastic |
| 752 | | -2.002 | 0.188 | | | | |
| 761 | 6th lens element | 6.406 | 0.385 | 1.661 | 20.412 | -70.295 | Plastic |
| 762 | | 5.501 | 0.099 | | | | |
| 771 | 7th lens element | 2.466 | 0.347 | 1.545 | 55.987 | 6.500 | Plastic |
| 772 | | 7.673 | 0.341 | | | | |
| 781 | 8th lens element | -2.628 | 0.236 | 1.545 | 55.987 | -3.011 | Plastic |
| 782 | | 4.537 | 0.450 | | | | |
| 791 | IR cut filter | INFINITY | 0.210 | 1.517 | 64.167 | | |
| 792 | | INFINITY | 0.309 | | | | |
| 793 | Image plane | INFINITY | | | | | |

FIG. 32

| Aspherical parameters | | | | | |
|---|---|---|---|---|---|
| Surface # | K | $a_2$ | $a_4$ | $a_6$ | $a_8$ |
| 711 | 0.000000E+00 | 0.000000E+00 | -1.830616E-03 | -5.083383E-03 | -7.342989E-04 |
| 712 | 0.000000E+00 | 0.000000E+00 | -6.408028E-03 | -1.761388E-02 | 8.965365E-03 |
| 721 | 0.000000E+00 | 0.000000E+00 | -7.519265E-02 | 9.536364E-04 | 7.240313E-03 |
| 722 | 0.000000E+00 | 0.000000E+00 | -8.936528E-02 | 1.116929E-02 | -5.281379E-03 |
| 731 | 0.000000E+00 | 0.000000E+00 | -3.540932E-02 | 7.812804E-03 | -1.841560E-02 |
| 732 | 0.000000E+00 | 0.000000E+00 | -5.275548E-02 | -4.857638E-03 | -1.175460E-02 |
| 741 | 0.000000E+00 | 0.000000E+00 | -1.408881E-01 | 6.240105E-03 | -9.559697E-03 |
| 742 | 0.000000E+00 | 0.000000E+00 | -1.157766E-01 | -1.625938E-02 | -2.197928E-03 |
| 751 | 0.000000E+00 | 0.000000E+00 | 4.124818E-02 | -4.629060E-02 | 1.451775E-02 |
| 752 | 0.000000E+00 | 0.000000E+00 | 3.432871E-02 | -4.077277E-03 | 1.479236E-02 |
| 761 | 0.000000E+00 | 0.000000E+00 | 2.067904E-02 | -3.633336E-02 | -1.453366E-05 |
| 762 | 0.000000E+00 | 0.000000E+00 | -9.454537E-03 | -1.667491E-02 | 2.060804E-03 |
| 771 | 0.000000E+00 | 0.000000E+00 | -1.442026E-01 | 1.587192E-02 | 1.507197E-03 |
| 772 | 0.000000E+00 | 0.000000E+00 | -4.259277E-02 | -4.608240E-03 | 2.272864E-03 |
| 781 | 0.000000E+00 | 0.000000E+00 | 1.249885E-02 | 5.137275E-03 | -1.902809E-04 |
| 782 | 0.000000E+00 | 0.000000E+00 | -5.410427E-02 | 1.054384E-02 | -9.265208E-04 |
| Surface # | $a_{10}$ | $a_{12}$ | $a_{14}$ | $a_{16}$ | |
| 711 | -9.414068E-04 | 1.753472E-04 | 4.853630E-04 | 4.948576E-05 | |
| 712 | 3.988548E-04 | -3.212201E-04 | 5.990140E-04 | -1.546138E-04 | |
| 721 | 4.385996E-03 | -8.185324E-04 | -1.057062E-03 | -3.397178E-04 | |
| 722 | 4.888930E-03 | 3.079211E-03 | -3.383701E-03 | 5.194980E-04 | |
| 731 | -4.425559E-03 | 1.727794E-03 | 7.859482E-03 | -3.159775E-03 | |
| 732 | -5.148348E-03 | 2.950015E-03 | 3.912595E-03 | -1.692667E-03 | |
| 741 | -4.600511E-04 | 6.926838E-03 | -1.850757E-03 | 1.478966E-04 | |
| 742 | 5.256137E-03 | 1.118154E-02 | -1.158929E-02 | 3.123799E-03 | |
| 751 | 1.490240E-02 | -1.335917E-02 | 2.055926E-03 | 2.657160E-04 | |
| 752 | -2.448566E-03 | -8.770578E-04 | 2.030236E-04 | -1.033146E-05 | |
| 761 | 2.671582E-03 | -7.152668E-04 | 1.399354E-04 | -8.529829E-06 | |
| 762 | 3.457556E-04 | -2.255411E-05 | -6.059363E-06 | 4.713373E-07 | |
| 771 | -1.774213E-04 | -3.198055E-05 | 1.064434E-06 | 1.380895E-07 | |
| 772 | 1.266805E-04 | -3.434712E-05 | -8.108665E-06 | 1.072257E-06 | |
| 781 | -2.994721E-05 | -4.965032E-07 | -2.848017E-08 | 5.644998E-08 | |
| 782 | -2.577715E-05 | 4.730198E-06 | 7.465638E-07 | -8.255513E-08 | |

FIG. 33

| Surface # | | Radius (mm) | Thickness / air gap (mm) | Refractive index | Abbe number | Focal length (mm) | Material |
|---|---|---|---|---|---|---|---|
| | Effective focal length (EFL) = 4.346 mm, HFOV (Half field of view) = 36.984dge., TTL = 5.540 mm, Image height= 3.238 mm, Fno = 1.600 | | | | | | |
| - | Object | INFINITY | INFINITY | | | | |
| 800 | Aperture stop | INFINITY | -0.495 | | | | |
| 811 | 1st lens element | 2.009 | 0.722 | 1.545 | 55.987 | 4.904 | Plastic |
| 812 | | 7.018 | 0.049 | | | | |
| 821 | 2nd lens element | 3.510 | 0.220 | 1.661 | 20.412 | -9.738 | Plastic |
| 822 | | 2.222 | 0.262 | | | | |
| 831 | 3rd lens element | 3.933 | 0.506 | 1.545 | 55.987 | 10.977 | Plastic |
| 832 | | 10.910 | 0.478 | | | | |
| 841 | 4th lens element | 6.350 | 0.250 | 1.661 | 20.412 | -220.017 | Plastic |
| 842 | | 5.991 | 0.109 | | | | |
| 851 | 5th lens element | -3.708 | 0.601 | 1.545 | 55.987 | 5.713 | Plastic |
| 852 | | -1.792 | 0.030 | | | | |
| 861 | 6th lens element | 20.743 | 0.231 | 1.661 | 20.412 | -28.298 | Plastic |
| 862 | | 9.840 | 0.034 | | | | |
| 871 | 7th lens element | 2.790 | 0.364 | 1.545 | 55.987 | 8.996 | Plastic |
| 872 | | 6.157 | 0.317 | | | | |
| 881 | 8th lens element | -2.679 | 0.397 | 1.545 | 55.987 | -2.995 | Plastic |
| 882 | | 4.425 | 0.450 | | | | |
| 891 | IR cut filter | INFINITY | 0.210 | 1.517 | 64.167 | | |
| 892 | | INFINITY | 0.309 | | | | |
| 893 | Image plane | INFINITY | | | | | |

FIG. 36

| Aspherical parameters | | | | | |
|---|---|---|---|---|---|
| Surface # | K | $a_2$ | $a_4$ | $a_6$ | $a_8$ |
| 811 | 0.000000E+00 | 0.000000E+00 | 3.932952E-03 | -1.309390E-03 | 6.475270E-04 |
| 812 | 0.000000E+00 | 0.000000E+00 | -1.072039E-02 | -1.981534E-02 | 7.973103E-03 |
| 821 | 0.000000E+00 | 0.000000E+00 | -7.798754E-02 | -1.536961E-03 | 6.323059E-03 |
| 822 | 0.000000E+00 | 0.000000E+00 | -8.606456E-02 | 1.422297E-02 | -4.837880E-03 |
| 831 | 0.000000E+00 | 0.000000E+00 | -4.588250E-02 | -6.363909E-04 | -2.175971E-02 |
| 832 | 0.000000E+00 | 0.000000E+00 | -4.424629E-02 | -4.055838E-03 | -1.238157E-02 |
| 841 | 0.000000E+00 | 0.000000E+00 | -1.486245E-01 | 8.105392E-04 | -1.126981E-02 |
| 842 | 0.000000E+00 | 0.000000E+00 | -1.112327E-01 | -1.475722E-02 | -2.372680E-03 |
| 851 | 0.000000E+00 | 0.000000E+00 | 5.650150E-02 | -4.593025E-02 | 1.420744E-02 |
| 852 | 0.000000E+00 | 0.000000E+00 | 2.767165E-02 | -4.861750E-03 | 1.467120E-02 |
| 861 | 0.000000E+00 | 0.000000E+00 | 2.070659E-02 | -3.665021E-02 | -3.809386E-04 |
| 862 | 0.000000E+00 | 0.000000E+00 | -1.308570E-02 | -1.724503E-02 | 2.022041E-03 |
| 871 | 0.000000E+00 | 0.000000E+00 | -1.452073E-01 | 1.626584E-02 | 1.585618E-03 |
| 872 | 0.000000E+00 | 0.000000E+00 | -4.722455E-02 | -4.940410E-03 | 2.257830E-03 |
| 881 | 0.000000E+00 | 0.000000E+00 | 1.375270E-02 | 5.166091E-03 | -2.014321E-04 |
| 882 | 0.000000E+00 | 0.000000E+00 | -5.341940E-02 | 1.030988E-02 | -9.175007E-04 |
| Surface # | $a_{10}$ | $a_{12}$ | $a_{14}$ | $a_{16}$ | |
| 811 | -6.390605E-04 | 9.100554E-05 | 2.623596E-04 | -2.155181E-04 | |
| 812 | -1.392723E-04 | -6.351527E-04 | 4.555088E-04 | -1.829551E-04 | |
| 821 | 4.396130E-03 | -4.598535E-04 | -5.247024E-04 | 1.490879E-04 | |
| 822 | 4.549269E-03 | 2.969705E-03 | -3.052823E-03 | 1.219992E-03 | |
| 831 | -5.256707E-03 | 1.590735E-03 | 7.758420E-03 | -3.471846E-03 | |
| 832 | -5.596221E-03 | 2.670888E-03 | 3.717443E-03 | -1.812188E-03 | |
| 841 | -8.830997E-04 | 6.919183E-03 | -1.811932E-03 | 1.695632E-04 | |
| 842 | 4.963040E-03 | 1.099377E-02 | -1.166526E-02 | 3.110035E-03 | |
| 851 | 1.483107E-02 | -1.335516E-02 | 2.048381E-03 | 2.392901E-04 | |
| 852 | -2.421710E-03 | -8.377776E-04 | 2.327914E-04 | 1.009905E-05 | |
| 861 | 2.614129E-03 | -7.158230E-04 | 1.412440E-04 | -8.732761E-06 | |
| 862 | 3.354091E-04 | -2.463478E-05 | -6.120426E-06 | 6.150485E-07 | |
| 871 | -1.625548E-04 | -2.956388E-05 | 1.348936E-06 | 1.502277E-07 | |
| 872 | 1.265178E-04 | -3.389358E-05 | -7.952454E-06 | 1.105483E-06 | |
| 881 | -3.256810E-05 | -8.031563E-07 | -4.817092E-09 | 8.131173E-08 | |
| 882 | -2.410135E-05 | 4.974914E-06 | 7.750542E-07 | -8.055021E-08 | |

FIG. 37

| \multicolumn{7}{c}{Effective focal length (EFL) = 4.311 mm, HFOV (Half field of view) = 37.016dge., TTL = 5.445 mm, Image height= 3.238 mm, Fno = 1.600} |

| Surface # | | Radius (mm) | Thickness / air gap (mm) | Refractive index | Abbe number | Focal length (mm) | Material |
|---|---|---|---|---|---|---|---|
| - | Object | INFINITY | INFINITY | | | | |
| 900 | Aperture stop | INFINITY | -0.492 | | | | |
| 911 | 1st lens element | 2.012 | 0.704 | 1.545 | 55.987 | 4.925 | Plastic |
| 912 | | 6.988 | 0.037 | | | | |
| 921 | 2nd lens element | 3.306 | 0.220 | 1.661 | 20.412 | -9.749 | Plastic |
| 922 | | 2.134 | 0.274 | | | | |
| 931 | 3rd lens element | 3.868 | 0.477 | 1.545 | 55.987 | 9.821 | Plastic |
| 932 | | 13.254 | 0.570 | | | | |
| 941 | 4th lens element | 7.608 | 0.239 | 1.661 | 20.412 | -57.970 | Plastic |
| 942 | | 6.277 | 0.106 | | | | |
| 951 | 5th lens element | -3.617 | 0.512 | 1.545 | 55.987 | 6.058 | Plastic |
| 952 | | -1.815 | 0.030 | | | | |
| 961 | 6th lens element | 16.036 | 0.303 | 1.661 | 20.412 | -38.196 | Plastic |
| 962 | | 9.768 | 0.030 | | | | |
| 971 | 7th lens element | 2.758 | 0.338 | 1.545 | 55.987 | 8.825 | Plastic |
| 972 | | 6.165 | 0.317 | | | | |
| 981 | 8th lens element | -2.686 | 0.320 | 1.545 | 55.987 | -3.009 | Plastic |
| 982 | | 4.413 | 0.450 | | | | |
| 991 | IR cut filter | INFINITY | 0.210 | 1.517 | 64.167 | | |
| 992 | | INFINITY | 0.309 | | | | |
| 993 | Image plane | INFINITY | | | | | |

FIG. 40

| Aspherical parameters | | | | | |
|---|---|---|---|---|---|
| Surface # | K | $a_2$ | $a_4$ | $a_6$ | $a_8$ |
| 911 | 0.000000E+00 | 0.000000E+00 | 2.788414E-03 | -1.500160E-03 | 9.669185E-04 |
| 912 | 0.000000E+00 | 0.000000E+00 | -1.074480E-02 | -1.906993E-02 | 8.730984E-03 |
| 921 | 0.000000E+00 | 0.000000E+00 | -7.692881E-02 | -1.739009E-03 | 6.028947E-03 |
| 922 | 0.000000E+00 | 0.000000E+00 | -8.658802E-02 | 1.408769E-02 | -5.491063E-03 |
| 931 | 0.000000E+00 | 0.000000E+00 | -4.848029E-02 | -4.242748E-04 | -2.045389E-02 |
| 932 | 0.000000E+00 | 0.000000E+00 | -4.641219E-02 | -5.098072E-03 | -1.247498E-02 |
| 941 | 0.000000E+00 | 0.000000E+00 | -1.512251E-01 | 1.372672E-04 | -1.101393E-02 |
| 942 | 0.000000E+00 | 0.000000E+00 | -1.166653E-01 | -1.585064E-02 | -2.688339E-03 |
| 951 | 0.000000E+00 | 0.000000E+00 | 5.516898E-02 | -4.609168E-02 | 1.513311E-02 |
| 952 | 0.000000E+00 | 0.000000E+00 | 2.815390E-02 | -4.270265E-03 | 1.474997E-02 |
| 961 | 0.000000E+00 | 0.000000E+00 | 1.782954E-02 | -3.804051E-02 | -3.615876E-04 |
| 962 | 0.000000E+00 | 0.000000E+00 | -1.408748E-02 | -1.678885E-02 | 1.932833E-03 |
| 971 | 0.000000E+00 | 0.000000E+00 | -1.458273E-01 | 1.617305E-02 | 1.575307E-03 |
| 972 | 0.000000E+00 | 0.000000E+00 | -4.807779E-02 | -5.002882E-03 | 2.253006E-03 |
| 981 | 0.000000E+00 | 0.000000E+00 | 1.425633E-02 | 5.157703E-03 | -2.041488E-04 |
| 982 | 0.000000E+00 | 0.000000E+00 | -5.520685E-02 | 1.075331E-02 | -9.184364E-04 |
| Surface # | $a_{10}$ | $a_{12}$ | $a_{14}$ | $a_{16}$ | |
| 911 | -6.623879E-04 | -1.246083E-04 | 2.840570E-04 | -1.303843E-04 | |
| 912 | -7.745226E-05 | -5.646769E-04 | 4.284572E-04 | -1.812423E-04 | |
| 921 | 4.135344E-03 | -4.769089E-04 | -4.942602E-04 | 5.803488E-05 | |
| 922 | 4.327823E-03 | 2.705404E-03 | -3.409293E-03 | 1.339231E-03 | |
| 931 | -5.212588E-03 | 1.010247E-03 | 7.470881E-03 | -3.228046E-03 | |
| 932 | -5.114801E-03 | 2.855128E-03 | 3.554572E-03 | -1.858838E-03 | |
| 941 | -1.010804E-03 | 6.504843E-03 | -1.909634E-03 | 2.633527E-04 | |
| 942 | 5.145899E-03 | 1.109255E-02 | -1.164445E-02 | 3.090542E-03 | |
| 951 | 1.506520E-02 | -1.333626E-02 | 2.055107E-03 | 2.419208E-04 | |
| 952 | -2.375143E-03 | -8.336991E-04 | 2.325918E-04 | 9.476896E-06 | |
| 961 | 2.656377E-03 | -7.011081E-04 | 1.445663E-04 | -8.039679E-06 | |
| 962 | 3.276004E-04 | -2.541083E-05 | -6.084109E-06 | 5.851467E-07 | |
| 971 | -1.634504E-04 | -2.961226E-05 | 1.360068E-06 | 1.657546E-07 | |
| 972 | 1.276554E-04 | -3.360423E-05 | -7.932154E-06 | 1.104485E-06 | |
| 981 | -3.321322E-05 | -8.634405E-07 | -4.039636E-09 | 8.490487E-08 | |
| 982 | -2.473680E-05 | 4.917673E-06 | 7.694266E-07 | -8.115382E-08 | |

FIG. 41

| Surface # | | Radius (mm) | Thickness / air gap (mm) | Refractive index | Abbe number | Focal length (mm) | Material |
|---|---|---|---|---|---|---|---|
| | Effective focal length (EFL) = 4.195 mm, HFOV (Half field of view) = 37.003dge., TTL = 5.571 mm, Image height= 3.238 mm, Fno = 1.600 | | | | | | |
| - | Object | INFINITY | INFINITY | | | | |
| 1000 | Aperture stop | INFINITY | -0.435 | | | | |
| 1011 | 1st lens element | 2.113 | 0.658 | 1.545 | 55.987 | 4.995 | Plastic |
| 1012 | | 8.342 | 0.049 | | | | |
| 1021 | 2nd lens element | 3.361 | 0.279 | 1.661 | 20.412 | -10.084 | Plastic |
| 1022 | | 2.167 | 0.238 | | | | |
| 1031 | 3rd lens element | 3.702 | 0.519 | 1.545 | 55.987 | 10.840 | Plastic |
| 1032 | | 9.384 | 0.376 | | | | |
| 1041 | 4th lens element | 34.918 | 0.292 | 1.661 | 20.412 | -35.249 | Plastic |
| 1042 | | 14.006 | 0.085 | | | | |
| 1051 | 5th lens element | -3.494 | 0.469 | 1.545 | 55.987 | 6.452 | Plastic |
| 1052 | | -1.838 | 0.028 | | | | |
| 1061 | 6th lens element | 15.628 | 0.553 | 1.661 | 20.412 | -27.632 | Plastic |
| 1062 | | 8.338 | 0.047 | | | | |
| 1071 | 7th lens element | 2.658 | 0.507 | 1.545 | 55.987 | 7.132 | Plastic |
| 1072 | | 7.803 | 0.272 | | | | |
| 1081 | 8th lens element | -2.752 | 0.231 | 1.545 | 55.987 | -3.234 | Plastic |
| 1082 | | 5.080 | 0.450 | | | | |
| 1091 | IR cut filter | INFINITY | 0.210 | 1.517 | 64.167 | | |
| 1092 | | INFINITY | 0.309 | | | | |
| 1093 | Image plane | INFINITY | | | | | |

FIG. 44

| Aspherical parameters | | | | | |
|---|---|---|---|---|---|
| Surface # | K | $a_2$ | $a_4$ | $a_6$ | $a_8$ |
| 1011 | 0.000000E+00 | 0.000000E+00 | 5.535004E-03 | -9.809384E-04 | 5.363021E-04 |
| 1012 | 0.000000E+00 | 0.000000E+00 | -1.091798E-02 | -1.849477E-02 | 8.340850E-03 |
| 1021 | 0.000000E+00 | 0.000000E+00 | -7.677576E-02 | -1.164965E-03 | 6.311971E-03 |
| 1022 | 0.000000E+00 | 0.000000E+00 | -8.706457E-02 | 1.331544E-02 | -5.305914E-03 |
| 1031 | 0.000000E+00 | 0.000000E+00 | -4.810725E-02 | -4.511997E-05 | -2.154924E-02 |
| 1032 | 0.000000E+00 | 0.000000E+00 | -4.505641E-02 | -6.378403E-03 | -1.445290E-02 |
| 1041 | 0.000000E+00 | 0.000000E+00 | -1.503800E-01 | 3.960070E-03 | -1.095195E-02 |
| 1042 | 0.000000E+00 | 0.000000E+00 | -1.109250E-01 | -1.539967E-02 | -2.055935E-03 |
| 1051 | 0.000000E+00 | 0.000000E+00 | 5.628495E-02 | -4.492832E-02 | 1.429247E-02 |
| 1052 | 0.000000E+00 | 0.000000E+00 | 2.102261E-02 | -5.202972E-03 | 1.486582E-02 |
| 1061 | 0.000000E+00 | 0.000000E+00 | 1.622002E-02 | -4.121864E-02 | -8.548023E-04 |
| 1062 | 0.000000E+00 | 0.000000E+00 | -9.643060E-03 | -1.610256E-02 | 2.058571E-03 |
| 1071 | 0.000000E+00 | 0.000000E+00 | -1.429780E-01 | 1.617136E-02 | 1.565514E-03 |
| 1072 | 0.000000E+00 | 0.000000E+00 | -4.631003E-02 | -4.391222E-03 | 2.292897E-03 |
| 1081 | 0.000000E+00 | 0.000000E+00 | 1.468897E-02 | 4.926274E-03 | -2.011163E-04 |
| 1082 | 0.000000E+00 | 0.000000E+00 | -5.134684E-02 | 1.110441E-02 | -9.462643E-04 |
| Surface # | $a_{10}$ | $a_{12}$ | $a_{14}$ | $a_{16}$ | |
| 1011 | -7.589511E-04 | 1.679261E-05 | 2.498786E-04 | -1.878706E-04 | |
| 1012 | 1.632522E-04 | -6.792719E-04 | 3.666499E-04 | -2.213164E-04 | |
| 1021 | 4.257477E-03 | -6.228328E-04 | -5.269228E-04 | 8.880502E-05 | |
| 1022 | 4.369541E-03 | 2.740253E-03 | -3.560462E-03 | 1.045577E-03 | |
| 1031 | -5.221892E-03 | 1.352522E-03 | 7.202649E-03 | -4.540779E-03 | |
| 1032 | -6.773713E-03 | 2.245978E-03 | 3.704168E-03 | -1.751927E-03 | |
| 1041 | -1.138121E-03 | 6.661726E-03 | -1.780994E-03 | 3.677304E-04 | |
| 1042 | 5.109093E-03 | 1.103474E-02 | -1.167062E-02 | 3.092389E-03 | |
| 1051 | 1.488648E-02 | -1.329722E-02 | 2.087255E-03 | 2.557859E-04 | |
| 1052 | -2.342949E-03 | -7.981132E-04 | 2.575448E-04 | 2.368341E-05 | |
| 1061 | 2.645258E-03 | -6.840253E-04 | 1.565358E-04 | -7.742275E-07 | |
| 1062 | 3.286909E-04 | -2.665677E-05 | -6.672288E-06 | 4.691248E-07 | |
| 1071 | -1.671941E-04 | -3.056116E-05 | 1.254539E-06 | 1.787578E-07 | |
| 1072 | 1.288293E-04 | -3.381931E-05 | -7.982365E-06 | 1.097094E-06 | |
| 1081 | -3.030288E-05 | -6.159441E-07 | -3.272478E-09 | 6.429937E-08 | |
| 1082 | -2.652372E-05 | 4.907346E-06 | 7.798989E-07 | -8.070829E-08 | |

FIG. 45

| Effective focal length (EFL) = 4.376 mm, HFOV (Half field of view) = 36.972dge., TTL = 6.234 mm, Image height = 3.238 mm, Fno = 1.600 |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 11'00 | Aperture stop | INFINITY | -0.477 | | | | |
| 11'11 | 1st lens element | 2.359 | 0.842 | 1.545 | 55.987 | 5.673 | Plastic |
| 11'12 | | 8.640 | 0.058 | | | | |
| 11'21 | 2nd lens element | 3.442 | 0.278 | 1.661 | 20.412 | -10.482 | Plastic |
| 11'22 | | 2.232 | 0.185 | | | | |
| 11'31 | 3rd lens element | 4.356 | 0.658 | 1.545 | 55.987 | 12.126 | Plastic |
| 11'32 | | 12.045 | 0.233 | | | | |
| 11'41 | 4th lens element | 6.631 | 0.253 | 1.661 | 20.412 | -81.119 | Plastic |
| 11'42 | | 5.817 | 0.093 | | | | |
| 11'51 | 5th lens element | -5.272 | 1.069 | 1.545 | 55.987 | 4.609 | Plastic |
| 11'52 | | -1.826 | 0.029 | | | | |
| 11'61 | 6th lens element | 53.191 | 0.327 | 1.661 | 20.412 | -19.317 | Plastic |
| 11'62 | | 10.349 | 0.028 | | | | |
| 11'71 | 7th lens element | 2.646 | 0.484 | 1.545 | 55.987 | 6.748 | Plastic |
| 11'72 | | 8.765 | 0.307 | | | | |
| 11'81 | 8th lens element | -2.616 | 0.419 | 1.545 | 55.987 | -2.814 | Plastic |
| 11'82 | | 3.938 | 0.450 | | | | |
| 11'91 | IR cut filter | INFINITY | 0.210 | 1.517 | 64.167 | | |
| 11'92 | | INFINITY | 0.309 | | | | |
| 11'93 | Image plane | INFINITY | | | | | |

FIG. 48

| Aspherical parameters | | | | | |
|---|---|---|---|---|---|
| Surface # | K | $a_2$ | $a_4$ | $a_6$ | $a_8$ |
| 11'11 | 0.000000E+00 | 0.000000E+00 | 1.099430E-02 | -2.050392E-03 | 2.390760E-03 |
| 11'12 | 0.000000E+00 | 0.000000E+00 | 3.872592E-03 | -1.192665E-02 | 8.946997E-03 |
| 11'21 | 0.000000E+00 | 0.000000E+00 | -7.333674E-02 | 9.628292E-05 | 6.413675E-03 |
| 11'22 | 0.000000E+00 | 0.000000E+00 | -9.554391E-02 | 5.949889E-03 | -3.905109E-03 |
| 11'31 | 0.000000E+00 | 0.000000E+00 | -3.745855E-02 | 2.005056E-03 | -2.051100E-02 |
| 11'32 | 0.000000E+00 | 0.000000E+00 | -4.725391E-02 | -6.772145E-03 | -1.322866E-02 |
| 11'41 | 0.000000E+00 | 0.000000E+00 | -1.687104E-01 | -1.363884E-03 | -1.329546E-02 |
| 11'42 | 0.000000E+00 | 0.000000E+00 | -1.010144E-01 | -1.519143E-02 | -1.794989E-03 |
| 11'51 | 0.000000E+00 | 0.000000E+00 | 5.024812E-02 | -5.296432E-02 | 1.149271E-02 |
| 11'52 | 0.000000E+00 | 0.000000E+00 | 1.478897E-02 | -1.473189E-02 | 1.377687E-02 |
| 11'61 | 0.000000E+00 | 0.000000E+00 | 3.748431E-02 | -3.332411E-02 | -6.335143E-04 |
| 11'62 | 0.000000E+00 | 0.000000E+00 | -1.062380E-02 | -1.638373E-02 | 2.057691E-03 |
| 11'71 | 0.000000E+00 | 0.000000E+00 | -1.451643E-01 | 1.586708E-02 | 1.542931E-03 |
| 11'72 | 0.000000E+00 | 0.000000E+00 | -4.158262E-02 | -4.511299E-03 | 2.253886E-03 |
| 11'81 | 0.000000E+00 | 0.000000E+00 | 1.492203E-02 | 4.692765E-03 | -2.027219E-04 |
| 11'82 | 0.000000E+00 | 0.000000E+00 | -4.920220E-02 | 1.060308E-02 | -1.015880E-03 |
| Surface # | $a_{10}$ | $a_{12}$ | $a_{14}$ | $a_{16}$ | |
| 11'11 | -1.329073E-04 | -1.634107E-04 | 1.939779E-04 | 6.264749E-06 | |
| 11'12 | 5.077272E-04 | -9.840381E-05 | 5.134982E-04 | -5.758485E-04 | |
| 11'21 | 3.448362E-03 | -1.026792E-03 | -4.136862E-04 | -3.010972E-04 | |
| 11'22 | 4.418374E-03 | 2.303993E-03 | -3.952470E-03 | 2.529966E-03 | |
| 11'31 | -4.565580E-03 | 3.125624E-03 | 9.301881E-03 | -3.649252E-03 | |
| 11'32 | -5.444916E-03 | 2.376638E-03 | 3.595514E-03 | -1.612423E-03 | |
| 11'41 | -1.255422E-03 | 7.218242E-03 | -1.502495E-03 | 3.287012E-04 | |
| 11'42 | 5.133250E-03 | 1.101395E-02 | -1.177082E-02 | 2.972867E-03 | |
| 11'51 | 1.446116E-02 | -1.337774E-02 | 2.089462E-03 | 2.855703E-04 | |
| 11'52 | -2.334991E-03 | -7.687097E-04 | 2.570174E-04 | 2.182985E-05 | |
| 11'61 | 2.475198E-03 | -7.422488E-04 | 1.413430E-04 | -9.560982E-06 | |
| 11'62 | 3.332755E-04 | -2.433523E-05 | -6.581616E-06 | 4.740408E-07 | |
| 11'71 | -1.667212E-04 | -2.968218E-05 | 1.392195E-06 | 1.511160E-07 | |
| 11'72 | 1.259615E-04 | -3.399585E-05 | -7.984871E-06 | 1.072363E-06 | |
| 11'81 | -2.343177E-05 | 9.177113E-07 | -1.043768E-07 | 5.350211E-08 | |
| 11'82 | -2.957410E-05 | 4.729612E-06 | 7.940983E-07 | -7.259995E-08 | |

FIG. 49

| \multicolumn{7}{|c|}{Effective focal length (EFL) = 4.217 mm, HFOV (Half field of view) = 36.991dge., TTL = 5.683 mm, Image height= 3.238 mm, Fno = 1.600} |
|---|---|---|---|---|---|---|

| Surface # | | Radius (mm) | Thickness / air gap (mm) | Refractive index | Abbe number | Focal length (mm) | Material |
|---|---|---|---|---|---|---|---|
| - | Object | INFINITY | INFINITY | | | | |
| 12'00 | Aperture stop | INFINITY | -0.371 | | | | |
| 12'11 | 1st lens element | 2.451 | 0.520 | 1.545 | 55.987 | 5.792 | Plastic |
| 12'12 | | 10.065 | 0.029 | | | | |
| 12'21 | 2nd lens element | 2.672 | 0.219 | 1.661 | 20.412 | -11.465 | Plastic |
| 12'22 | | 1.916 | 0.255 | | | | |
| 12'31 | 3rd lens element | 2.983 | 0.555 | 1.545 | 55.987 | 9.626 | Plastic |
| 12'32 | | 6.438 | 0.422 | | | | |
| 12'41 | 4th lens element | 10.787 | 0.326 | 1.661 | 20.412 | -16.515 | Plastic |
| 12'42 | | 5.385 | 0.116 | | | | |
| 12'51 | 5th lens element | -4.034 | 0.559 | 1.545 | 55.987 | 5.604 | Plastic |
| 12'52 | | -1.826 | 0.030 | | | | |
| 12'61 | 6th lens element | 10.003 | 0.467 | 1.661 | 20.412 | -96.850 | Plastic |
| 12'62 | | 8.500 | 0.113 | | | | |
| 12'71 | 7th lens element | 2.462 | 0.364 | 1.545 | 55.987 | 6.587 | Plastic |
| 12'72 | | 7.390 | 0.308 | | | | |
| 12'81 | 8th lens element | -2.723 | 0.432 | 1.545 | 55.987 | -2.997 | Plastic |
| 12'82 | | 4.337 | 0.450 | | | | |
| 12'91 | IR cut filter | INFINITY | 0.210 | 1.517 | 64.167 | | |
| 12'92 | | INFINITY | 0.309 | | | | |
| 12'93 | Image plane | INFINITY | | | | | |

FIG. 52

| Aspherical parameters | | | | |
|---|---|---|---|---|
| Surface # | K | $a_2$ | $a_4$ | $a_6$ | $a_8$ |
| 12'11 | 0.000000E+00 | 0.000000E+00 | 1.948990E-03 | -3.322378E-03 | 4.194091E-04 |
| 12'12 | 0.000000E+00 | 0.000000E+00 | -4.860715E-03 | -1.460516E-02 | 1.063003E-02 |
| 12'21 | 0.000000E+00 | 0.000000E+00 | -7.196226E-02 | -9.242601E-04 | 5.902948E-03 |
| 12'22 | 0.000000E+00 | 0.000000E+00 | -9.863530E-02 | 7.541094E-03 | -7.799202E-03 |
| 12'31 | 0.000000E+00 | 0.000000E+00 | -4.158315E-02 | 4.474105E-03 | -1.873725E-02 |
| 12'32 | 0.000000E+00 | 0.000000E+00 | -4.710746E-02 | -6.337040E-03 | -1.414722E-02 |
| 12'41 | 0.000000E+00 | 0.000000E+00 | -1.606290E-01 | 3.671483E-03 | -1.090959E-02 |
| 12'42 | 0.000000E+00 | 0.000000E+00 | -1.021502E-01 | -1.407761E-02 | -8.201029E-04 |
| 12'51 | 0.000000E+00 | 0.000000E+00 | 5.294394E-02 | -4.434943E-02 | 1.384386E-02 |
| 12'52 | 0.000000E+00 | 0.000000E+00 | 1.060123E-02 | -4.715531E-03 | 1.536871E-02 |
| 12'61 | 0.000000E+00 | 0.000000E+00 | 2.454856E-02 | -3.730765E-02 | -6.095880E-04 |
| 12'62 | 0.000000E+00 | 0.000000E+00 | -1.115128E-02 | -1.562763E-02 | 2.136760E-03 |
| 12'71 | 0.000000E+00 | 0.000000E+00 | -1.424454E-01 | 1.514586E-02 | 1.430334E-03 |
| 12'72 | 0.000000E+00 | 0.000000E+00 | -4.386065E-02 | -4.667931E-03 | 2.286441E-03 |
| 12'81 | 0.000000E+00 | 0.000000E+00 | 1.323984E-02 | 5.188906E-03 | -1.957871E-04 |
| 12'82 | 0.000000E+00 | 0.000000E+00 | -5.229315E-02 | 1.034365E-02 | -9.219766E-04 |
| Surface # | $a_{10}$ | $a_{12}$ | $a_{14}$ | $a_{16}$ | |
| 12'11 | -4.059202E-04 | 3.040893E-04 | 4.105468E-04 | -6.266064E-05 | |
| 12'12 | 9.350349E-04 | -3.497078E-04 | 4.260703E-04 | -2.683955E-04 | |
| 12'21 | 4.429092E-03 | -2.571999E-04 | -5.260069E-04 | -3.399519E-04 | |
| 12'22 | 4.339909E-03 | 3.405188E-03 | -3.001979E-03 | 1.102862E-03 | |
| 12'31 | -5.168408E-03 | 1.055665E-03 | 7.646637E-03 | -2.883239E-03 | |
| 12'32 | -6.397568E-03 | 2.511128E-03 | 3.857481E-03 | -1.613337E-03 | |
| 12'41 | -2.441744E-04 | 7.594536E-03 | -1.534075E-03 | 8.274256E-05 | |
| 12'42 | 5.442059E-03 | 1.099290E-02 | -1.179539E-02 | 2.951801E-03 | |
| 12'51 | 1.481535E-02 | -1.330813E-02 | 2.032762E-03 | 1.948331E-04 | |
| 12'52 | -2.305892E-03 | -8.214150E-04 | 2.458806E-04 | 2.371256E-05 | |
| 12'61 | 2.488584E-03 | -7.670707E-04 | 1.384840E-04 | 3.030650E-07 | |
| 12'62 | 3.315902E-04 | -3.050568E-05 | -7.747768E-06 | 3.924819E-07 | |
| 12'71 | -1.815052E-04 | -3.118615E-05 | 1.395085E-06 | 2.212801E-07 | |
| 12'72 | 1.320725E-04 | -3.328580E-05 | -7.949650E-06 | 1.080305E-06 | |
| 12'81 | -3.134583E-05 | -7.304244E-07 | -2.811238E-08 | 7.107173E-08 | |
| 12'82 | -2.477798E-05 | 4.854768E-06 | 7.743285E-07 | -7.905828E-08 | |

FIG. 53

| Effective focal length (EFL) = 4.318 mm, HFOV (Half field of view) = 37.000dge., TTL = 5.549 mm, Image height= 3.238 mm, Fno = 1.600 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 13'00 | Aperture stop | INFINITY | -0.497 | | | | |
| 13'11 | 1st lens element | 2.036 | 0.702 | 1.545 | 55.987 | 5.133 | Plastic |
| 13'12 | | 6.525 | 0.083 | | | | |
| 13'21 | 2nd lens element | 3.808 | 0.219 | 1.661 | 20.412 | -8.814 | Plastic |
| 13'22 | | 2.258 | 0.192 | | | | |
| 13'31 | 3rd lens element | 3.609 | 0.669 | 1.545 | 55.987 | 8.175 | Plastic |
| 13'32 | | 17.579 | 0.481 | | | | |
| 13'41 | 4th lens element | 9.096 | 0.267 | 1.661 | 20.412 | -44.098 | Plastic |
| 13'42 | | 6.866 | 0.100 | | | | |
| 13'51 | 5th lens element | -3.686 | 0.551 | 1.545 | 55.987 | 5.778 | Plastic |
| 13'52 | | -1.790 | 0.030 | | | | |
| 13'61 | 6th lens element | 14.474 | 0.306 | 1.661 | 20.412 | -32.630 | Plastic |
| 13'62 | | 8.620 | 0.029 | | | | |
| 13'71 | 7th lens element | 2.699 | 0.345 | 1.545 | 55.987 | 8.905 | Plastic |
| 13'72 | | 5.790 | 0.350 | | | | |
| 13'81 | 8th lens element | -2.663 | 0.255 | 1.545 | 55.987 | -2.993 | Plastic |
| 13'82 | | 4.380 | 0.450 | | | | |
| 13'91 | IR cut filter | INFINITY | 0.210 | 1.517 | 64.167 | | |
| 13'92 | | INFINITY | 0.309 | | | | |
| 13'93 | Image plane | INFINITY | | | | | |

FIG. 56

| Aspherical parameters | | | | |
|---|---|---|---|---|
| Surface # | K | $a_2$ | $a_4$ | $a_6$ | $a_8$ |
| 13'11 | 0.000000E+00 | 0.000000E+00 | 2.569447E-03 | -3.492043E-04 | 2.651432E-04 |
| 13'12 | 0.000000E+00 | 0.000000E+00 | 3.230457E-03 | -2.706434E-02 | 9.797953E-03 |
| 13'21 | 0.000000E+00 | 0.000000E+00 | -6.776343E-02 | -4.881453E-03 | -3.721789E-03 |
| 13'22 | 0.000000E+00 | 0.000000E+00 | -9.377747E-02 | 1.172357E-02 | 5.273766E-03 |
| 13'31 | 0.000000E+00 | 0.000000E+00 | -4.501074E-02 | -2.897128E-04 | -2.112849E-02 |
| 13'32 | 0.000000E+00 | 0.000000E+00 | -4.174240E-02 | -3.419567E-03 | -1.036922E-02 |
| 13'41 | 0.000000E+00 | 0.000000E+00 | -1.565789E-01 | -1.695459E-03 | -1.305674E-02 |
| 13'42 | 0.000000E+00 | 0.000000E+00 | -1.156816E-01 | -1.749203E-02 | -2.811352E-03 |
| 13'51 | 0.000000E+00 | 0.000000E+00 | 5.362088E-02 | -4.630253E-02 | 1.466615E-02 |
| 13'52 | 0.000000E+00 | 0.000000E+00 | 2.717126E-02 | -3.244587E-03 | 1.412965E-02 |
| 13'61 | 0.000000E+00 | 0.000000E+00 | 1.837792E-02 | -3.827885E-02 | -2.862541E-04 |
| 13'62 | 0.000000E+00 | 0.000000E+00 | -1.634048E-02 | -1.637703E-02 | 1.961475E-03 |
| 13'71 | 0.000000E+00 | 0.000000E+00 | -1.461914E-01 | 1.610341E-02 | 1.570693E-03 |
| 13'72 | 0.000000E+00 | 0.000000E+00 | -4.634597E-02 | -5.202703E-03 | 2.261762E-03 |
| 13'81 | 0.000000E+00 | 0.000000E+00 | 1.708976E-02 | 3.759414E-03 | 6.171156E-05 |
| 13'82 | 0.000000E+00 | 0.000000E+00 | -5.488776E-02 | 1.097458E-02 | -9.608273E-04 |
| Surface # | $a_{10}$ | $a_{12}$ | $a_{14}$ | $a_{16}$ | |
| 13'11 | -1.056407E-04 | -3.321143E-04 | 5.830656E-04 | -2.251883E-04 | |
| 13'12 | -5.968385E-04 | -5.849504E-04 | 5.002452E-04 | -1.578937E-04 | |
| 13'21 | 9.025692E-03 | -3.254002E-04 | -9.022982E-04 | 1.489593E-04 | |
| 13'22 | -4.651819E-02 | 6.557731E-02 | -3.690713E-02 | 8.611506E-03 | |
| 13'31 | -4.174192E-03 | 6.824643E-04 | 7.398847E-03 | -2.506951E-03 | |
| 13'32 | -4.808245E-03 | 2.383690E-03 | 2.877871E-03 | -1.410135E-03 | |
| 13'41 | -1.462027E-03 | 6.673517E-03 | -1.474575E-03 | 2.753693E-04 | |
| 13'42 | 5.812522E-03 | 1.110529E-02 | -1.165228E-02 | 3.038875E-03 | |
| 13'51 | 1.533726E-02 | -1.326799E-02 | 2.081035E-03 | 1.915731E-04 | |
| 13'52 | -2.364408E-03 | -8.153450E-04 | 2.469032E-04 | 1.257986E-05 | |
| 13'61 | 2.642396E-03 | -7.147374E-04 | 1.473862E-04 | -7.772450E-06 | |
| 13'62 | 3.256049E-04 | -2.529552E-05 | -6.392603E-06 | 7.057072E-07 | |
| 13'71 | -1.643240E-04 | -2.971094E-05 | 1.321122E-06 | 1.593909E-07 | |
| 13'72 | 1.301490E-04 | -3.363704E-05 | -8.037820E-06 | 1.087676E-06 | |
| 13'81 | -5.025183E-05 | -1.245128E-06 | 1.243937E-08 | 9.319760E-08 | |
| 13'82 | -2.489532E-05 | 5.033379E-06 | 7.826622E-07 | -8.234946E-08 | |

FIG. 57

| | Effective focal length (EFL) = 4.324 mm, HFOV (Half field of view) = 36.986dge., TTL = 5.478 mm, Image height = 3.238 mm, Fno = 1.600 |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 14'00 | Aperture stop | INFINITY | -0.508 | | | | |
| 14'11 | 1st lens element | 1.993 | 0.769 | 1.545 | 55.987 | 5.062 | Plastic |
| 14'12 | | 6.162 | 0.193 | | | | |
| 14'21 | 2nd lens element | 4.651 | 0.219 | 1.661 | 20.412 | -8.435 | Plastic |
| 14'22 | | 2.498 | 0.185 | | | | |
| 14'31 | 3rd lens element | 3.695 | 0.561 | 1.545 | 55.987 | 8.334 | Plastic |
| 14'32 | | 18.555 | 0.400 | | | | |
| 14'41 | 4th lens element | 7.978 | 0.246 | 1.661 | 20.412 | -116.108 | Plastic |
| 14'42 | | 7.144 | 0.177 | | | | |
| 14'51 | 5th lens element | -3.246 | 0.409 | 1.545 | 55.987 | 7.034 | Plastic |
| 14'52 | | -1.838 | 0.030 | | | | |
| 14'61 | 6th lens element | 15.203 | 0.355 | 1.661 | 20.412 | -58.952 | Plastic |
| 14'62 | | 10.862 | 0.032 | | | | |
| 14'71 | 7th lens element | 2.782 | 0.336 | 1.545 | 55.987 | 8.574 | Plastic |
| 14'72 | | 6.558 | 0.359 | | | | |
| 14'81 | 8th lens element | -2.615 | 0.240 | 1.545 | 55.987 | -3.033 | Plastic |
| 14'82 | | 4.670 | 0.450 | | | | |
| 14'91 | IR cut filter | INFINITY | 0.210 | 1.517 | 64.167 | | |
| 14'92 | | INFINITY | 0.309 | | | | |
| 14'93 | Image plane | INFINITY | | | | | |

FIG. 60

| Aspherical parameters | | | | | |
|---|---|---|---|---|---|
| Surface # | K | $a_2$ | $a_4$ | $a_6$ | $a_8$ |
| 14'11 | 0.000000E+00 | 0.000000E+00 | 1.818897E-03 | -1.517142E-03 | 1.094583E-03 |
| 14'12 | 0.000000E+00 | 0.000000E+00 | -7.667231E-03 | -1.410773E-02 | 8.062457E-03 |
| 14'21 | 0.000000E+00 | 0.000000E+00 | -8.028111E-02 | 3.293662E-03 | 1.061702E-02 |
| 14'22 | 0.000000E+00 | 0.000000E+00 | -8.531166E-02 | 1.398121E-02 | -4.052291E-03 |
| 14'31 | 0.000000E+00 | 0.000000E+00 | -3.425288E-02 | -7.449648E-03 | -1.590961E-02 |
| 14'32 | 0.000000E+00 | 0.000000E+00 | -4.531948E-02 | -3.300674E-03 | -1.403444E-02 |
| 14'41 | 0.000000E+00 | 0.000000E+00 | -1.605862E-01 | 2.366507E-03 | -1.128491E-02 |
| 14'42 | 0.000000E+00 | 0.000000E+00 | -1.265636E-01 | -1.478954E-02 | -2.448062E-03 |
| 14'51 | 0.000000E+00 | 0.000000E+00 | 5.661401E-02 | -4.743027E-02 | 1.597726E-02 |
| 14'52 | 0.000000E+00 | 0.000000E+00 | 3.204383E-02 | -2.816699E-03 | 1.462592E-02 |
| 14'61 | 0.000000E+00 | 0.000000E+00 | 1.789539E-02 | -3.884213E-02 | -1.096876E-04 |
| 14'62 | 0.000000E+00 | 0.000000E+00 | -1.291372E-02 | -1.627603E-02 | 1.879398E-03 |
| 14'71 | 0.000000E+00 | 0.000000E+00 | -1.458644E-01 | 1.622996E-02 | 1.587103E-03 |
| 14'72 | 0.000000E+00 | 0.000000E+00 | -4.709643E-02 | -4.975452E-03 | 2.254240E-03 |
| 14'81 | 0.000000E+00 | 0.000000E+00 | 1.412735E-02 | 5.232359E-03 | -1.920993E-04 |
| 14'82 | 0.000000E+00 | 0.000000E+00 | -5.500239E-02 | 1.097605E-02 | -9.416965E-04 |
| Surface # | $a_{10}$ | $a_{12}$ | $a_{14}$ | $a_{16}$ | |
| 14'11 | -7.173294E-04 | 7.792665E-05 | 2.188772E-04 | -8.351460E-05 | |
| 14'12 | -8.801918E-04 | -8.539273E-04 | 5.995947E-04 | -1.884578E-04 | |
| 14'21 | 3.757950E-03 | -2.687433E-03 | -7.939849E-04 | 3.886050E-04 | |
| 14'22 | 8.358533E-03 | 3.735186E-03 | -7.041093E-03 | 2.438499E-03 | |
| 14'31 | -3.420113E-03 | -6.667443E-04 | 8.371776E-03 | -3.722159E-03 | |
| 14'32 | -6.314262E-03 | 2.975043E-03 | 4.144874E-03 | -2.041391E-03 | |
| 14'41 | -9.095172E-04 | 6.866133E-03 | -1.627758E-03 | 2.939282E-04 | |
| 14'42 | 5.412932E-03 | 1.121624E-02 | -1.161832E-02 | 3.112049E-03 | |
| 14'51 | 1.501565E-02 | -1.341446E-02 | 2.038124E-03 | 2.487511E-04 | |
| 14'52 | -2.486947E-03 | -8.584807E-04 | 2.286828E-04 | 9.904188E-06 | |
| 14'61 | 2.734472E-03 | -6.965492E-04 | 1.445491E-04 | -8.522338E-06 | |
| 14'62 | 3.170996E-04 | -2.667990E-05 | -6.328140E-06 | 6.171263E-07 | |
| 14'71 | -1.618651E-04 | -2.947715E-05 | 1.359034E-06 | 1.519072E-07 | |
| 14'72 | 1.276073E-04 | -3.370036E-05 | -7.947306E-06 | 1.098095E-06 | |
| 14'81 | -3.347468E-05 | -1.206427E-06 | 1.262410E-08 | 1.006555E-07 | |
| 14'82 | -2.524928E-05 | 4.919246E-06 | 7.612805E-07 | -8.213452E-08 | |

FIG. 61

| Embodiment | 1st | 2nd | 3rd | 4th | 5th | 6th | 7th |
|---|---|---|---|---|---|---|---|
| T1 | 0.695 | 0.687 | 0.711 | 0.687 | 0.553 | 0.619 | 0.486 |
| G12 | 0.071 | 0.065 | 0.099 | 0.127 | 0.175 | 0.131 | 0.158 |
| T2 | 0.214 | 0.220 | 0.252 | 0.220 | 0.230 | 0.233 | 0.216 |
| G23 | 0.295 | 0.286 | 0.204 | 0.145 | 0.207 | 0.116 | 0.283 |
| T3 | 0.364 | 0.446 | 0.471 | 0.466 | 0.431 | 0.624 | 0.556 |
| G34 | 0.518 | 0.498 | 0.395 | 0.483 | 0.563 | 0.351 | 0.410 |
| T4 | 0.237 | 0.253 | 0.329 | 0.404 | 0.270 | 0.348 | 0.240 |
| G45 | 0.141 | 0.119 | 0.104 | 0.095 | 0.067 | 0.092 | 0.209 |
| T5 | 0.408 | 0.502 | 0.568 | 0.545 | 0.653 | 0.727 | 0.236 |
| G56 | 0.118 | 0.092 | 0.030 | 0.030 | 0.030 | 0.030 | 0.188 |
| T6 | 0.288 | 0.278 | 0.279 | 0.396 | 0.300 | 0.368 | 0.385 |
| G67 | 0.080 | 0.120 | 0.035 | 0.067 | 0.603 | 0.030 | 0.099 |
| T7 | 0.272 | 0.268 | 0.678 | 0.440 | 0.312 | 0.354 | 0.347 |
| G78 | 0.477 | 0.549 | 0.377 | 0.307 | 0.260 | 0.305 | 0.341 |
| T8 | 0.241 | 0.240 | 0.240 | 0.277 | 0.300 | 0.398 | 0.236 |
| G8F | 0.450 | 0.450 | 0.450 | 0.450 | 0.450 | 0.450 | 0.450 |
| TF | 0.210 | 0.210 | 0.210 | 0.210 | 0.210 | 0.210 | 0.210 |
| GFP | 0.230 | 0.237 | 0.210 | 0.263 | 0.350 | 0.309 | 0.309 |
| BFL | 0.890 | 0.897 | 0.870 | 0.923 | 1.010 | 0.969 | 0.969 |
| TTL | 5.308 | 5.519 | 5.643 | 5.614 | 5.963 | 5.696 | 5.356 |
| EFL | 4.319 | 4.287 | 4.312 | 4.306 | 4.350 | 4.265 | 4.199 |
| TL | 4.418 | 4.622 | 4.773 | 4.691 | 4.953 | 4.727 | 4.387 |
| ALT | 2.720 | 2.894 | 3.528 | 3.436 | 3.048 | 3.671 | 2.701 |
| AAG | 1.699 | 1.728 | 1.245 | 1.254 | 1.904 | 1.056 | 1.686 |
| ALT/(T1+G23) | 2.747 | 2.975 | 3.856 | 4.132 | 4.014 | 4.995 | 3.515 |
| AAG/(T1+T5) | 1.539 | 1.453 | 0.973 | 1.018 | 1.580 | 0.784 | 2.338 |
| (T7+T8)/T6 | 1.780 | 1.824 | 3.296 | 1.809 | 2.041 | 2.042 | 1.513 |
| (T4+G45+T5)/G34 | 1.520 | 1.755 | 2.531 | 2.161 | 1.758 | 3.323 | 1.669 |
| EFL/(T6+T7) | 7.716 | 7.845 | 4.505 | 5.151 | 7.105 | 5.900 | 5.738 |
| TL/BFL | 4.963 | 5.154 | 5.486 | 5.083 | 4.901 | 4.878 | 4.527 |
| (T6+G67+T7+G78+T8)/(T1+G12+T2) | 1.384 | 1.497 | 1.516 | 1.438 | 1.855 | 1.481 | 1.638 |
| (T3+G34)/(T2+G23) | 1.731 | 1.869 | 1.900 | 2.605 | 2.274 | 2.800 | 1.938 |
| (T1+G12)/(T5+G56) | 1.457 | 1.266 | 1.353 | 1.415 | 1.065 | 0.992 | 1.520 |
| T1/T8 | 2.886 | 2.867 | 2.961 | 2.479 | 1.842 | 1.556 | 2.062 |
| TTL/ALT | 1.952 | 1.907 | 1.599 | 1.634 | 1.956 | 1.552 | 1.983 |
| AAG/(G12+G34) | 2.886 | 3.069 | 2.517 | 2.054 | 2.583 | 2.187 | 2.971 |
| T1/(G12+T2) | 2.436 | 2.416 | 2.026 | 1.978 | 1.366 | 1.701 | 1.301 |
| (T3+T5)/T4 | 3.258 | 3.744 | 3.163 | 2.502 | 4.013 | 3.883 | 3.299 |
| (T6+T7)/T2 | 2.613 | 2.489 | 3.800 | 3.799 | 2.662 | 3.109 | 3.391 |
| EFL/AAG | 2.543 | 2.480 | 3.465 | 3.433 | 2.284 | 4.040 | 2.490 |
| (G34+G45)/G23 | 2.233 | 2.163 | 2.443 | 3.999 | 3.042 | 3.836 | 2.190 |
| (T1+T3)/G34 | 2.047 | 2.274 | 2.989 | 2.386 | 1.747 | 3.538 | 2.540 |
| ALT/AAG | 1.601 | 1.674 | 2.835 | 2.739 | 1.601 | 3.477 | 1.601 |

FIG. 62A

| Embodiment | 8th | 9th | 10th | 11th | 12th | 13rd | 14th |
|---|---|---|---|---|---|---|---|
| T1 | 0.722 | 0.704 | 0.658 | 0.842 | 0.520 | 0.702 | 0.769 |
| G12 | 0.049 | 0.037 | 0.049 | 0.058 | 0.029 | 0.083 | 0.193 |
| T2 | 0.220 | 0.220 | 0.279 | 0.278 | 0.219 | 0.219 | 0.219 |
| G23 | 0.262 | 0.274 | 0.238 | 0.185 | 0.255 | 0.192 | 0.185 |
| T3 | 0.506 | 0.477 | 0.519 | 0.658 | 0.555 | 0.669 | 0.561 |
| G34 | 0.478 | 0.570 | 0.376 | 0.233 | 0.422 | 0.481 | 0.400 |
| T4 | 0.250 | 0.239 | 0.292 | 0.253 | 0.326 | 0.267 | 0.246 |
| G45 | 0.109 | 0.106 | 0.085 | 0.093 | 0.116 | 0.100 | 0.177 |
| T5 | 0.601 | 0.512 | 0.469 | 1.069 | 0.559 | 0.551 | 0.409 |
| G56 | 0.030 | 0.030 | 0.028 | 0.029 | 0.030 | 0.030 | 0.030 |
| T6 | 0.231 | 0.303 | 0.553 | 0.327 | 0.467 | 0.306 | 0.355 |
| G67 | 0.034 | 0.030 | 0.047 | 0.028 | 0.113 | 0.029 | 0.032 |
| T7 | 0.364 | 0.338 | 0.507 | 0.484 | 0.364 | 0.345 | 0.336 |
| G78 | 0.317 | 0.317 | 0.272 | 0.307 | 0.308 | 0.350 | 0.359 |
| T8 | 0.397 | 0.320 | 0.231 | 0.419 | 0.432 | 0.255 | 0.240 |
| G8F | 0.450 | 0.450 | 0.450 | 0.450 | 0.450 | 0.450 | 0.450 |
| TF | 0.210 | 0.210 | 0.210 | 0.210 | 0.210 | 0.210 | 0.210 |
| GFP | 0.309 | 0.309 | 0.309 | 0.309 | 0.309 | 0.309 | 0.309 |
| BFL | 0.969 | 0.969 | 0.969 | 0.969 | 0.969 | 0.969 | 0.969 |
| TTL | 5.540 | 5.445 | 5.571 | 6.234 | 5.683 | 5.549 | 5.478 |
| EFL | 4.346 | 4.311 | 4.195 | 4.376 | 4.217 | 4.318 | 4.324 |
| TL | 4.571 | 4.476 | 4.602 | 5.265 | 4.714 | 4.580 | 4.509 |
| ALT | 3.292 | 3.112 | 3.506 | 4.330 | 3.442 | 3.315 | 3.134 |
| AAG | 1.279 | 1.363 | 1.096 | 0.934 | 1.272 | 1.265 | 1.375 |
| ALT/(T1+G23) | 3.344 | 3.183 | 3.913 | 4.217 | 4.444 | 3.708 | 3.285 |
| AAG/(T1+T5) | 0.966 | 1.121 | 0.973 | 0.489 | 1.179 | 1.010 | 1.167 |
| (T7+T8)/T6 | 3.293 | 2.175 | 1.334 | 2.765 | 1.706 | 1.959 | 1.622 |
| (T4+G45+T5)/G34 | 2.009 | 1.502 | 2.249 | 6.066 | 2.377 | 1.911 | 2.079 |
| EFL/(T6+T7) | 7.301 | 6.733 | 3.960 | 5.400 | 5.074 | 6.624 | 6.258 |
| TL/BFL | 4.717 | 4.619 | 4.749 | 5.433 | 4.865 | 4.726 | 4.653 |
| (T6+G67+T7+G78+T8)/(T1+G12+T2) | 1.355 | 1.359 | 1.633 | 1.328 | 2.193 | 1.282 | 1.118 |
| (T3+G34)/(T2+G23) | 2.041 | 2.122 | 1.730 | 1.924 | 2.063 | 2.798 | 2.379 |
| (T1+G12)/(T5+G56) | 1.222 | 1.370 | 1.422 | 0.819 | 0.933 | 1.351 | 2.195 |
| T1/T8 | 1.820 | 2.201 | 2.850 | 2.007 | 1.203 | 2.751 | 3.208 |
| TTL/ALT | 1.683 | 1.749 | 1.589 | 1.440 | 1.651 | 1.674 | 1.748 |
| AAG/(G12+G34) | 2.428 | 2.244 | 2.578 | 3.204 | 2.822 | 2.245 | 2.319 |
| T1/(G12+T2) | 2.689 | 2.737 | 2.005 | 2.501 | 2.097 | 2.329 | 1.866 |
| (T3+T5)/T4 | 4.430 | 4.138 | 3.385 | 6.827 | 3.413 | 4.564 | 3.946 |
| (T6+T7)/T2 | 2.706 | 2.911 | 3.799 | 2.913 | 3.800 | 2.980 | 3.155 |
| EFL/AAG | 3.398 | 3.162 | 3.828 | 4.683 | 3.316 | 3.414 | 3.144 |
| (G34+G45)/G23 | 2.240 | 2.471 | 1.934 | 1.765 | 2.113 | 3.023 | 3.125 |
| (T1+T3)/G34 | 2.571 | 2.072 | 3.129 | 6.428 | 2.550 | 2.853 | 3.325 |
| ALT/AAG | 2.574 | 2.283 | 3.199 | 4.634 | 2.706 | 2.621 | 2.279 |

FIG. 62B

OPTICAL IMAGING LENS

CROSS-REFERENCE TO RELATED APPLICATIONS

This application claims priority to P.R.C. Patent Application No. 201711481864.X titled "Optical Imaging Lens," filed on Dec. 29, 2017, with the State Intellectual Property Office of the People's Republic of China (SIPO).

TECHNICAL FIELD

The present disclosure relates to an optical imaging lens, and particularly, to an optical imaging lens having at least eight lens elements.

BACKGROUND

Technology improves every day, continuously expanding consumer demand for increasingly compact electronic devices. As a result, key components of optical imaging lenses that are incorporated into consumer electronic products should keep pace with technological improvements in order to meet the expectations of consumers. Some important characteristics of an optical imaging lens include image quality and size. There may also be demands for bigger apertures and field of views. As image sensor technology improves, consumers' expectations related to image quality are also raised. Accordingly, in addition to reducing the size of the imaging lens, achieving good optical characteristics and performance should be considered.

Decreasing the dimensions of an optical lens while maintaining good optical performance might not be achieved simply by scaling down the lens. Rather, these benefits may be realized by improving other aspects of the design process, such as by varying the material used for the lens or adjusting the assembly yield.

Technological improvements of optical lens may include eliminating chromatic aberrations and dispersions by adding a certain number of optical lenses to meet consumer demand for image quality. However, the distance from the object-side surface of the first lens element to image plane along the optical axis becomes larger with an increased number of optical lenses. The increased number of optical lenses may be disadvantageous for designing thinner mobile phones, digital cameras, and automotive lens. Achieving an optical imaging lens with high image quality and small size is thus desired.

SUMMARY

The present disclosure provides an optical imaging lens for capturing images and videos such as the optical imaging lens of cell phones, cameras, tablets, car lenses and personal digital assistants. By controlling the convex or concave shape of the surfaces of eight lens elements, the length of the optical imaging lens may be shortened while maintaining good optical characteristics.

In the specification, parameters used herein may include:

| Parameter | Definition |
| --- | --- |
| T1 | A thickness of the first lens element along the optical axis |
| G12 | A distance between the image-side surface of the first lens element and the object-side surface of the second lens element along the optical axis, i.e., an air gap between the first lens element and the second lens element along the optical axis |
| T2 | A thickness of the second lens element along the optical axis |
| G23 | A distance between the image-side surface of the second lens element and the object-side surface of the third lens element along the optical axis, i.e., an air gap between the second lens element and the third lens element along the optical axis |
| T3 | A thickness of the third lens element along the optical axis |
| G34 | A distance between the image-side surface of the third lens element and the object-side surface of the fourth lens element along the optical axis, i.e., an air gap between the third lens element and the fourth lens element along the optical axis |
| T4 | A thickness of the fourth lens element along the optical axis |
| G45 | A distance between the image-side surface of the fourth lens element and the object-side surface of the fifth lens element along the optical axis, i.e., an air gap between the fourth lens element and the fifth lens element along the optical axis |
| T5 | A thickness of the fifth lens element along the optical axis |
| G56 | A distance between the image-side surface of the fifth lens element and the object-side surface of the sixth lens element along the optical axis, i.e., an air gap between the fifth lens element and the sixth lens element along the optical axis |
| T6 | A thickness of the sixth lens element along the optical axis |
| G67 | A distance between the image-side surface of the sixth lens element and the object-side surface of the seventh lens element along the optical axis, i.e., an air gap between the sixth lens element and the seventh lens element along the optical axis |
| T7 | A thickness of the seventh lens element along the optical axis |
| G78 | A distance between the image-side surface of the seventh lens element and the object-side surface of the eighth lens element along the optical axis, i.e., an air gap between the seventh lens element and the eighth lens element along the optical axis |
| T8 | A thickness of the eighth lens element along the optical axis |
| G8F | A distance between the image-side surface of the eighth lens element and the object-side surface of the filtering unit along the optical axis, i.e., an air gap between the eighth lens element and the filtering unit along the optical axis |
| TF | A thickness of the filtering unit along the optical axis |
| GFP | A distance between the image-side surface of the filtering unit and the image plane along the optical axis, i.e., an air gap between the filtering unit and the image plane along the optical axis |

-continued

| Parameter | Definition |
|---|---|
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| f7 | A focal length of the seventh lens element |
| f8 | A focal length of the eighth lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| n6 | A refractive index of the sixth lens element |
| n7 | A refractive index of the seventh lens element |
| n8 | A refractive index of the eighth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| V7 | An Abbe number of the seventh lens element |
| V8 | An Abbe number of the eighth lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis, i.e., the length of the optical image lens |
| ALT | A sum of the thicknesses of eight lens elements from the first lens element to the eighth lens element along the optical axis, i.e., a sum of the thicknesses of the first lens element, the second lens element, the third lens element, the fourth lens element, the fifth lens element, the sixth lens element, the seventh lens element, and eighth lens element along the optical axis |
| AAG | A sum of the seven air gaps from the first lens element to the eighth lens element along the optical axis, i.e., a sum of the a distance between the first lens element and the second lens element along the optical axis, a distance between the second lens element and the third lens element along the optical axis, a distance between the third lens element and the fourth lens element along the optical axis, a distance between the fourth lens element and the fifth lens element along the optical axis, a distance between the fifth lens element and the sixth lens element along the optical axis, a distance between the sixth lens element and the seventh lens element along the optical axis, and a distance between the seventh lens element and the eighth lens element along the optical axis |
| BFL | A back focal length of the optical imaging lens, i.e., a distance from the image-side surface of the eighth lens element to the image plane along the optical axis |
| TL | A distance from the object-side surface of the first lens element to the image-side surface of the eighth lens element along the optical axis |

According to some embodiments of the optical imaging lens of the present disclosure, an optical imaging lens may comprise a first lens element, a second lens element, a third lens element, a fourth lens element, a fifth lens element, a sixth lens element, a seventh lens element, and an eighth lens element sequentially from an object side to an image side along an optical axis. The first lens element to the eighth lens element may each comprise an object-side surface facing toward the object side and allowing imaging rays to pass through and an image-side surface facing toward the image side and allowing the imaging rays to pass through, an optical axis region of the image-side surface of the first lens element may be concave, and the second lens element may have negative refracting power. A periphery region of the object-side surface of the fifth lens element may be concave and an optical axis region of the image-side surface of the fifth lens element may be convex, an optical axis region of the image-side surface of the sixth lens element may be concave, and an optical axis region of the image-side surface of the seventh lens element may be concave. The material of the third lens element, the fourth lens element, and the eighth lens element may be plastic, and the optical imaging lens may comprise no other lenses having refracting power beyond the eight lens elements.

In another exemplary embodiment, some Inequalities could be taken into consideration as follows:

| | |
|---|---|
| $ALT/(T1 + G23) \leq 5.000$ | Inequality (1); |
| $AAG/(T1 + T5) \leq 2.500$ | Inequality (2); |
| $(T7 + T8)/T6 \leq 3.300$ | Inequality (3); |
| $(T4 + G45 + T5)/G34 \geq 1.500$ | Inequality (4); |
| $EFL/(T6 + T7) \geq 3.900$ | Inequality (5); |
| $TL/BFL \leq 5.500$ | Inequality (6); |
| $(T6 + G67 + T7 + G78 + T8)/(T1 + G12 + T2) \leq 2.200$ | Inequality (7); |
| $(T3 + G34)/(T2 + G23) \leq 2.800$ | Inequality (8); |
| $(T1 + G12)/(T5 + G56) \leq 2.200$ | Inequality (9); |
| $T1/T8 \geq 1.200$ | Inequality (10); |
| $TTL/ALT \leq 2.200$ | Inequality (11); |
| $AAG/(G12 + G34) \geq 2.000$ | Inequality (12); |
| $T1/(G12 + T2) \geq 1.300$ | Inequality (13); |
| $(T3 + T5)/T4 \geq 2.500$ | Inequality (14); |
| $(T6 + T7)/T2 \leq 3.800$ | Inequality (15); |
| $EFL/AAG \geq 2.200$ | Inequality (16); |
| $(G34 + G45)/G23 \leq 4.000$ | Inequality (17); |
| $(T1 + T3)/G34 \geq 1.500$ | Inequality (18); and |
| $ALT/AAG \geq 1.600$ | Inequality (19). |

BRIEF DESCRIPTION OF THE DRAWINGS

Exemplary embodiments will be more readily understood from the following detailed description when read in conjunction with the appended drawings, in which:

FIG. 1 depicts a cross-sectional view of one single lens element according to one embodiment of the present disclosure;

FIG. 2 depicts a schematic view of a relation between a surface shape and an optical focus of a lens element;

FIG. 3 depicts a schematic view of a first example of a surface shape and an effective radius of a lens element;

FIG. 4 depicts a schematic view of a second example of a surface shape and an effective radius of a lens element;

FIG. 5 depicts a schematic view of a third example of a surface shape and an effective radius of a lens element;

FIG. 8 depicts a table of optical data for each lens element of an optical imaging lens of an embodiment of the present disclosure;

FIG. 9 depicts a table of aspherical data of an embodiment of an optical imaging lens according to the present disclosure;

FIG. 12 depicts a table of optical data for each lens element of an optical imaging lens of another embodiment of the present disclosure;

FIG. 13 depicts a table of aspherical data of another embodiment of the optical imaging lens according to the present disclosure;

FIG. 16 depicts a table of optical data for each lens element of the optical imaging lens of another embodiment of the present disclosure;

FIG. 17 depicts a table of aspherical data of another embodiment of the optical imaging lens according to the present disclosure;

FIG. 20 depicts a table of optical data for each lens element of an optical imaging lens of another embodiment of the present disclosure;

FIG. 21 depicts a table of aspherical data of another embodiment of the optical imaging lens according to the present disclosure;

FIG. 24 depicts a table of optical data for each lens element of the optical imaging lens of another embodiment of the present disclosure;

FIG. 25 depicts a table of aspherical data of another embodiment of the optical imaging lens according to the present disclosure;

FIG. 28 depicts a table of optical data for each lens element of another embodiment of an optical imaging lens according to the present disclosure;

FIG. 29 depicts a table of aspherical data of another embodiment of the optical imaging lens according to the present disclosure;

FIG. 32 depicts a table of optical data for each lens element of another embodiment of an optical imaging lens according to the present disclosure;

FIG. 33 depicts a table of aspherical data of another embodiment of the optical imaging lens according to the present disclosure;

FIG. 36 depicts a table of optical data for each lens element of another embodiment of an optical imaging lens according to the present disclosure;

FIG. 37 depicts a table of aspherical data of another embodiment of the optical imaging lens according to the present disclosure;

FIG. 40 depicts a table of optical data for each lens element of another embodiment of an optical imaging lens according to the present disclosure;

FIG. 41 depicts a table of aspherical data of another embodiment of the optical imaging lens according to the present disclosure;

FIG. 44 depicts a table of optical data for each lens element of another embodiment of an optical imaging lens according to the present disclosure;

FIG. 45 depicts a table of aspherical data of another embodiment of the optical imaging lens according to the present disclosure;

FIG. 48 depicts a table of optical data for each lens element of another embodiment of an optical imaging lens according to the present disclosure;

FIG. 49 depicts a table of aspherical data of another embodiment of the optical imaging lens according to the present disclosure;

FIG. 52 depicts a table of optical data for each lens element of another embodiment of an optical imaging lens according to the present disclosure;

FIG. 53 depicts a table of aspherical data of another embodiment of the optical imaging lens according to the present disclosure;

FIG. 56 depicts a table of optical data for each lens element of another embodiment of an optical imaging lens according to the present disclosure;

FIG. 57 depicts a table of aspherical data of another embodiment of the optical imaging lens according to the present disclosure;

FIG. 60 depicts a table of optical data for each lens element of another embodiment of an optical imaging lens according to the present disclosure;

FIG. 61 depicts a table of aspherical data of another embodiment of the optical imaging lens according to the present disclosure; and FIG. 62A and FIG. 62B are tables for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG as determined in specific example embodiments.

DETAILED DESCRIPTION

Figure 6:
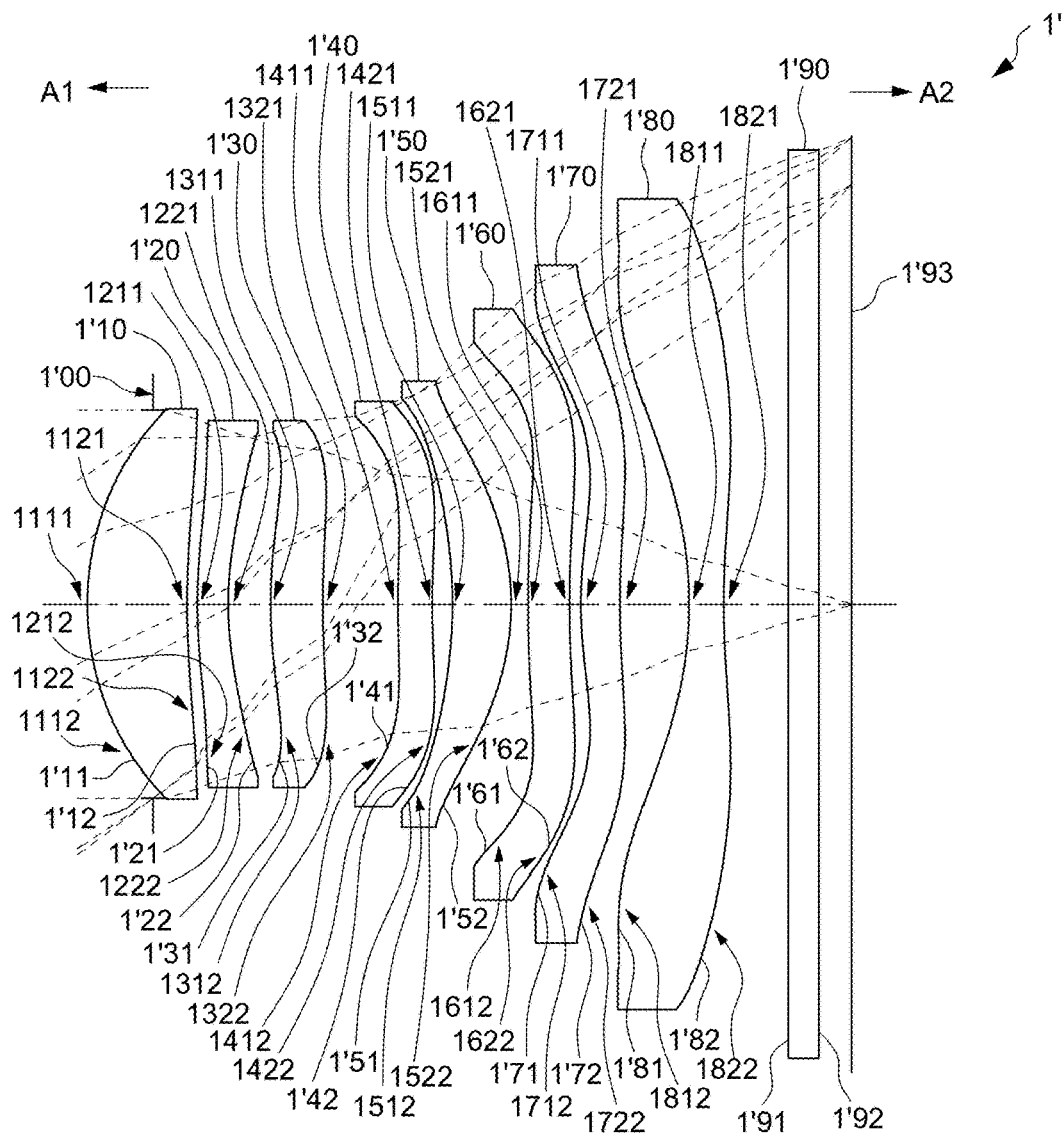
FIG. 6 depicts a cross-sectional view of an embodiment of an optical imaging lens having eight lens elements according to one embodiment of the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 7:
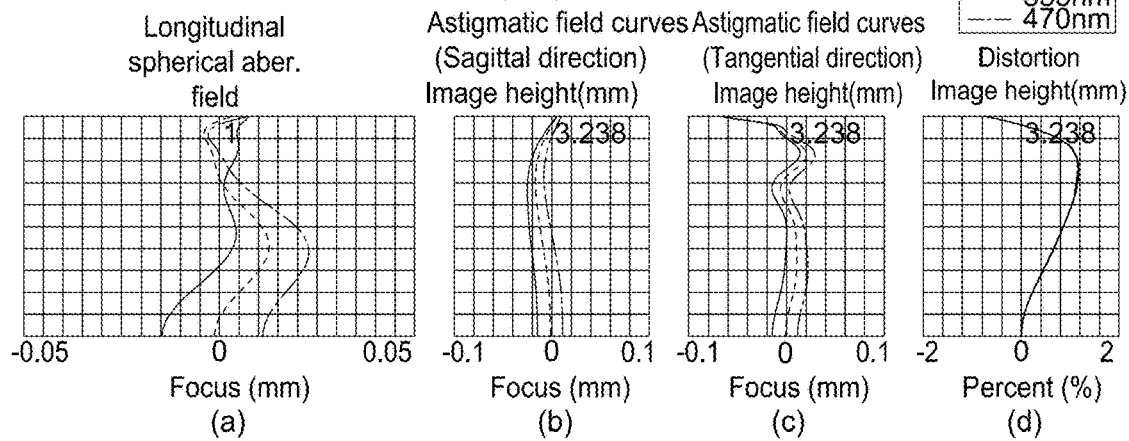
FIG. 7 depicts a chart of a a longitudinal spherical aberration and other kinds of optical aberrations of an embodiment of an optical imaging lens according to the present disclosure.

Several exemplary embodiments and associated optical data will now be provided to illustrate non-limiting examples of optical imaging lens systems having good optical characteristics and a shortened length. Reference is now made to FIGS. 6-9. FIG. 6 illustrates an example cross-sectional view of an optical imaging lens 1' having eight lens elements according to a first example embodiment. FIG. 7 shows example charts of a longitudinal spherical aberration and other kinds of optical aberrations of the optical imaging lens 1' according to the first example embodiment. FIG. 8 illustrates an example table of optical data of each lens element of the optical imaging lens 1' according to the first example embodiment. FIG. 9 depicts an example table of aspherical data of the optical imaging lens 1' according to the first example embodiment.

As shown in FIG. 6, the optical imaging lens 1' of the present embodiment may comprise, in order from an object side A1 to an image side A2 along an optical axis, an aperture stop 1'00, a first lens element 1'10, a second lens element 1'20, a third lens element 1'30, a fourth lens element 1'40, a fifth lens element 1'50, a sixth lens element 1'60, a seventh lens element 1'70 and an eighth lens element 1'80. A filtering unit 1'90 and an image plane 1'93 of an image sensor (not shown) are positioned at the image side A2 of the optical imaging lens 1'. Each of the first, second, third, fourth, fifth, sixth, seventh and eighth lens elements 1'10, 1'20, 1'30, 1'40, 1'50, 1'60, 1'70, 1'80 and the filtering unit 1'90 may comprise an object-side surface 1'11/1'21/1'31/1'41/1'51/1'61/1'71/1'81/1'91 facing toward the object side A1 and an image-side surface 1'12/1'22/1'32/1'42/1'52/1'62/1'72/1'82/1'92 facing toward the image side A2. The example embodiment of the filtering unit 1'90 illustrated may be an IR cut filter (infrared cut filter) positioned between the eighth lens element 1'80 and the image plane 1'93. The filtering unit 1'90 selectively absorbs light passing optical imaging lens 1' that has a specific wavelength. For example, if IR light is absorbed, IR light which may not be seen by human eyes may be prohibited from producing an image on the image plane 1'93.

Exemplary embodiments of each lens element of the optical imaging lens 1' will now be described with reference to the drawings. The lens elements 1'10, 1'20, 1'30, 1'40, 1'50, 1'60, 1'70, 1'80 of the optical imaging lens 1' may be constructed using plastic materials in this embodiment.

An example embodiment of the first lens element 1'10 may have positive refracting power. The optical axis region 1111 and the periphery region 1112 of the object-side surface 1'11 of the first lens element 1'10 may be convex. The optical axis region 1121 and the periphery region 1122 of the image-side surface 1'12 of the first lens element 1'10 may be concave.

An example embodiment of the second lens element 1'20 may have negative refracting power. The optical axis region 1211 and the periphery region 1212 of the object-side surface 1'21 of the second lens element 1'20 may be convex. The optical axis region 1221 and the periphery region 1222 of the image-side surface 1'22 of the second lens element 1'20 may be concave.

An example embodiment of the third lens element 1'30 may have positive refracting power. The optical axis region 1311 of the object-side surface 1'31 of the third lens element 1'30 may be convex. The periphery region 1312 of the object-side surface 1'31 of the third lens element 1'30 may be concave. The optical axis region 1321 of the image-side surface 1'32 of the third lens element 1'30 may be concave. The periphery region 1322 of the image-side surface 1'32 of the third lens element 1'30 may be convex.

An example embodiment of the fourth lens element 1'40 may have negative refracting power. The optical axis region 1411 of the object-side surface 1'41 of the fourth lens element 1'40 may be convex. The periphery region 1412 of the object-side surface 1'41 of the fourth lens element 1'40 may be concave. The optical axis region 1421 of the image-side surface 1'42 of the fourth lens element 1'40 may be concave. The periphery region 1422 of the image-side surface 1'42 of the fourth lens element 1'40 may be convex.

An example embodiment of the fifth lens element 1'50 may have positive refracting power. The optical axis region 1511 and the periphery region 1512 of the object-side surface 1'51 of the fifth lens element 1'50 may be concave. The optical axis region 1521 and the periphery region 1522 of the image-side surface 1'52 of the fifth lens element 1'50 may be convex.

An example embodiment of the sixth lens element 1'60 may have negative refracting power. The optical axis region 1611 of the object-side surface 1'61 of the sixth lens element 1'60 may be convex. The periphery region 1612 of the object-side surface 1'61 of the sixth lens element 1'60 may be concave. The optical axis region 1621 of the image-side surface 1'62 of the sixth lens element 1'60 may be concave. The periphery region 1622 of the image-side surface 1'62 of the sixth lens element 1'60 may be convex.

An example embodiment of the seventh lens element 1'70 may have positive refracting power. The optical axis region 1711 and the periphery region 1712 of the object-side surface 1'71 of the seventh lens element 1'70 may be convex. The optical axis region 1721 of the image-side surface 1'72 of the seventh lens element 1'70 may be concave. The periphery region 1722 of the image-side surface 1'72 of the seventh lens element 1'70 may be convex.

An example embodiment of the eighth lens element 1'80 may have negative refracting power. The optical axis region 1811 and the periphery region 1812 of the object-side surface 1'81 of the eighth lens element 1'80 may be concave. The optical axis region 1821 of the image-side surface 1'82 of the eight lens element 1'80 may be concave. The periphery region 1822 of the image-side surface 1'82 of the eighth lens element 1'80 may be convex.

The aspherical surfaces including the object-side surface 1'11 and the image-side surface 1'12 of the first lens element 1'10, the object-side surface 1'21 and the image-side surface 1'22 of the second lens element 1'20, the object-side surface 1'31 and the image-side surface 1'32 of the third lens element 1'30, the object-side surface 1'41 and the image-side surface 1'42 of the fourth lens element 1'40, the object-side surface 1'51 and the image-side surface 1'52 of the fifth lens element 1'50, the object-side surface 1'61 and the image-side surface 1'62 of the sixth lens element 1'60, the object-side surface 1'71 and the image-side surface 1'72 of the seventh lens element 1'70, and the object-side surface 1'81 and the image-side surface 1'82 of the eighth lens element 1'80 may all be defined by the following aspherical formula (1):

$$Z(Y) = \frac{Y^2}{R} \left/ \left(1 + \sqrt{1-(1+K)\frac{Y^2}{R^2}}\right) \right. + \sum_{i=1}^{n} a_{2i} \times Y^{2i} \quad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 9.

FIG. 7(a) shows the a longitudinal spherical aberration for three representative wavelengths (470 nm, 555 nm, 650 nm), wherein the horizontal axis of FIG. 7(a) defines the focus, and wherein the vertical axis of FIG. 7(a) defines the field of view. FIG. 7(b) shows the field curvature aberration in the sagittal direction for three representative wavelengths (470 nm, 555 nm, 650 nm), wherein the horizontal axis of FIG. 7(b) defines the focus, and wherein the vertical axis of FIG. 7(b) defines the image height. FIG. 7(c) shows the field curvature aberration in the tangential direction for three representative wavelengths (470 nm, 555 nm, 650 nm), wherein the horizontal axis of FIG. 7(c) defines the focus, and wherein the vertical axis of FIG. 7(c) defines the image height. FIG. 7(d) shows a variation of the distortion aberration, wherein the horizontal axis of FIG. 7(d) defines the percentage, and wherein the vertical axis of FIG. 7(d) defines the image height. The three curves with different wavelengths (470 nm, 555 nm, 650 nm) may represent that off-axis light with respect to these wavelengths may be focused around an image point. From the vertical deviation of each curve shown in FIG. 7(a), the offset of the off-axis light relative to the image point may be within about ±0.025 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.03 mm. Referring to FIG. 7(c), and the focus variation with respect to the three different wavelengths (470 nm, 555 nm, 650 nm) in the whole field may fall within about ±0.07 mm. Referring to FIG. 7(d), the horizontal axis of FIG. 7(d), the variation of the distortion aberration may be within about ±1.2%.

The distance from the object-side surface 1'11 of the first lens element 1'10 to the image plane 1'93 along the optical axis (TTL) may be about 5.308 mm, Fno may be about 1.6, and HFOV may be about 37.043 degrees. In accordance with these values, the present embodiment may provide an optical imaging lens having a shortened length while improving optical performance.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

Figure 10:
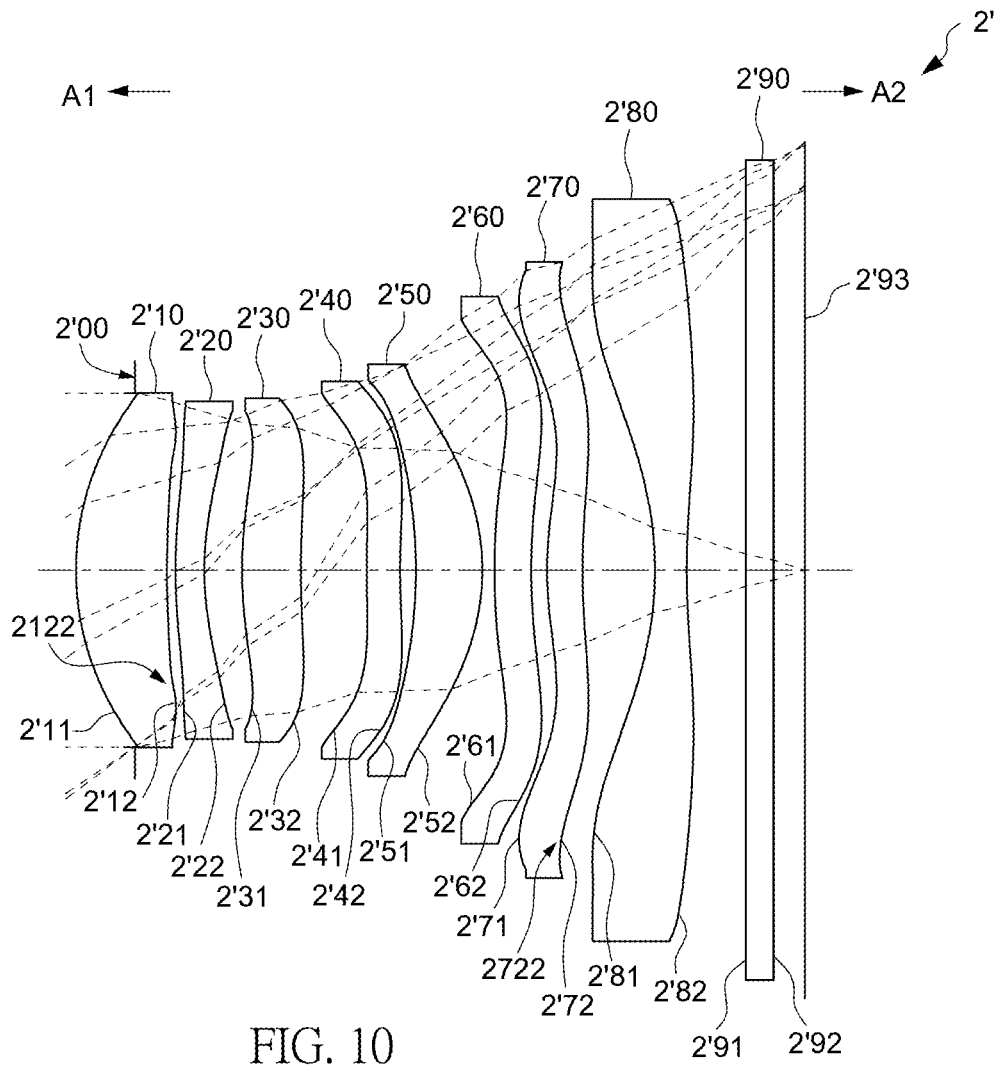
FIG. 10 depicts a cross-sectional view of another embodiment of an optical imaging lens having eight lens elements according to the present disclosure.
Figure 11:
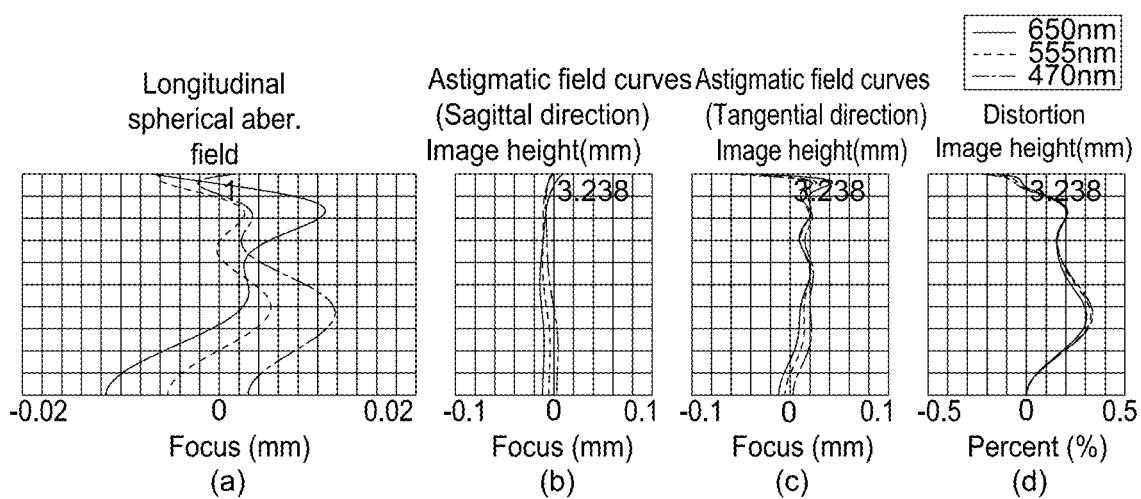
FIG. 11 depicts a chart of a longitudinal spherical aberration and other kinds of optical aberrations of another embodiment of an optical imaging lens according to one embodiment of the present disclosure.

Reference is now made to FIGS. 10-13. FIG. 10 illustrates an example cross-sectional view of an optical imaging lens 2' having eight lens elements according to a second example embodiment. FIG. 11 shows example charts of a longitudinal spherical aberration and other kinds of optical aberrations of the optical imaging lens 2' according to the second example embodiment. FIG. 12 shows an example table of optical data of each lens element of the optical imaging lens 2' according to the second example embodiment. FIG. 13 shows an example table of aspherical data of the optical imaging lens 2' according to the second example embodiment. The reference numbers labeled in the present embodiment may be similar to those in the first embodiment for the similar elements, but here the reference numbers may be initialed with 2 or 2'; for example, reference number 2'31 may label the object-side surface of the third lens element 2'30, reference number 2'32 may label the image-side surface of the third lens element 2'30, etc.

As shown in FIG. 10, the optical imaging lens 2' of the present embodiment, in an order from an object side A1 to an image side A2 along an optical axis, may comprise an aperture stop 2'00, a first lens element 2'10, a second lens element 2'20, a third lens element 2'30, a fourth lens element 2'40, a fifth lens element 2'50, a sixth lens element 2'60, a seventh lens element 2'70 and an eighth lens element 2'80.

The arrangement of the convex or concave surface structures, including the object-side surfaces 2'11, 2'21, 2'31, 2'41, 2'51, 2'61, 2'71, and 2'81 and the image-side surfaces 2'22, 2'32, 2'42, 2'52, 2'62, and 2'82 may be generally similar to the optical imaging lens 1', but the differences between the optical imaging lens 1' and the optical imaging lens 2' may include the concave or concave surface structures of the image-side surfaces 2'12 and 2'72. Additional differences may include a radius of curvature, a refracting power, a thickness, aspherical data, and/or an effective focal length of each lens element. More specifically, the periphery region 2122 of the image-side surface 2'12 of the first lens element 2'10 may be convex, and the periphery region 2722 of the image-side surface 2'72 of the seventh lens element 2'70 may be concave.

Here, in the interest of clearly showing the drawings of the present embodiment, only the surface shapes which are different from that in the first embodiment may be labeled. Please refer to FIG. 12 for the optical characteristics of each lens element in the optical imaging lens 2' of the present embodiment.

From the vertical deviation of each curve shown in FIG. 11(a), the offset of the off-axis light relative to the image point may be within about ±0.012 mm. Referring to FIG. 11(b), and the focus variation with respect to the three different wavelengths (470 nm, 555 nm, 650 nm) in the whole field may fall within about ±0.02 mm. Referring to FIG. 11(c), the focus variation with respect to the three different wavelengths (470 nm, 555 nm, 650 nm) in the whole field may fall within about ±0.06 mm. Referring to FIG. 11(d), the variation of the distortion aberration of the optical imaging lens 2' may be within about ±0.35%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, the field curvature aberration in the tangential direction, and the distortion aberration in the second embodiment may be smaller. Moreover, this embodiment may have a larger value of HFOV.

Figure 14:
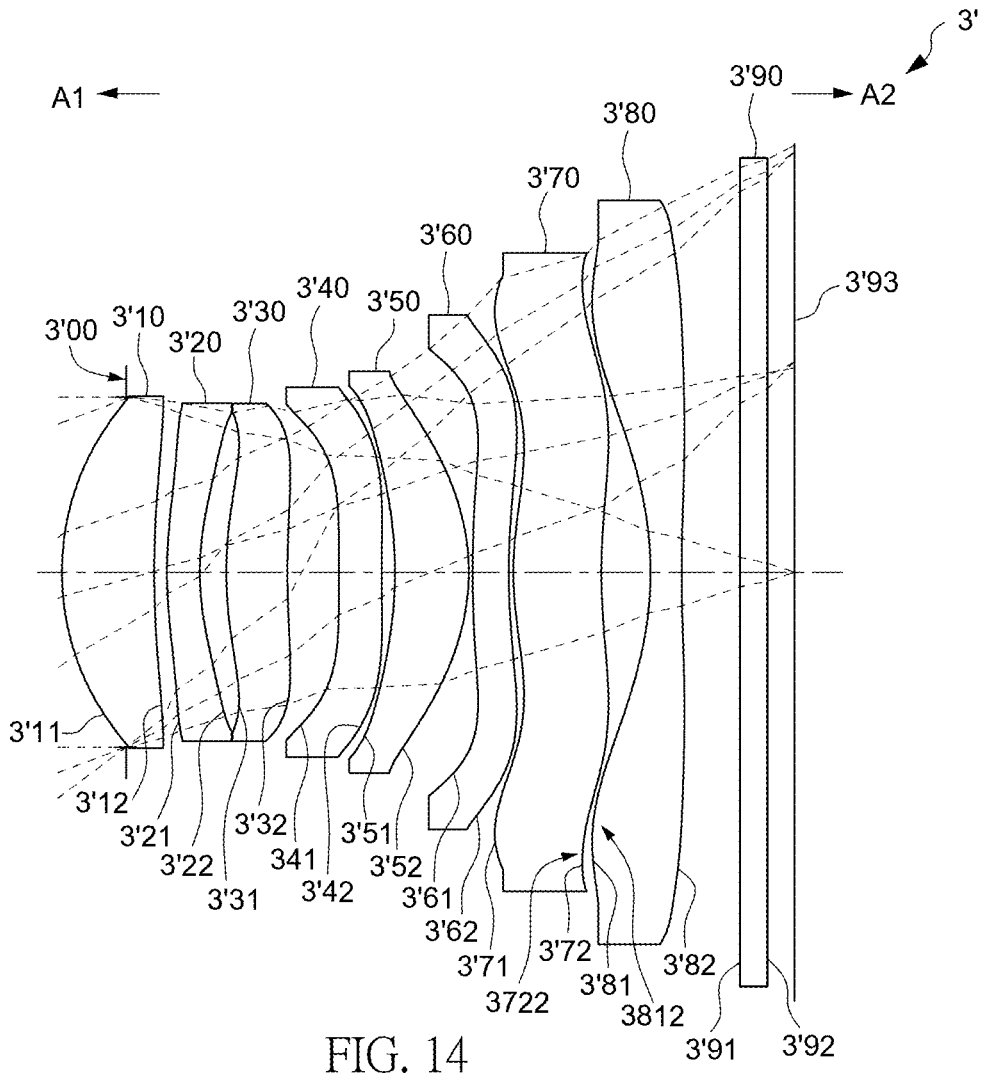
FIG. 14 depicts a cross-sectional view of another embodiment of an optical imaging lens having eight lens elements according to the present disclosure.
Figure 15:
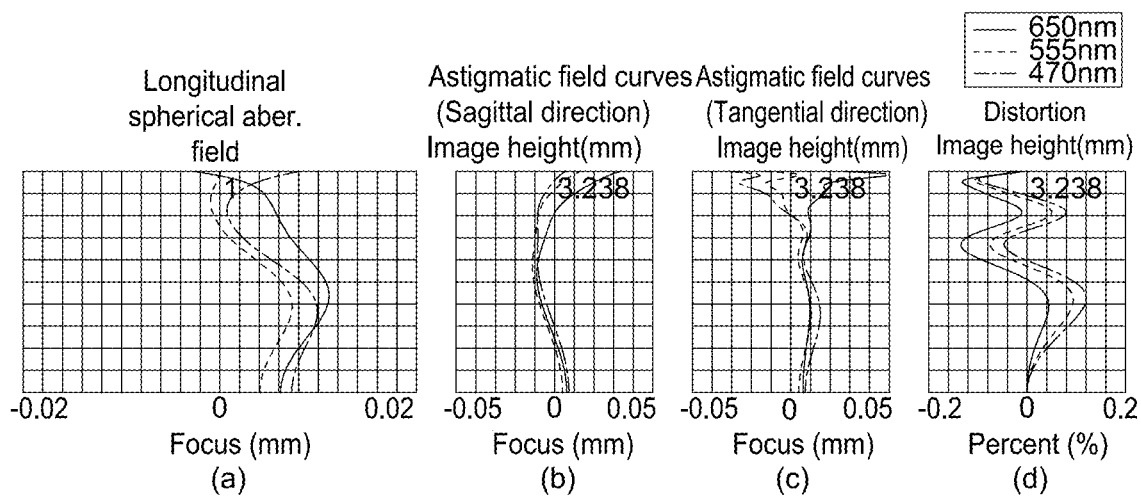
FIG. 15 depicts a chart of a longitudinal spherical aberration and other kinds of optical aberrations of another embodiment of an optical imaging lens according to the present disclosure.

Reference is now made to FIGS. 14-17. FIG. 14 illustrates an example cross-sectional view of an optical imaging lens 3' having eight lens elements according to a third example embodiment. FIG. 15 shows example charts of a longitudinal spherical aberration and other kinds of optical aberrations of the optical imaging lens 3' according to the third example embodiment. FIG. 16 shows an example table of optical data of each lens element of the optical imaging lens 3' according to the third example embodiment. FIG. 17 shows an example table of aspherical data of the optical imaging lens 3' according to the third example embodiment. The reference numbers labeled in the present embodiment may be similar to those in the first embodiment for the similar elements, but here the reference numbers may be initialed with 3 or 3'; for example, reference number 3'31 may label the object-side surface of the third lens element 3'30, reference number 3'32 may label the image-side surface of the third lens element 3'30, etc.

As shown in FIG. 14, the optical imaging lens 3' of the present embodiment, in an order from an object side A1 to an image side A2 along an optical axis, may comprise an aperture stop 3'00, a first lens element 3'10, a second lens element 3'20, a third lens element 3'30, a fourth lens element 3'40, a fifth lens element 3'50, a sixth lens element 3'60, a seventh lens element 3'70 and an eighth lens element 3'80.

The arrangement of the convex or concave surface structures, including the object-side surfaces 3'11, 3'21, 3'31, 3'41, 3'51, 3'61, and 3'71 and the image-side surfaces 3'12, 3'22, 3'32, 3'42, 3'52, 3'62, and 3'82 may be generally similar to the optical imaging lens 1', but the differences between the optical imaging lens 1' and the optical imaging lens 3' may include the concave or concave surface structures of the object-side surface 3'81 and the image-side surface 3'72. Additional differences may include a radius of curvature, a refracting power, a thickness, aspherical data, and/or an effective focal length of each lens element. More specifically, the periphery region 3722 of the image-side surface 3'72 of the seventh lens element 3'70 may be concave, and the periphery region 3812 of the object-side surface 3'81 of the eighth lens element 3'80 may be convex.

Here, in the interest of clearly showing the drawings of the present embodiment, only the surface shapes which are different from that in the first embodiment may be labeled. Please refer to FIG. 16 for the optical characteristics of each lens element in the optical imaging lens 3' of the present embodiment.

From the vertical deviation of each curve shown in FIG. 15(a), the offset of the off-axis light relative to the image point may be within about ±0.012 mm. Referring to FIG. 15(b), the focus variation with respect to the three different wavelengths (470 nm, 555 nm, 650 nm) in the whole field may fall within about ±0.035 mm. Referring to FIG. 15(c), the focus variation with respect to the three different wavelengths (470 nm, 555 nm, 650 nm) in the whole field may fall within about ±0.05 mm. Referring to FIG. 15(d), the variation of the distortion aberration of the optical imaging lens 3' may be within about ±0.14%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the tangential direction, and/or the distortion aberration in the third embodiment may be smaller. Moreover, this embodiment may be manufactured more easily and the yield rate may be higher compared to the first embodiment.

Figure 18:
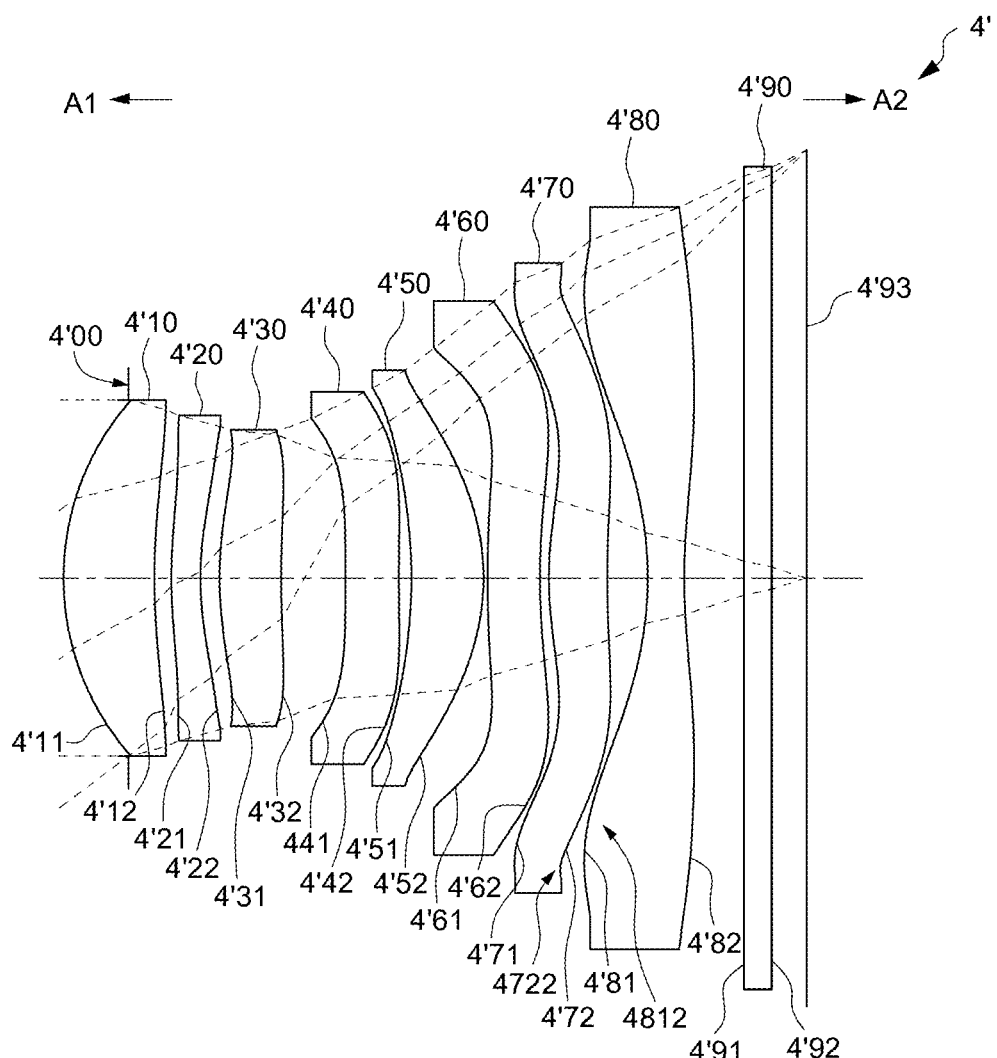
FIG. 18 depicts a cross-sectional view of another embodiment of an optical imaging lens having eight lens elements according to the present disclosure.
Figure 19:
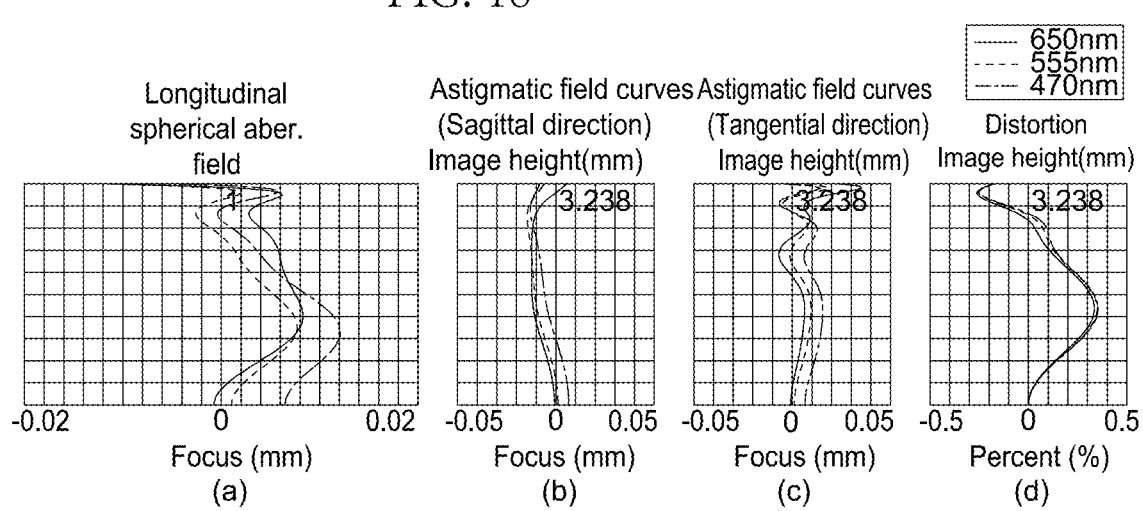
FIG. 19 depicts a chart of a longitudinal spherical aberration and other kinds of optical aberrations of another embodiment of an optical imaging lens according to the present disclosure.

Reference is now made to FIGS. 18-21. FIG. 18 illustrates an example cross-sectional view of an optical imaging lens 4' having eight lens elements according to a fourth example embodiment. FIG. 19 shows example charts of a longitudinal spherical aberration and other kinds of optical aberrations of the optical imaging lens 4' according to the fourth example embodiment. FIG. 20 shows an example table of optical data of each lens element of the optical imaging lens 4' according to the fourth example embodiment. FIG. 21 shows an example table of aspherical data of the optical imaging lens 4' according to the fourth example embodiment. The reference numbers labeled in the present embodiment may be similar to those in the first embodiment for the similar elements, but here the reference numbers may be initialed with 4 or 4'; for example, reference number 4'31 may label the object-side surface of the third lens element 4'30, reference number 4'32 may label the image-side surface of the third lens element 4'30, etc.

As shown in FIG. 18, the optical imaging lens 4' of the present embodiment, in an order from an object side A1 to an image side A2 along an optical axis, may comprise an aperture stop 4'00, a first lens element 4'10, a second lens element 4'20, a third lens element 4'30, a fourth lens element 4'40, a fifth lens element 4'50, a sixth lens element 4'60, a seventh lens element 4'70 and an eighth lens element 4'80.

The arrangement of the convex or concave surface structures, including the object-side surfaces 4'11, 4'21, 4'31, 4'41, 4'51, 4'61, and 4'71 and the image-side surfaces 4'12, 4'22, 4'32, 4'42, 4'52, 4'62, and 4'82 may be generally similar to the optical imaging lens 1', but the differences between the optical imaging lens F and the optical imaging lens 4' may include the concave or concave surface structures of the object-side surface 4'81 and the image-side surface 4'72. Additional differences may include a radius of curvature, a refracting power, a thickness, aspherical data, and/or an effective focal length of each lens element. More specifically, the periphery region 4722 of the image-side surface 4'72 of the seventh lens element 4'70 may be concave, and the periphery region 4812 of the object-side surface 4'81 of the eighth lens element 4'80 may be convex.

Here, in the interest of clearly showing the drawings of the present embodiment, only the surface shapes which are different from that in the first embodiment may be labeled. Please refer to FIG. 20 for the optical characteristics of each lens element in the optical imaging lens 4' of the present embodiment.

From the vertical deviation of each curve shown in FIG. 19(a), the offset of the off-axis light relative to the image point may be within about ±0.013 mm. Referring to FIG. 19(b), the focus variation with respect to the three different wavelengths (470 nm, 555 nm, 650 nm) in the whole field may fall within about ±0.02 mm. Referring to FIG. 19(c), the focus variation with respect to the three different wavelengths (470 nm, 555 nm, 650 nm) in the whole field may fall within about +0.035 mm. Referring to FIG. 19(d), the variation of the distortion aberration of the optical imaging lens 4' may be within about ±0.4%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, the field curvature aberration in the tangential direction, and/or the distortion aberration in the fourth embodiment may be smaller.

Figure 22:
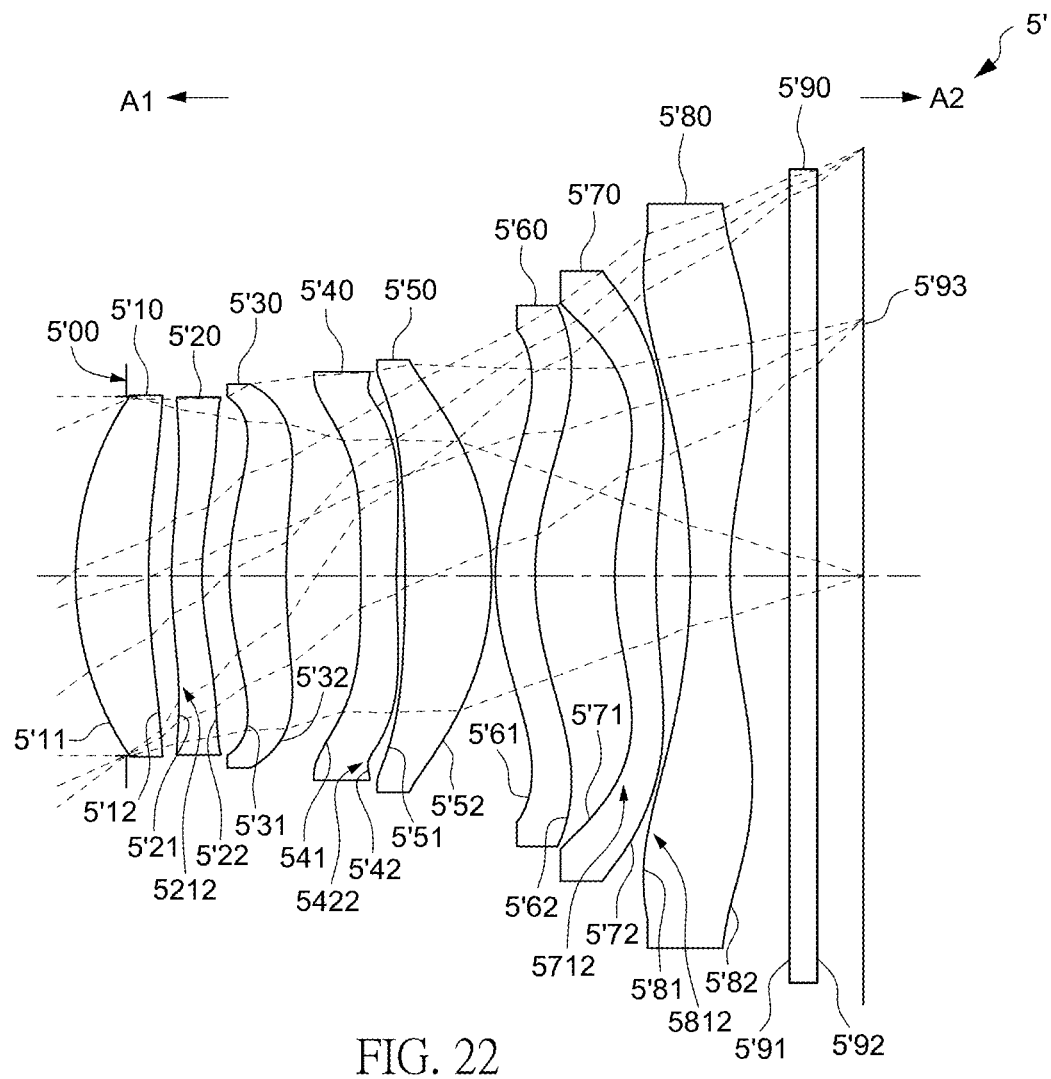
FIG. 22 depicts a cross-sectional view of another embodiment of an optical imaging lens having eight lens elements according to the present disclosure.
Figure 23:
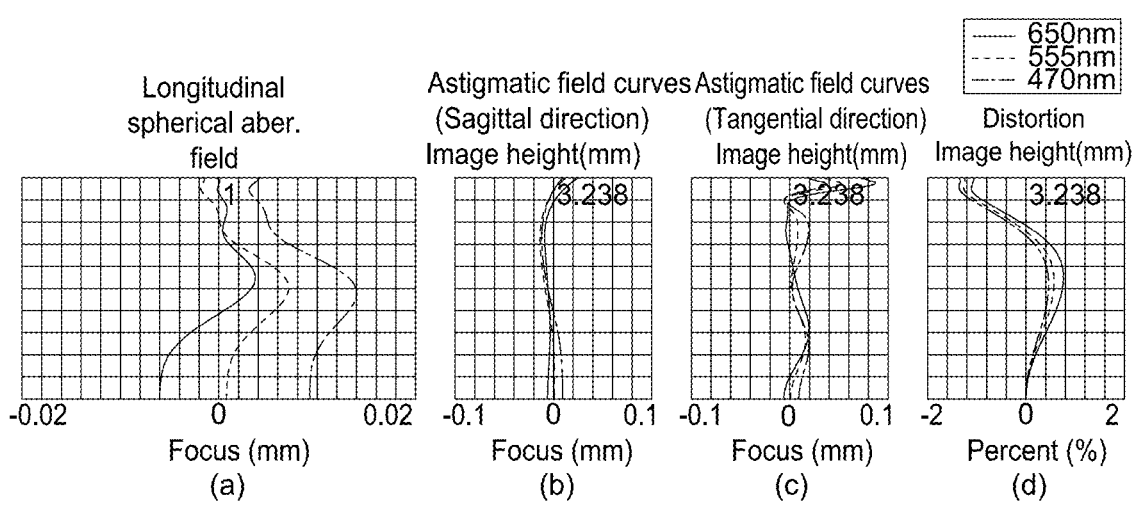
FIG. 23 depicts a chart of a longitudinal spherical aberration and other kinds of optical aberrations of another embodiment of the optical imaging lens according to the present disclosure.

Reference is now made to FIGS. 22-25. FIG. 22 illustrates an example cross-sectional view of an optical imaging lens 5' having eight lens elements according to a fifth example embodiment. FIG. 23 shows example charts of a longitudinal spherical aberration and other kinds of optical aberrations of the optical imaging lens 5' according to the fifth example embodiment. FIG. 24 shows an example table of optical data of each lens element of the optical imaging lens 5' according to the fifth example embodiment. FIG. 25 shows an example table of aspherical data of the optical imaging lens 5' according to the fifth example embodiment. The reference numbers labeled in the present embodiment may be similar to those in the first embodiment for the similar elements, but here the reference numbers may be initialed with 5 or 5'; for example, reference number 5'31 may label the object-side surface of the third lens element 5'30, reference number 5'32 may label the image-side surface of the third lens element 5'30, etc.

As shown in FIG. 22, the optical imaging lens 5' of the present embodiment, in an order from an object side A1 to an image side A2 along an optical axis, may comprise an aperture stop 5'00, a first lens element 5'10, a second lens element 5'20, a third lens element 5'30, a fourth lens element 5'40, a fifth lens element 5'50, a sixth lens element 5'60, a seventh lens element 5'70 and an eighth lens element 5'80.

The arrangement of the convex or concave surface structures, including the object-side surfaces 5'11, 5'31, 5'41, 5'51, and 5'61 and the image-side surfaces 5'12, 5'22, 5'32, 5'52, 5'62, 5'72, and 5'82 may be generally similar to the optical imaging lens 1', but the differences between the optical imaging lens 1' and the optical imaging lens 5' may include the concave or concave surface structures of the object-side surfaces 5'21, 5'71, 5'81 and the image-side surface 5'42. Additional differences may include a radius of curvature, a refracting power, a thickness, aspherical data, and/or an effective focal length of each lens element. More specifically, the sixth lens element 5'60 may have positive refracting power, the periphery region 5212 of the object-side surface 5'21 of the second lens element 5'20 may be concave, the periphery region 5422 of the image-side surface 5'42 of the fourth lens element 5'40 may be concave, the periphery region 5712 of object-side surface 5'71 of the seventh lens element 5'70 may be concave, and the periphery region 5812 of the object-side surface 5'81 of the eighth lens element 5'80 may be convex.

Here, in the interest of clearly showing the drawings of the present embodiment, only the surface shapes which are different from that in the first embodiment may be labeled. Please refer to FIG. 24 for the optical characteristics of each lens element in the optical imaging lens 5' of the present embodiment.

From the vertical deviation of each curve shown in FIG. 23(a), the offset of the off-axis light relative to the image point may be within about ±0.014 mm. Referring to FIG. 23(b), the focus variation with respect to the three different wavelengths (470 nm, 555 nm, 650 nm) in the whole field may fall within about ±0.3 mm. Referring to FIG. 23(c), the focus variation with respect to the three different wavelengths (470 nm, 555 nm, 650 nm) in the whole field may fall within about ±0.9 mm. Referring to FIG. 23(d), the variation of the distortion aberration of the optical imaging lens 5' may be within about ±0.8%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration and the distortion aberration in the fifth embodiment may be smaller. Moreover, this embodiment may be manufactured more easily and the yield rate may be higher compared to the first embodiment.

Figure 26:
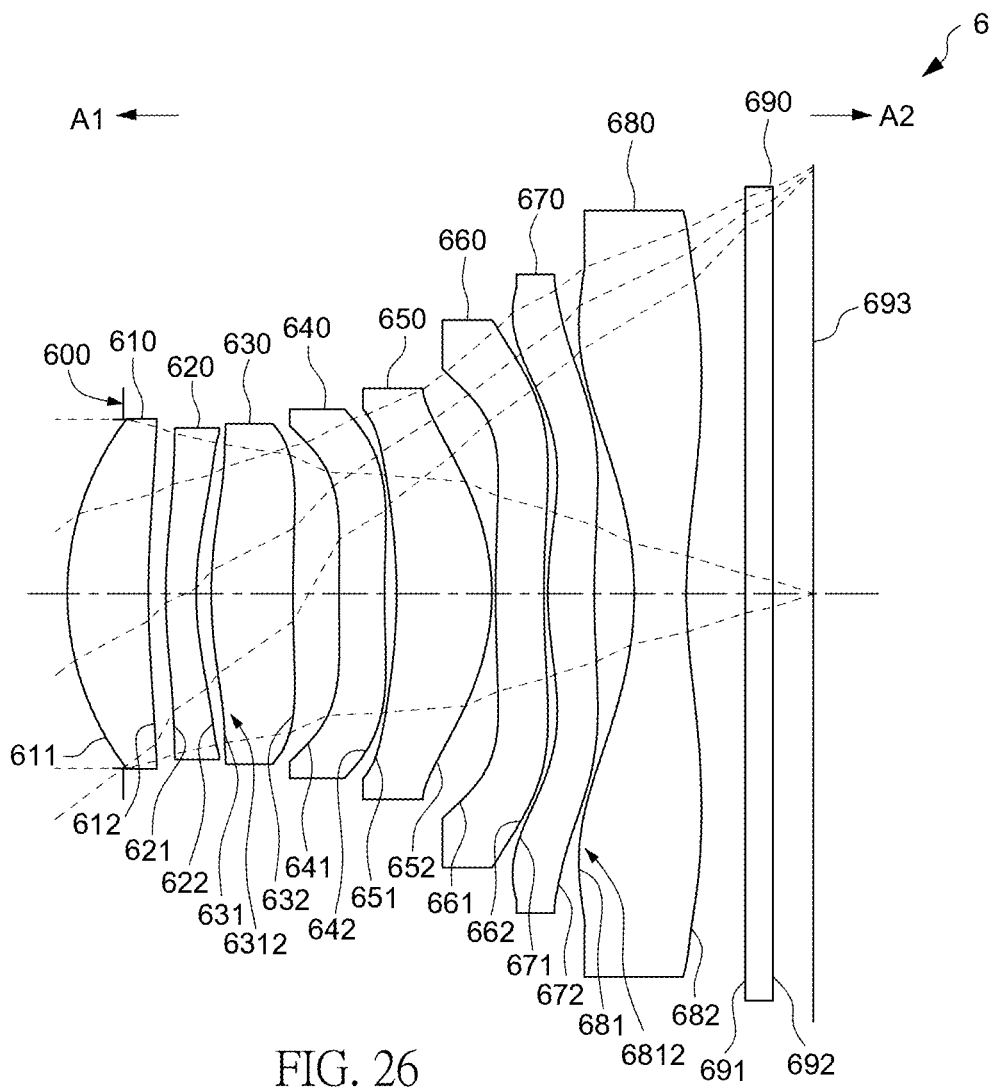
FIG. 26 depicts a cross-sectional view of another embodiment of an optical imaging lens having eight lens elements according to the present disclosure.
Figure 27:
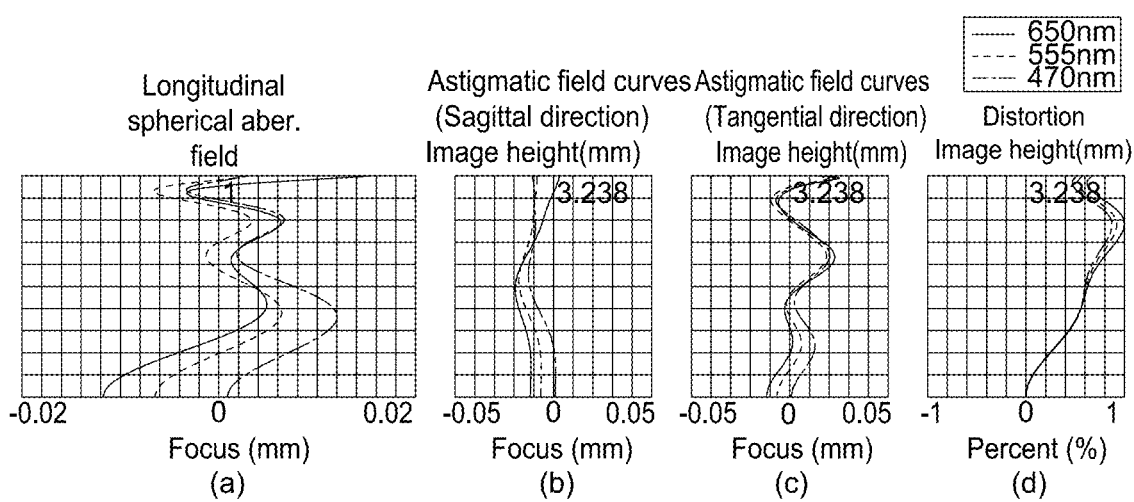
FIG. 27 depicts a chart of a longitudinal spherical aberration and other kinds of optical aberrations of another embodiment of the optical imaging lens according to the present disclosure.

Reference is now made to FIGS. 26-29. FIG. 26 illustrates an example cross-sectional view of an optical imaging lens 6 having eight lens elements according to a sixth example embodiment. FIG. 27 shows example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment may be similar to those in the first embodiment for the similar elements, but here the reference numbers may be initialed with 6; for example, reference number 631 may label the object-side surface of the third lens element 630, reference number 632 may label the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650, a sixth lens element 660, a seventh lens element 670 and an eighth lens element 680.

The arrangement of the convex or concave surface structures, including the object-side surfaces 611, 621, 641, 651, 661, and 671 and the image-side surfaces 612, 622, 632, 642, 652, 662, 672, and 682 may be generally similar to the optical imaging lens F, but the differences between the optical imaging lens F and the optical imaging lens 6 may include the concave or concave surface structures of the object-side surfaces 631, and 681. Additional differences may include a radius of curvature, a refracting power, a thickness, aspherical data, and/or an effective focal length of each lens element. More specifically, the periphery region 6312 of the object-side surface 631 of the third lens element 630 may be convex, and the periphery region 6812 of object-side surface 681 of the eighth lens element 680 may be convex.

Here, in the interest of clearly showing the drawings of the present embodiment, only the surface shapes which are different from that in the first embodiment may be labeled. Please refer to FIG. 28 for the optical characteristics of each lens element in the optical imaging lens 6 of the present embodiment.

From the vertical deviation of each curve shown in FIG. 27(a), the offset of the off-axis light relative to the image point may be within about ±0.016 mm. Referring to FIG. 27(b), the focus variation with respect to the three different wavelengths (470 nm, 555 nm, 650 nm) in the whole field may fall within about ±0.02 mm. Referring to FIG. 27(c), the focus variation with respect to the three different wavelengths (470 nm, 555 nm, 650 nm) in the whole field may fall within about ±0.03 mm. Referring to FIG. 27(d), the variation of the distortion aberration of the optical imaging lens 6 may be within about ±1%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, the field curvature aberration in the tangential direction, and/or the distortion aberration in the sixth embodiment may be smaller.

Figure 30:
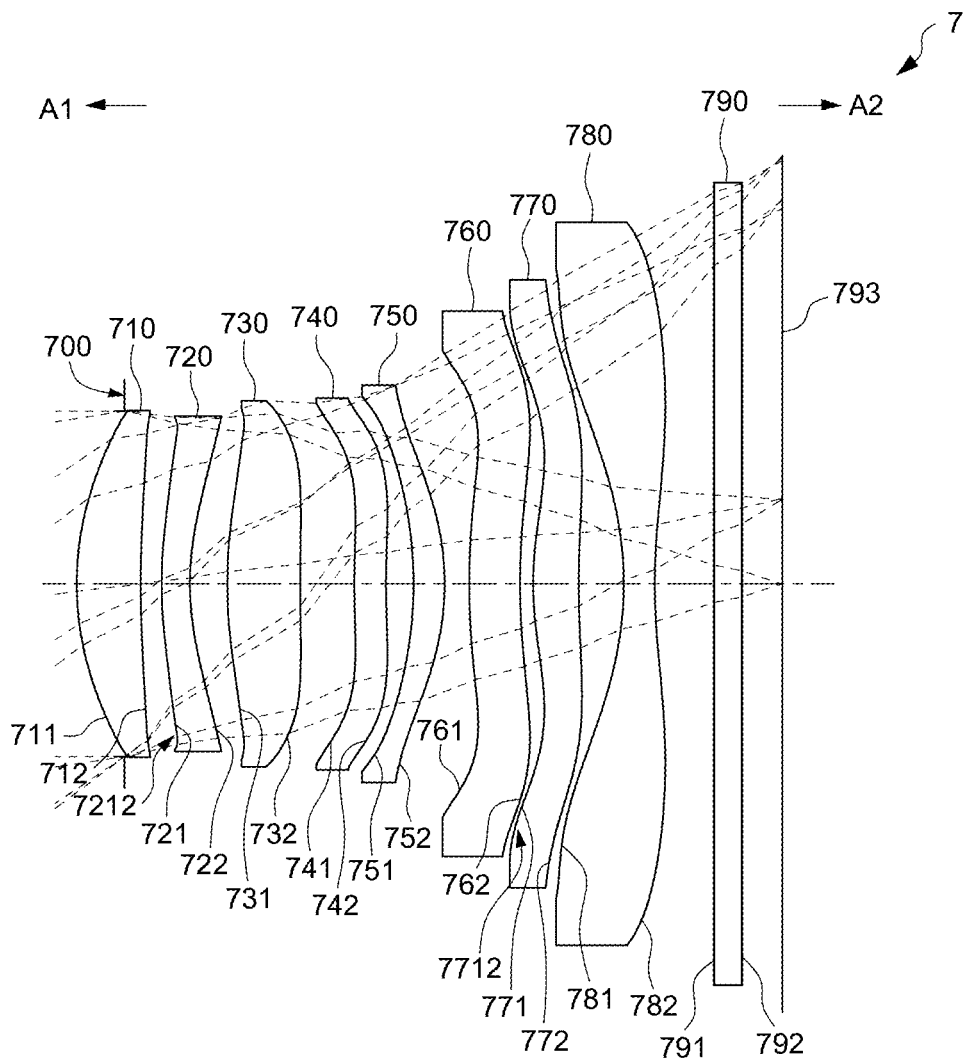
FIG. 30 depicts a cross-sectional view of another embodiment of an optical imaging lens having eight lens elements according to the present disclosure.
Figure 31:
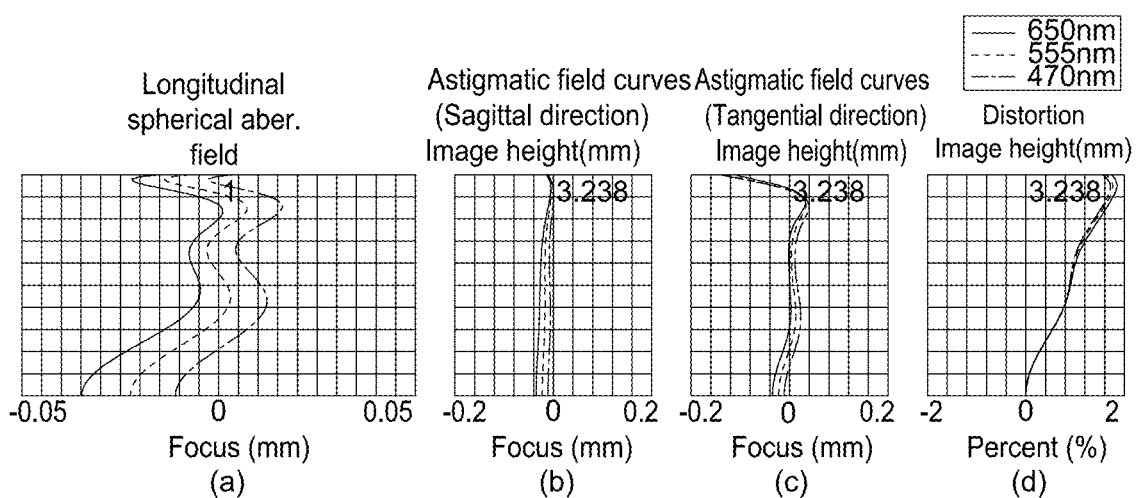
FIG. 31 depicts a chart of a longitudinal spherical aberration and other kinds of optical aberrations of another embodiment of the optical imaging lens according to the present disclosure.

Reference is now made to FIGS. 30-33. FIG. 30 illustrates an example cross-sectional view of an optical imaging lens 7 having eight lens elements according to a seventh example embodiment. FIG. 31 shows example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment may be similar to those in the first embodiment for the similar elements, but here the reference numbers may be initialed with 7; for example, reference number 731 may label the object-side surface of the third lens element 730, reference number 732 may label the image-side surface of the third lens element 730, etc.

As shown in FIG. 26, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750, a sixth lens element 760, a seventh lens element 770 and an eighth lens element 780.

The arrangement of the convex or concave surface structures, including the object-side surfaces 711, 731, 741, 751, 761, and 781 and the image-side surfaces 712, 722, 732, 742, 752, 762, 772, and 782 may be generally similar to the optical imaging lens F, but the differences between the optical imaging lens 1' and the optical imaging lens 7 may include the concave or concave surface structures of the object-side surfaces 721, and 771. Additional differences may include a radius of curvature, a refracting power, a thickness, aspherical data, and/or an effective focal length of each lens element. More specifically, the periphery region 7212 of the object-side surface 721 of the second lens element 720 may be concave, and the periphery region 7712 of object-side surface 771 of the seventh lens element 770 may be concave.

Here, in the interest of clearly showing the drawings of the present embodiment, only the surface shapes which are different from that in the first embodiment may be labeled. Please refer to FIG. 32 for the optical characteristics of each lens element in the optical imaging lens 7 of the present embodiment.

From the vertical deviation of each curve shown in FIG. 31(a), the offset of the off-axis light relative to the image point may be within about ±0.035 mm. Referring to FIG. 31(b), the focus variation with respect to the three different wavelengths (470 nm, 555 nm, 650 nm) in the whole field may fall within about ±0.04 mm. Referring to FIG. 31(c), the focus variation with respect to the three different wavelengths (470 nm, 555 nm, 650 nm) in the whole field may fall within about ±0.14 mm. Referring to FIG. 31(d), the variation of the distortion aberration of the optical imaging lens 7 may be within about ±2%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the seventh embodiment may be manufactured more easily and the yield rate may be higher.

Figure 34:
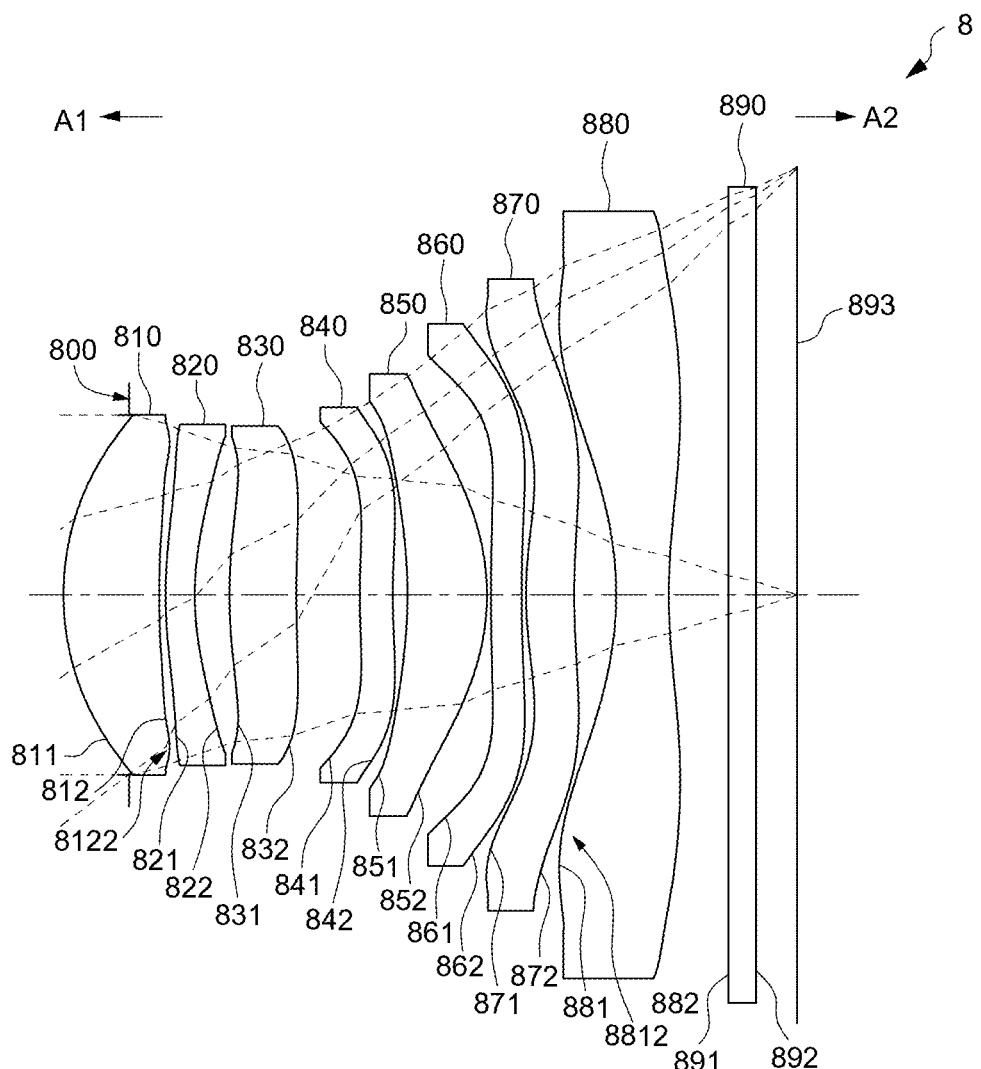
FIG. 34 depicts a cross-sectional view of another embodiment of an optical imaging lens having eight lens elements according to the present disclosure.
Figure 35:
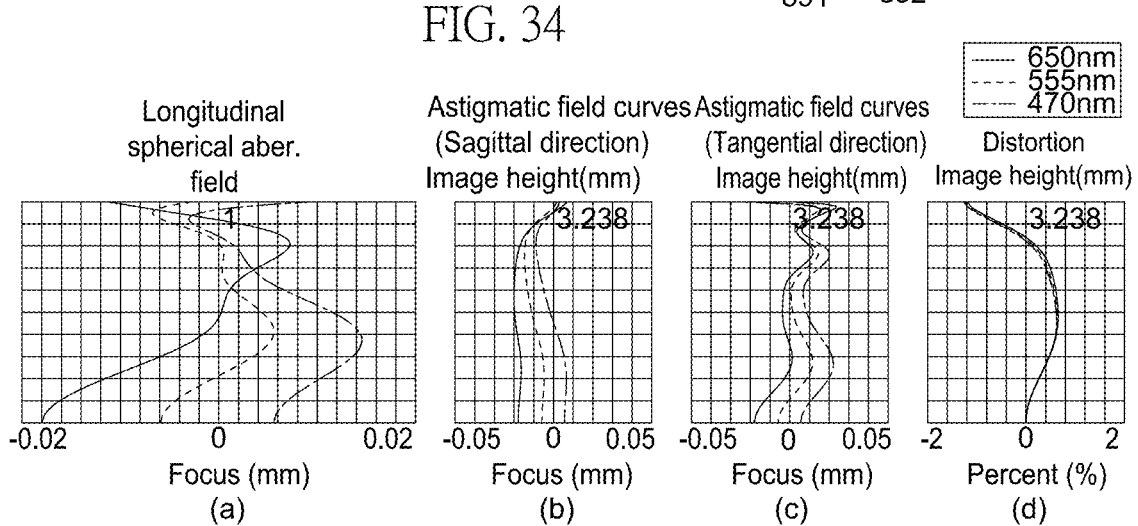
FIG. 35 depicts a chart of a longitudinal spherical aberration and other kinds of optical aberrations of another embodiment of the optical imaging lens according to the present disclosure.

Reference is now made to FIGS. 34-37. FIG. 34 illustrates an example cross-sectional view of an optical imaging lens 8 having eight lens elements according to an eighth example embodiment. FIG. 35 shows example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment may be similar to those in the first embodiment for the similar elements, but here the reference numbers may be initialed with 8; for example, reference number 831 may label the object-side surface of the third lens element 830, reference number 832 may label the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, a sixth lens element 860, a seventh lens element 870 and an eighth lens element 880.

The arrangement of the convex or concave surface structures, including the object-side surfaces 811, 821, 831, 841, 851, 861, and 871 and the image-side surfaces 822, 832, 842, 852, 862, 872, and 882 may be generally similar to the optical imaging lens 1', but the differences between the optical imaging lens 1' and the optical imaging lens 8 may include the concave or concave surface structures of the object-side surface 881, and the image-side surface 812. Additional differences may include a radius of curvature, a refracting power, a thickness, aspherical data, and/or an effective focal length of each lens element. More specifically, the periphery region 8122 of the image-side surface 812 of the first lens element 810 may be convex, and the periphery region 8812 of object-side surface 881 of the eighth lens element 880 may be convex.

Here, in the interest of clearly showing the drawings of the present embodiment, only the surface shapes which are different from that in the first embodiment may be labeled. Please refer to FIG. 36 for the optical characteristics of each lens element in the optical imaging lens 8 of the present embodiment.

From the vertical deviation of each curve shown in FIG. 35(a), the offset of the off-axis light relative to the image point may be within about ±0.018 mm. Referring to FIG. 35(b), the focus variation with respect to the three different wavelengths (470 nm, 555 nm, 650 nm) in the whole field may fall within about ±0.02 mm. Referring to FIG. 35(c), the focus variation with respect to the three different wavelengths (470 nm, 555 nm, 650 nm) in the whole field may fall within about ±0.025 mm. Referring to FIG. 35(d), the variation of the distortion aberration of the optical imaging lens 8 may be within about ±1.4%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, the field curvature aberration in the tangential direction, and/or the distortion aberration in the eighth embodiment may be smaller.

Figure 38:
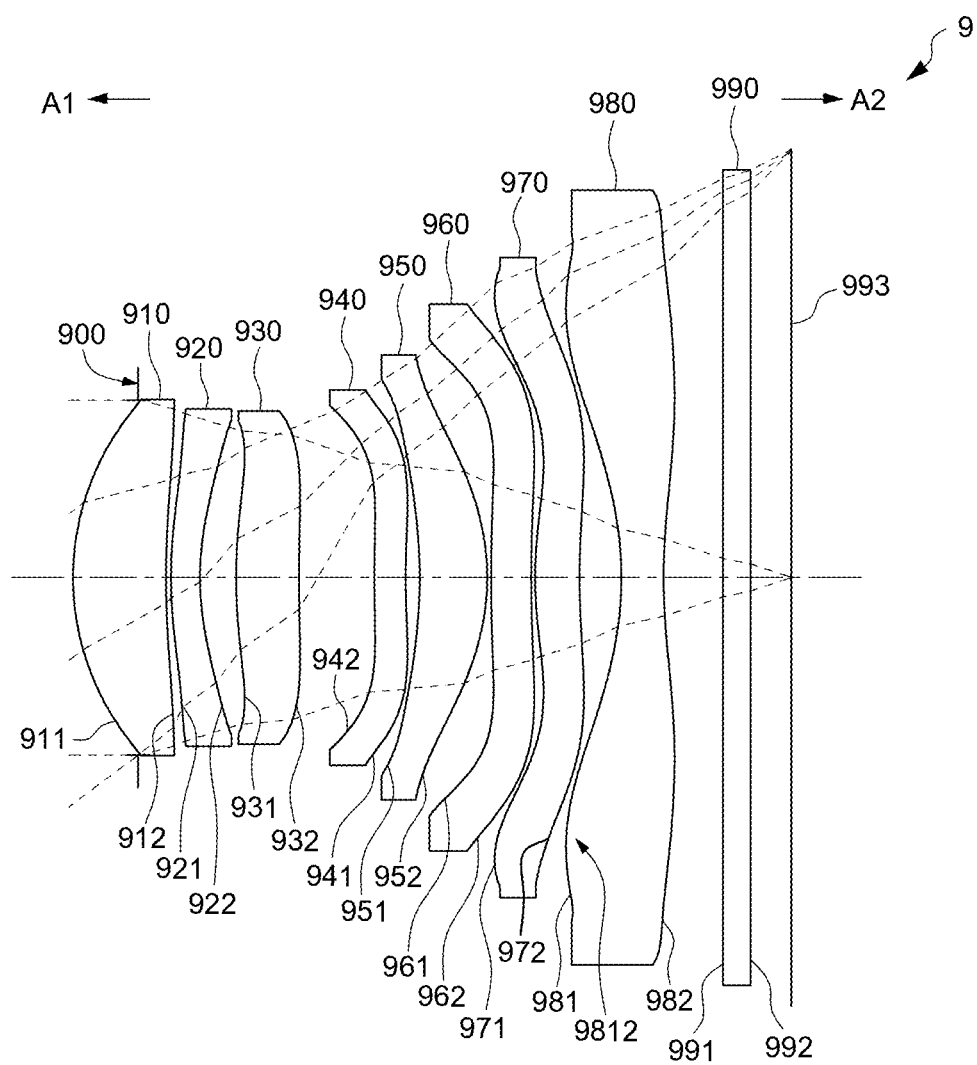
FIG. 38 depicts a cross-sectional view of another embodiment of an optical imaging lens having eight lens elements according to the present disclosure.
Figure 39:
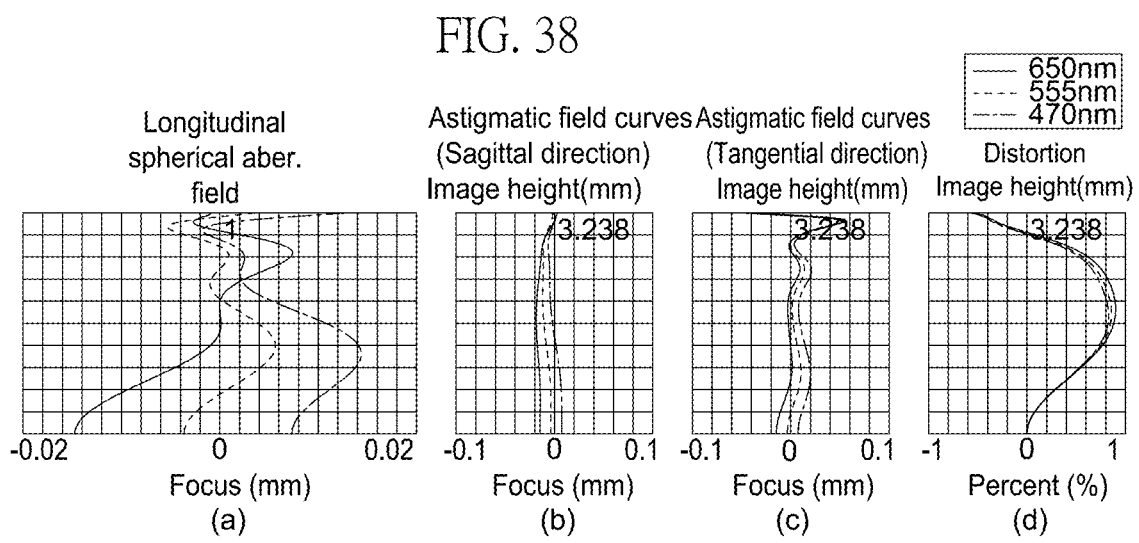
FIG. 39 depicts a chart of a longitudinal spherical aberration and other kinds of optical aberrations of another embodiment of the optical imaging lens according to the present disclosure.

Reference is now made to FIGS. 38-41. FIG. 38 illustrates an example cross-sectional view of an optical imaging lens 9 having eight lens elements according to a ninth example embodiment. FIG. 39 shows example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment may be similar to those in the first embodiment for the similar elements, but here the reference numbers may be initialed with 9; for example, reference number 931 may label the object-side surface of the third lens element 930, reference number 932 may label the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950, a sixth lens element 960, a seventh lens element 970 and an eighth lens element 980.

The arrangement of the convex or concave surface structures, including the object-side surfaces 911, 921, 931, 941, 951, 961, and 971 and the image-side surfaces 912, 922, 932, 942, 952, 962, 972, and 982 may be generally similar to the optical imaging lens F, but the differences between the optical imaging lens F and the optical imaging lens 9 may include the concave or concave surface structures of the object-side surface 981. Additional differences may include a radius of curvature, a refracting power, a thickness, aspherical data, and/or an effective focal length of each lens element. More specifically, the periphery region 9812 of the object-side surface 981 of the eighth lens element 980 may be convex.

Here, in the interest of clearly showing the drawings of the present embodiment, only the surface shapes which are different from that in the first embodiment may be labeled. Please refer to FIG. 40 for the optical characteristics of each lens element in the optical imaging lens 9 of the present embodiment.

From the vertical deviation of each curve shown in FIG. 39(a), the offset of the off-axis light relative to the image point may be within about ±0.015 mm. Referring to FIG. 39(b), the focus variation with respect to the three different wavelengths (470 nm, 555 nm, 650 nm) in the whole field may fall within about ±0.02 mm. Referring to FIG. 39(c), the focus variation with respect to the three different wavelengths (470 nm, 555 nm, 650 nm) in the whole field may fall within about ±0.06 mm. Referring to FIG. 39(d), the variation of the distortion aberration of the optical imaging lens 9 may be within about ±1%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, the field curvature aberration in the tangential direction, and/or the distortion aberration in the ninth embodiment may be smaller.

Figure 42:
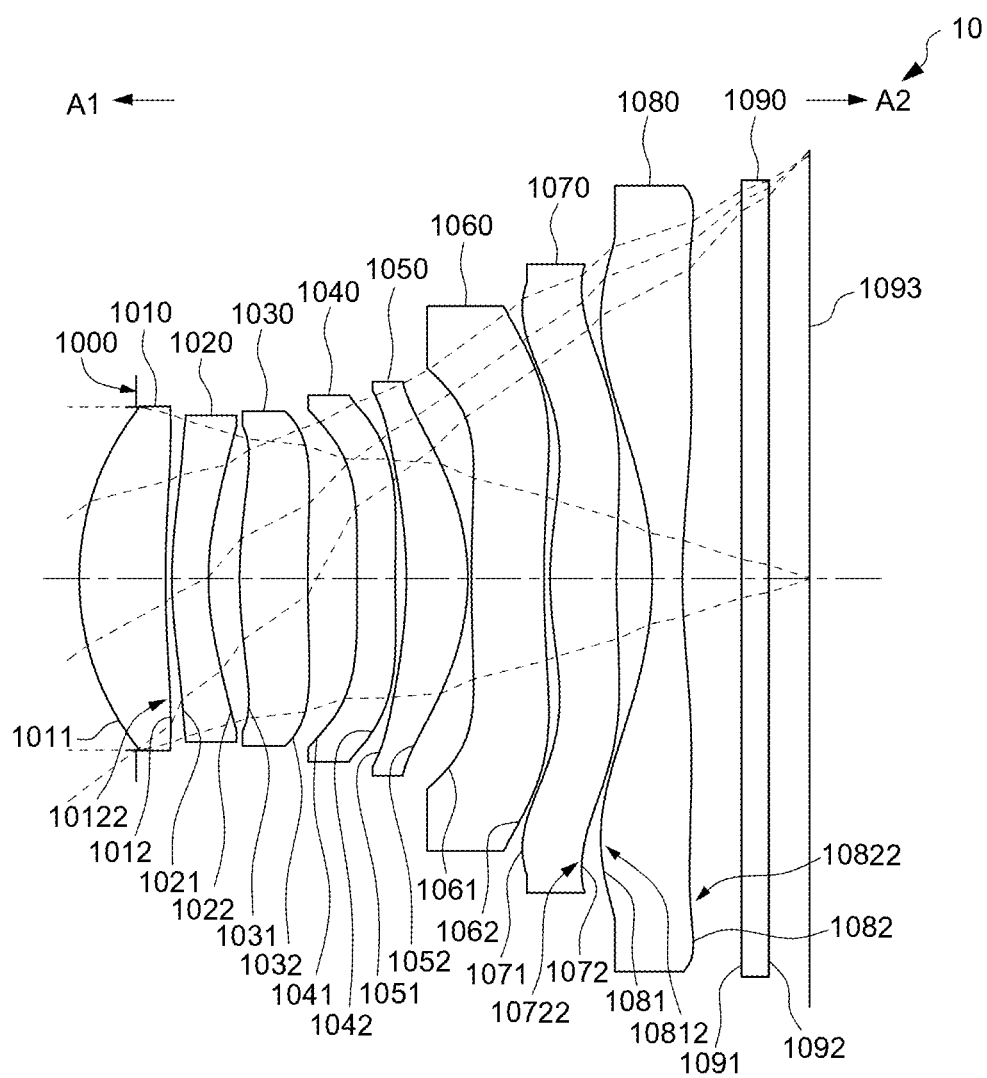
FIG. 42 depicts a cross-sectional view of another embodiment of an optical imaging lens having eight lens elements according to the present disclosure.
Figure 43:
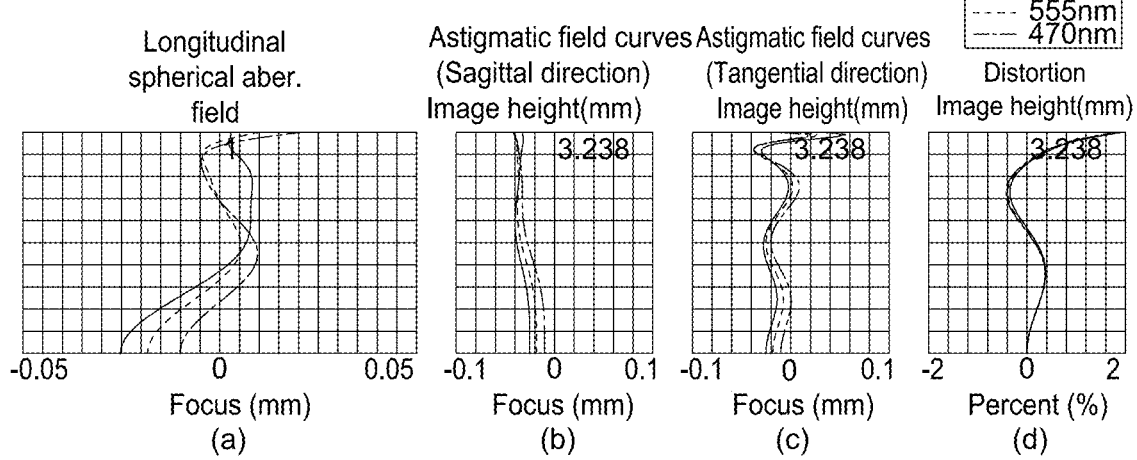
FIG. 43 depicts a chart of a longitudinal spherical aberration and other kinds of optical aberrations of another embodiment of the optical imaging lens according to the present disclosure.

Reference is now made to FIGS. 42-45. FIG. 42 illustrates an example cross-sectional view of an optical imaging lens 10 having eight lens elements according to a tenth example embodiment. FIG. 43 shows example charts of a longitudinal spherical aberration and other kinds of optical aberrations of the optical imaging lens 10 according to the tenth example embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment may be similar to those in the first embodiment for the similar elements, but here the reference numbers may be initialed with 10; for example, reference number 1031 may label the object-side surface of the third lens element 1030, reference number 1032 may label the image-side surface of the third lens element 1030, etc.

As shown in FIG. 42, the optical imaging lens 10 of the present embodiment, in an order from an object side A1 to an image side A2 along an optical axis, may comprise an aperture stop 1000, a first lens element 1010, a second lens element 1020, a third lens element 1030, a fourth lens element 1040, a fifth lens element 1050, a sixth lens element 1060, a seventh lens element 1070 and an eighth lens element 1080.

The arrangement of the convex or concave surface structures, including the object-side surfaces 1011, 1021, 1031, 1041, 1051, 1061, and 1071 and the image-side surfaces 1022, 1032, 1042, 1052, and 1062 may be generally similar to the optical imaging lens 1', but the differences between the optical imaging lens 1' and the optical imaging lens 10 may include the concave or concave surface structures of the object-side surface 1081 and the image-sides surfaces 1012, 1072, and 1082. Additional differences may include a radius of curvature, a refracting power, a thickness, aspherical data, and/or an effective focal length of each lens element. More specifically, the periphery region 10122 of the image-side surface 1012 of the first lens element 1010 may be convex, the periphery region 10722 of the image-side surface 1072 of the seventh lens element 1070 may be concave, the periphery region 10812 of the object-side surface 1081 of the eighth lens element 1080 may be convex, and the periphery region 10822 of the image-side surface 1082 of the eighth lens element 1080 may be concave.

Here, in the interest of clearly showing the drawings of the present embodiment, only the surface shapes which are different from that in the first embodiment may be labeled. Please refer to FIG. 44 for the optical characteristics of each lens element in the optical imaging lens 10 of the present embodiment.

From the vertical deviation of each curve shown in FIG. 43(a), the offset of the off-axis light relative to the image point may be within about ±0.025 mm. Referring to FIG. 43(b), the focus variation with respect to the three different wavelengths (470 nm, 555 nm, 650 nm) in the whole field may fall within about ±0.05 mm. Referring to FIG. 43(c), the focus variation with respect to the three different wavelengths (470 nm, 555 nm, 650 nm) in the whole field may fall within about ±0.06 mm. Referring to FIG. 43(d), the variation of the distortion aberration of the optical imaging lens 10 may be within about ±2%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the field curvature aberration in the tangential direction in the tenth embodiment may be smaller.

Figure 46:
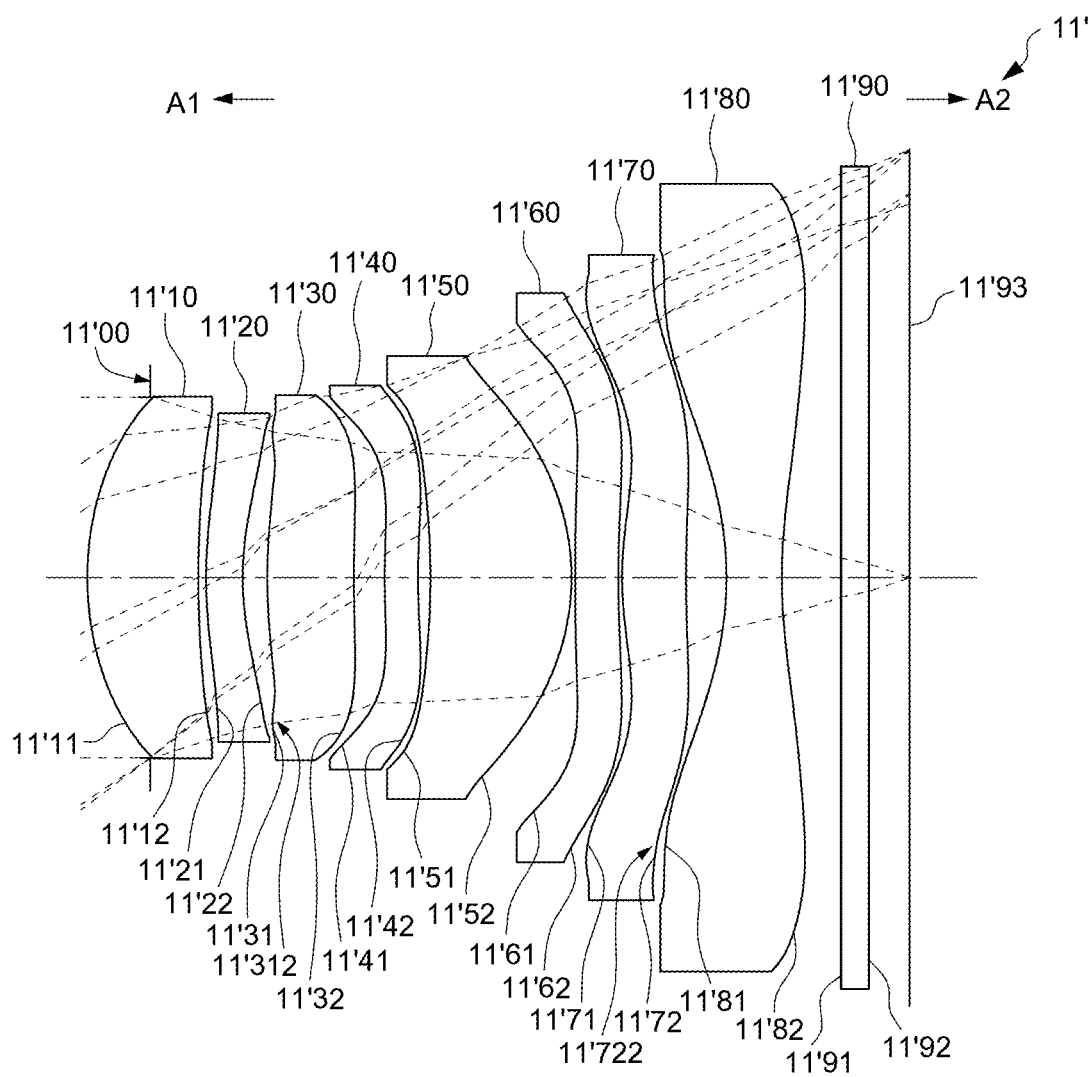
FIG. 46 depicts a cross-sectional view of another embodiment of an optical imaging lens having eight lens elements according to the present disclosure.
Figure 47:
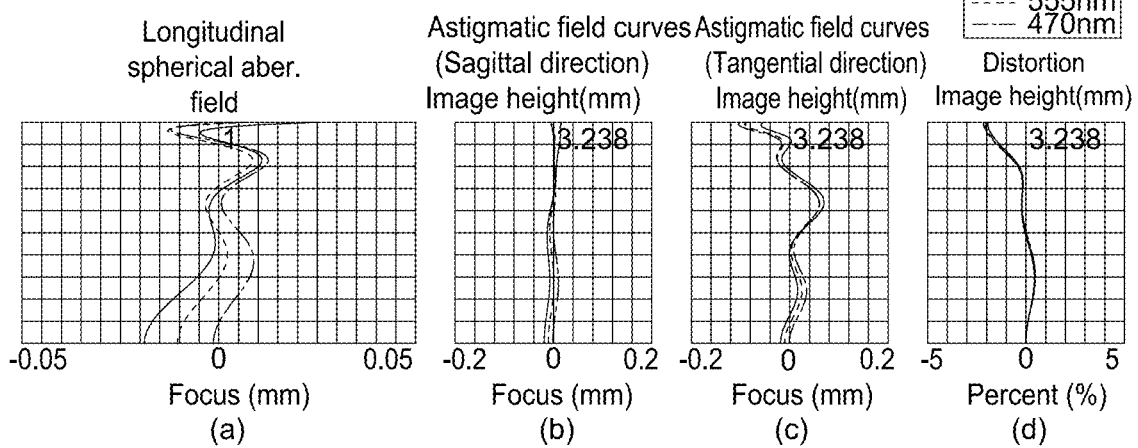
FIG. 47 depicts a chart of a longitudinal spherical aberration and other kinds of optical aberrations of another embodiment of the optical imaging lens according to the present disclosure.

Reference is now made to FIGS. 46-49. FIG. 46 illustrates an example cross-sectional view of an optical imaging lens 11' having eight lens elements according to an eleventh example embodiment. FIG. 47 shows example charts of a longitudinal spherical aberration and other kinds of optical aberrations of the optical imaging lens 11' according to the eleventh example embodiment. FIG. 48 shows an example table of optical data of each lens element of the optical imaging lens 11' according to the eleventh example embodiment. FIG. 49 shows an example table of aspherical data of the optical imaging lens 11' according to the eleventh example embodiment. The reference numbers labeled in the present embodiment may be similar to those in the first embodiment for the similar elements, but here the reference numbers may be initialed with 11'; for example, reference number 11'31 may label the object-side surface of the third lens element 11'30, reference number 11'32 may label the image-side surface of the third lens element 11'30, etc.

As shown in FIG. 46, the optical imaging lens 11' of the present embodiment, in an order from an object side A1 to an image side A2 along an optical axis, may comprise an aperture stop 11'00, a first lens element 11'10, a second lens element 11'20, a third lens element 11'30, a fourth lens element 11'40, a fifth lens element 11'50, a sixth lens element 11'60, a seventh lens element 11'70 and an eighth lens element 11'80.

The arrangement of the convex or concave surface structures, including the object-side surfaces 11'11, 11'21, 11'41, 11'51, 11'61, 11'71 and 11'81 and the image-side surfaces 11'12, 11'22, 11'32, 11'42, 11'52, 11'62 and 11'82 may be generally similar to the optical imaging lens 1', but the differences between the optical imaging lens 1' and the optical imaging lens 11' may include the concave or concave surface structures of the object-side surface 11'31 and the image-side surface 11'72. Additional differences may include a radius of curvature, a refracting power, a thickness, aspherical data, and/or an effective focal length of each lens element. More specifically, the periphery region 11'312 of the object-side surface 11'31 of the third lens element 11'30 may be convex, and the periphery region 11'722 of the image-side surface 11'72 of the seventh lens element 11'70 may be concave.

Here, in the interest of clearly showing the drawings of the present embodiment, only the surface shapes which are different from that in the first embodiment may be labeled. Please refer to FIG. 48 for the optical characteristics of each lens element in the optical imaging lens 11' of the present embodiment.

From the vertical deviation of each curve shown in FIG. 47(a), the offset of the off-axis light relative to the image point may be within about ±0.025 mm. Referring to FIG. 47(b), the focus variation with respect to the three different wavelengths (470 nm, 555 nm, 650 nm) in the whole field may fall within about ±0.02 mm. Referring to FIG. 47(c), the focus variation with respect to the three different wavelengths (470 nm, 555 nm, 650 nm) in the whole field may fall within about ±0.12 mm. Referring to FIG. 47(d), the variation of the distortion aberration of the optical imaging lens 11' may be within about ±2.5%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/

(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the field curvature aberration in the sagittal direction in the eleventh embodiment may be smaller.

Figure 50:
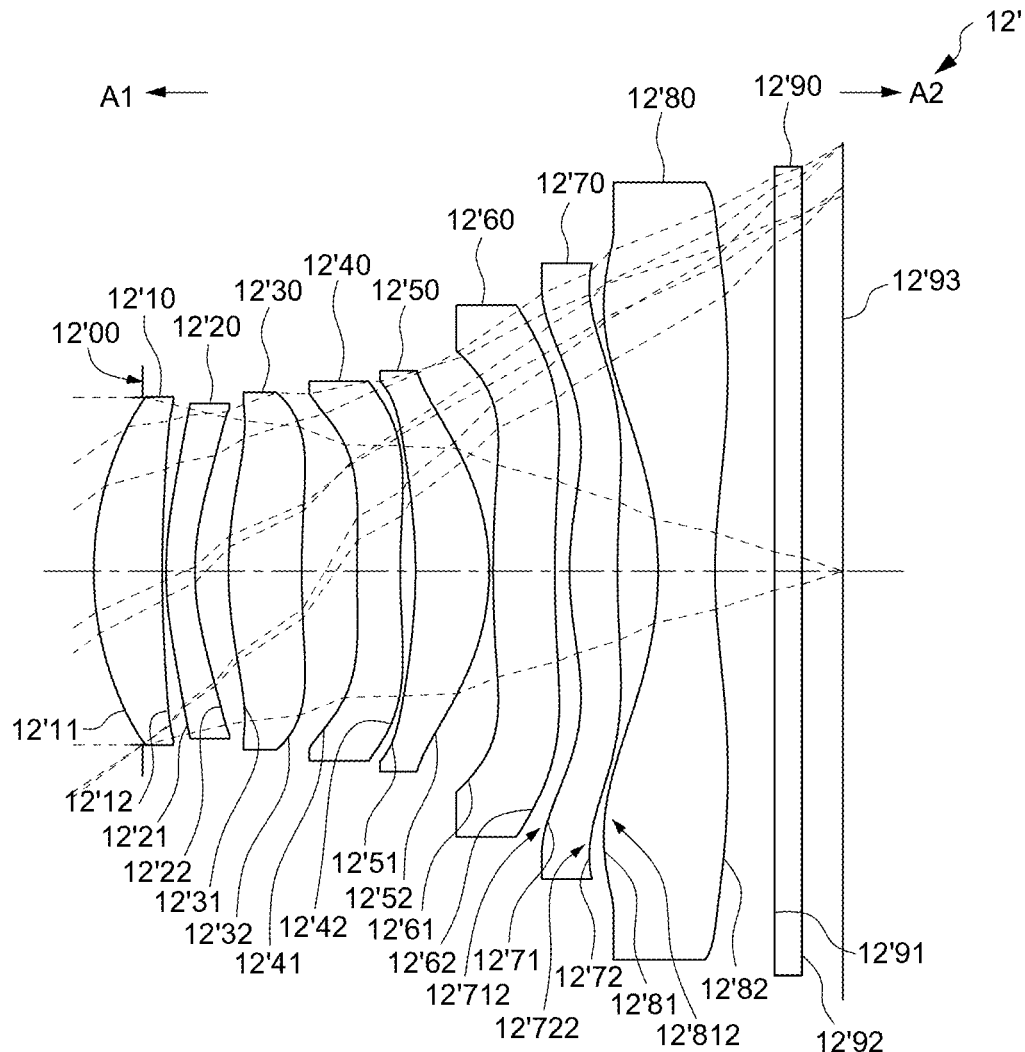
FIG. 50 depicts a cross-sectional view of another embodiment of an optical imaging lens having eight lens elements according to the present disclosure.
Figure 51:
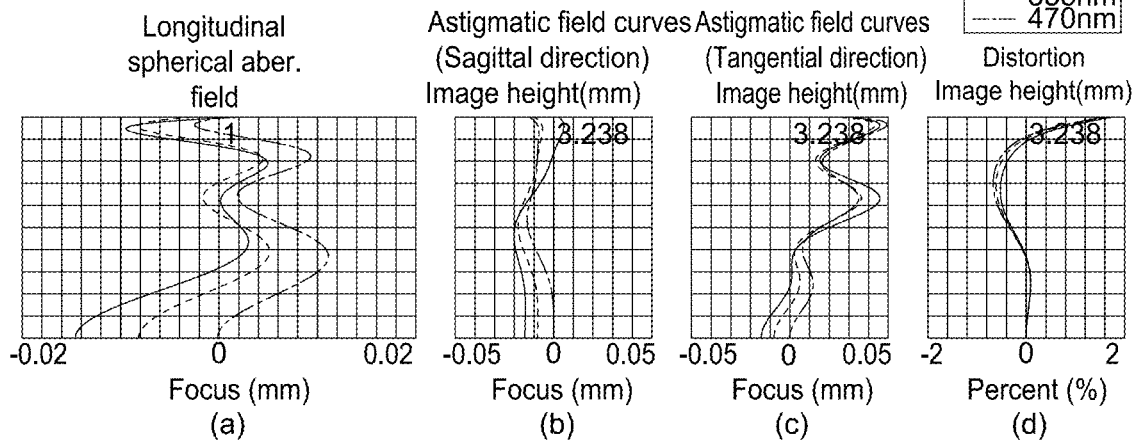
FIG. 51 depicts a chart of a longitudinal spherical aberration and other kinds of optical aberrations of another embodiment of the optical imaging lens according to the present disclosure.

Reference is now made to FIGS. 50-53. FIG. 50 illustrates an example cross-sectional view of an optical imaging lens 12' having eight lens elements according to a twelfth example embodiment. FIG. 51 shows example charts of a longitudinal spherical aberration and other kinds of optical aberrations of the optical imaging lens 12' according to the twelfth example embodiment. FIG. 52 shows an example table of optical data of each lens element of the optical imaging lens 12' according to the twelfth example embodiment. FIG. 53 shows an example table of aspherical data of the optical imaging lens 12' according to the twelfth example embodiment. The reference numbers labeled in the present embodiment may be similar to those in the first embodiment for the similar elements, but here the reference numbers may be initialed with 12'; for example, reference number 12'31 may label the object-side surface of the third lens element 12'30, reference number 12'32 may label the image-side surface of the third lens element 12'30, etc.

As shown in FIG. 50, the optical imaging lens 12' of the present embodiment, in an order from an object side A1 to an image side A2 along an optical axis, may comprise an aperture stop 12'00, a first lens element 12'10, a second lens element 12'20, a third lens element 12'30, a fourth lens element 12'40, a fifth lens element 12'50, a sixth lens element 12'60, a seventh lens element 12'70 and an eighth lens element 12'80.

The arrangement of the convex or concave surface structures, including the object-side surfaces 12'11, 12'21, 12'31, 12'41, 12'51, and 12'61 and the image-side surfaces 12'12, 12'22, 12'32, 12'42, 12'52, 12'62 and 12'82 may be generally similar to the optical imaging lens 1', but the differences between the optical imaging lens 1' and the optical imaging lens 12' may include the concave or concave surface structures of the object-side surfaces 12'71, 12'81 and the image-side surface 12'72. Additional differences may include a radius of curvature, a refracting power, a thickness, aspherical data, and/or an effective focal length of each lens element. More specifically, the periphery region 12'712 of the object-side surface 12'71 of the seventh lens element 12'70 may be concave, the periphery region 12'722 of the image-side surface 12'72 of the seventh lens element 12'70 may be concave, and the periphery region 12'812 of the object-side surface 12'81 of the eighth lens element 12'80 may be convex.

Here, in the interest of clearly showing the drawings of the present embodiment, only the surface shapes which are different from that in the first embodiment may be labeled. Please refer to FIG. 52 for the optical characteristics of each lens element in the optical imaging lens 12' of the present embodiment.

From the vertical deviation of each curve shown in FIG. 51(a), the offset of the off-axis light relative to the image point may be within about ±0.015 mm. Referring to FIG. 51(b), the focus variation with respect to the three different wavelengths (470 nm, 555 nm, 650 nm) in the whole field may fall within about ±0.02 mm. Referring to FIG. 51(c), the focus variation with respect to the three different wavelengths (470 nm, 555 nm, 650 nm) in the whole field may fall within about ±0.05 mm. Referring to FIG. 51(d), the variation of the distortion aberration of the optical imaging lens 12' may be within about ±2%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, and/or the field curvature aberration in the tangential direction in the twelfth embodiment may be smaller.

Figure 54:
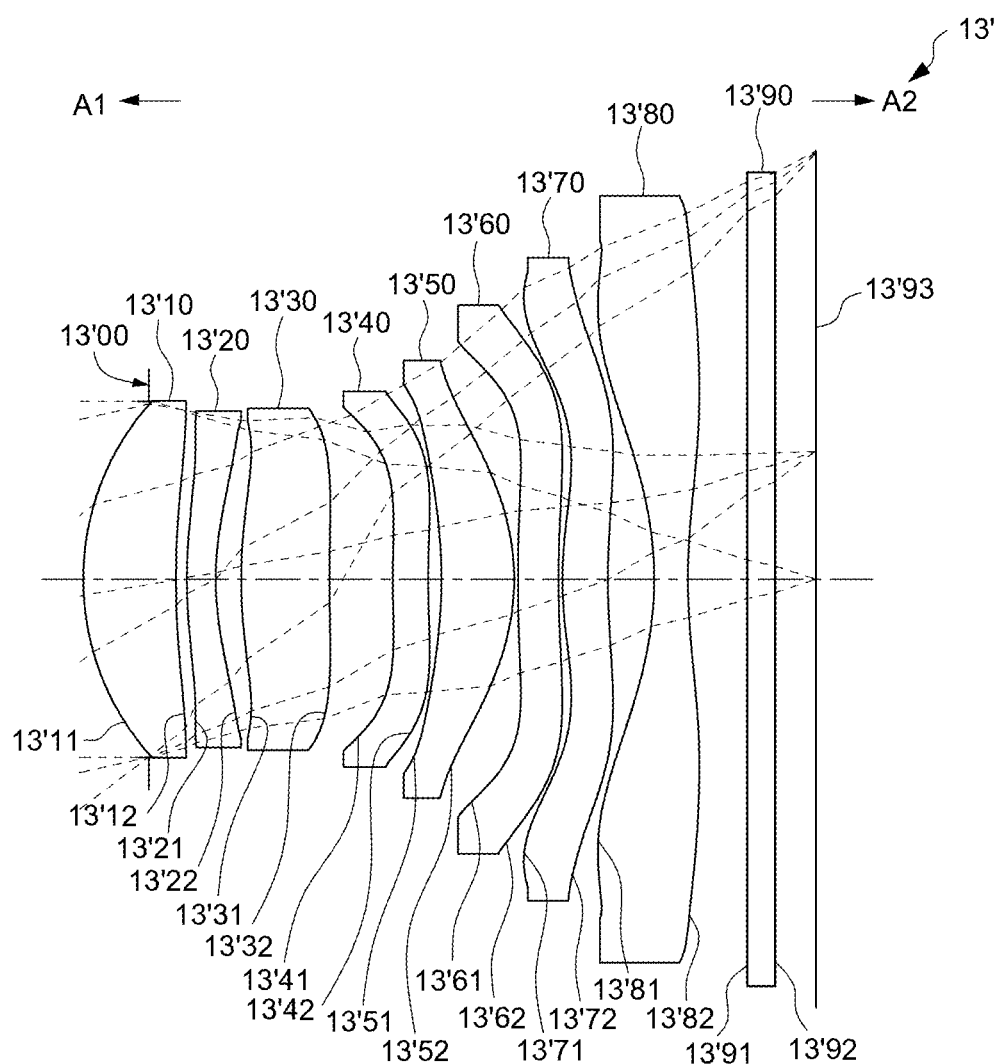
FIG. 54 depicts a cross-sectional view of another embodiment of an optical imaging lens having eight lens elements according to the present disclosure.
Figure 55:
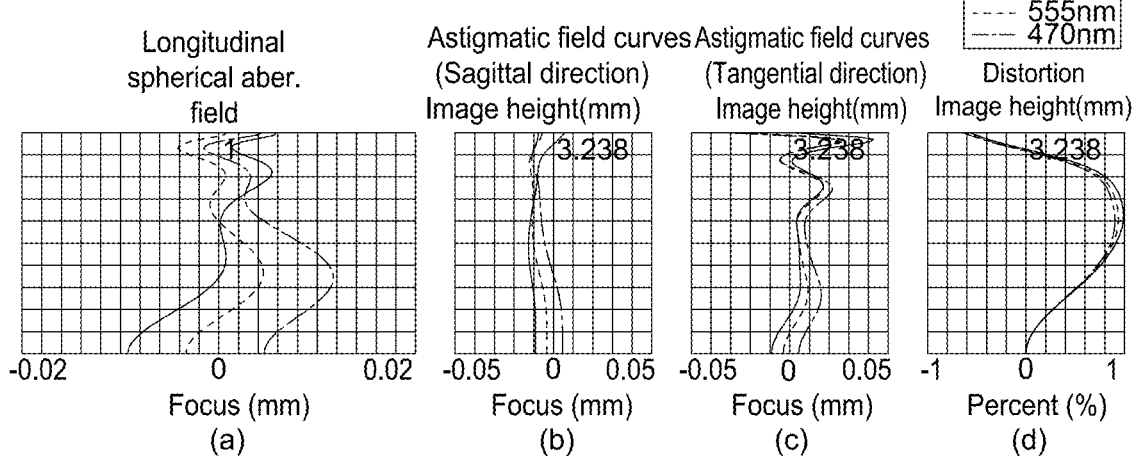
FIG. 55 depicts a chart of a longitudinal spherical aberration and other kinds of optical aberrations of another embodiment of the optical imaging lens according to the present disclosure.

Reference is now made to FIGS. 54-57. FIG. 54 illustrates an example cross-sectional view of an optical imaging lens 13' having eight lens elements according to a thirteenth example embodiment. FIG. 55 shows example charts of a longitudinal spherical aberration and other kinds of optical aberrations of the optical imaging lens 13' according to the thirteenth example embodiment. FIG. 56 shows an example table of optical data of each lens element of the optical imaging lens 13' according to the thirteenth example embodiment. FIG. 57 shows an example table of aspherical data of the optical imaging lens 13' according to the thirteenth example embodiment. The reference numbers labeled in the present embodiment may be similar to those in the first embodiment for the similar elements, but here the reference numbers may be initialed with 13'; for example, reference number 13'31 may label the object-side surface of the third lens element 13'30, reference number 13'32 may label the image-side surface of the third lens element 13'30, etc.

As shown in FIG. 54, the optical imaging lens 13' of the present embodiment, in an order from an object side A1 to an image side A2 along an optical axis, may comprise an aperture stop 13'00, a first lens element 13'10, a second lens element 13'20, a third lens element 13'30, a fourth lens element 13'40, a fifth lens element 13'50, a sixth lens element 13'60, a seventh lens element 13'70 and an eighth lens element 13'80.

The arrangement of the convex or concave surface structures, including the object-side surfaces 13'11, 13'21, 13'31, 13'41, 13'51, 13'61, 13'71 and 13'81 and the image-side surfaces 13'12, 13'22, 13'32, 13'42, 13'52, 13'62, 13'72 and 13'82 may be generally similar to the optical imaging lens 1'. Additional differences may include a radius of curvature, a refracting power, a thickness, aspherical data, and/or an effective focal length of each lens element.

Here, in the interest of clearly showing the drawings of the present embodiment, only the surface shapes which are different from that in the first embodiment may be labeled. Please refer to FIG. 56 for the optical characteristics of each lens element in the optical imaging lens 13' of the present embodiment.

From the vertical deviation of each curve shown in FIG. 55(a), the offset of the off-axis light relative to the image point may be within about ±0.012 mm. Referring to FIG. 55(b), the focus variation with respect to the three different wavelengths (470 nm, 555 nm, 650 nm) in the whole field may fall within about ±0.02 mm. Referring to FIG. 55(c), the focus variation with respect to the three different wavelengths (470 nm, 555 nm, 650 nm) in the whole field may fall within about ±0.05 mm. Referring to FIG. 55(d), the variation of the distortion aberration of the optical imaging lens 13' may be within about ±1%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration, the field curvature aberration in the sagittal direction, the field curvature aberration in the tangential direction, and/or the distortion aberration in the thirteenth embodiment may be smaller.

Figure 58:
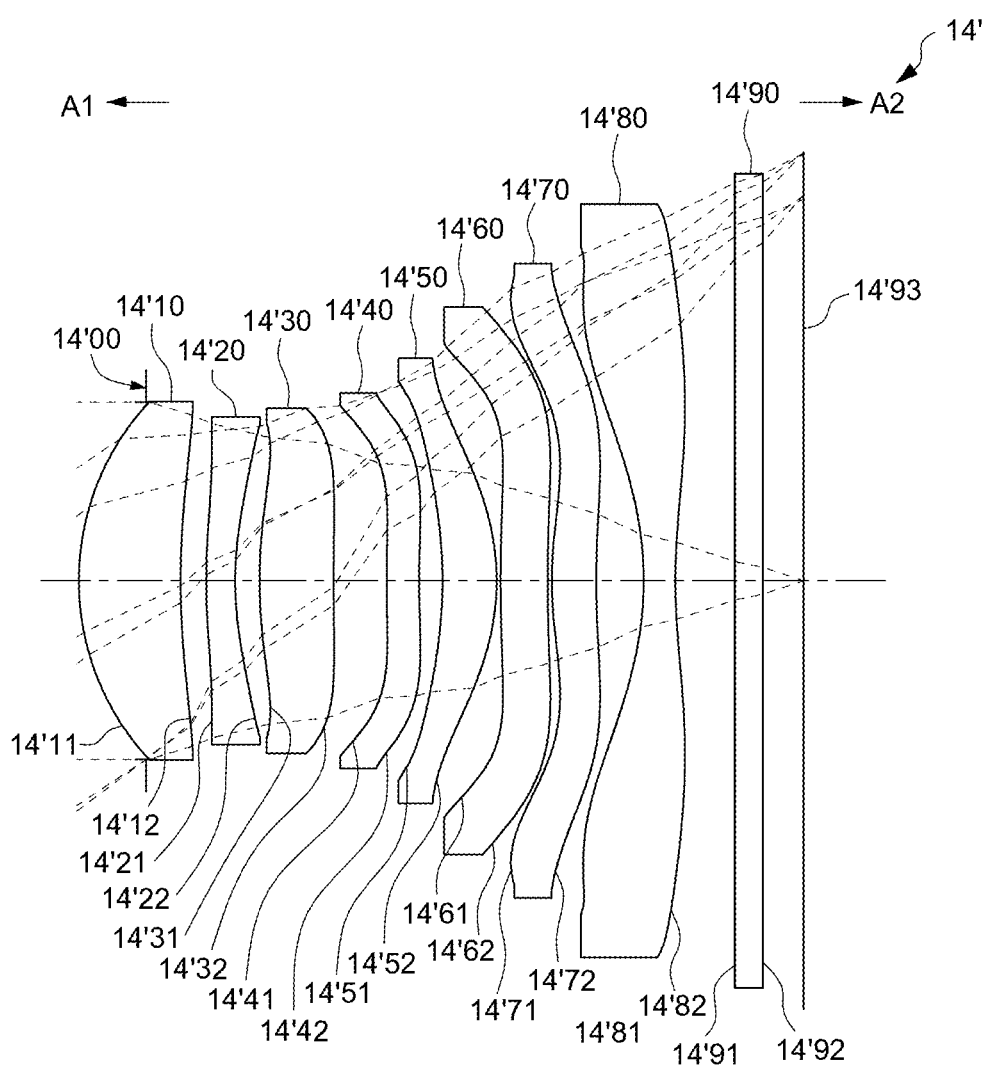
FIG. 58 depicts a cross-sectional view of another embodiment of an optical imaging lens having eight lens elements according to the present disclosure.
Figure 59:
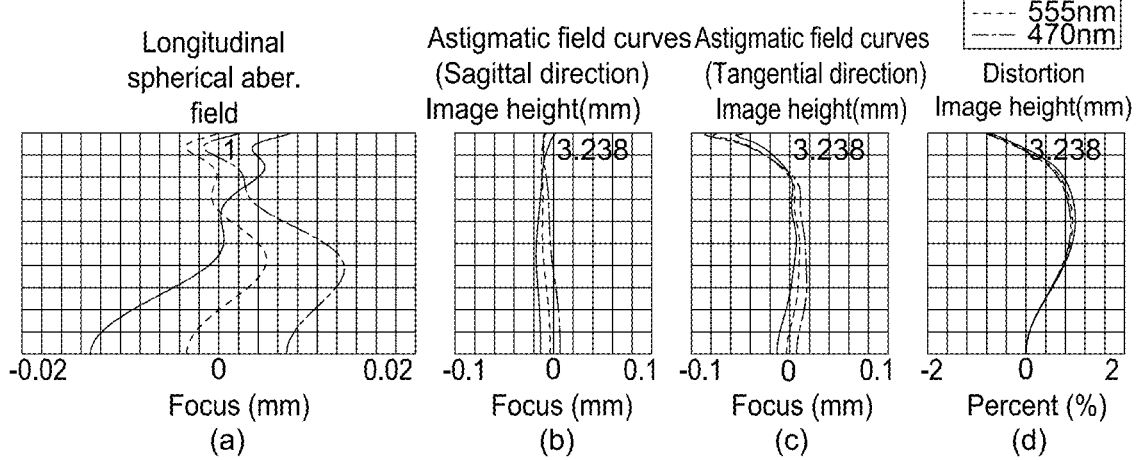
FIG. 59 depicts a chart of a longitudinal spherical aberration and other kinds of optical aberrations of another embodiment of the optical imaging lens according to the present disclosure.

Reference is now made to FIGS. 58-61. FIG. 58 illustrates an example cross-sectional view of an optical imaging lens 14' having eight lens elements according to a fourteenth example embodiment. FIG. 59 shows example charts of a longitudinal spherical aberration and other kinds of optical aberrations of the optical imaging lens 14' according to the fourteenth example embodiment. FIG. 60 shows an example table of optical data of each lens element of the optical imaging lens 14' according to the fourteenth example embodiment. FIG. 61 shows an example table of aspherical data of the optical imaging lens 14' according to the fourteenth example embodiment. The reference numbers labeled in the present embodiment may be similar to those in the first embodiment for the similar elements, but here the reference numbers may be initialed with 14'; for example, reference number 14'31 may label the object-side surface of the third lens element 14'30, reference number 14'32 may label the image-side surface of the third lens element 14'30, etc.

As shown in FIG. 58, the optical imaging lens 14' of the present embodiment, in an order from an object side A1 to an image side A2 along an optical axis, may comprise an aperture stop 14'00, a first lens element 14'10, a second lens element 14'20, a third lens element 14'30, a fourth lens element 14'40, a fifth lens element 14'50, a sixth lens element 14'60, a seventh lens element 14'70 and an eighth lens element 14'80.

The arrangement of the convex or concave surface structures, including the object-side surfaces 14'11, 14'21, 14'31, 14'41, 14'51, 14'61, 14'71 and 14'81 and the image-side surfaces 14'12, 14'22, 14'32, 14'42, 14'52, 14'62, 14'72 and 14'82 may be generally similar to the optical imaging lens 1'. Additional differences may include a radius of curvature, a refracting power, a thickness, aspherical data, and/or an effective focal length of each lens element.

Here, in the interest of clearly showing the drawings of the present embodiment, only the surface shapes which are different from that in the first embodiment may be labeled. Please refer to FIG. 60 for the optical characteristics of each lens element in the optical imaging lens 14' of the present embodiment.

From the vertical deviation of each curve shown in FIG. 59(a), the offset of the off-axis light relative to the image point may be within about ±0.014 mm. Referring to FIG. 59(b), the focus variation with respect to the three different wavelengths (470 nm, 555 nm, 650 nm) in the whole field may fall within about ±0.02 mm. Referring to FIG. 59(c), the focus variation with respect to the three different wavelengths (470 nm, 555 nm, 650 nm) in the whole field may fall within about ±0.09 mm. Referring to FIG. 59(d), the variation of the distortion aberration of the optical imaging lens 14' may be within about ±1.2%.

Please refer to FIG. 62A and FIG. 62B for the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of the present embodiment.

In comparison with the first embodiment, the longitudinal spherical aberration and/or the field curvature aberration in the sagittal direction in the fourteenth embodiment may be smaller.

Please refer to FIG. 62A and FIG. 62B which show the values of T1, G12, T2, G23, T3, G34, T4, G45, T5, G56, T6, G67, T7, G78, T8, G8F, TF, GFP, AAG, ALT, BFL, TTL, TL, EFL, ALT/(T1+G23), AAG/(T1+T5), (T7+T8)/T6, (T4+G45+T5)/G34, EFL/(T6+T7), TL/BFL, (T6+G67+T7+G78+T8)/(T1+G12+T2), (T3+G34)/(T2+G23), (T1+G12)/(T5+G56), T1/T8, TTL/ALT, AAG/(G12+G34), T1/(G12+T2), (T3+T5)/T4, (T6+T7)/T2, EFL/AAG, (G34+G45)/G23, (T1+T3)/G34 and ALT/AAG of all embodiments, and it may be clear that the optical imaging lenses of any one of the fourteen embodiments may satisfy the Equations (1)-(19).

The optical imaging lens in each embodiment of the present disclosure with the arrangements of the convex or concave surface structures described below may advantageously decrease the value of Fno: the optical axis region of the image-side surface of the first lens element may be concave; the periphery region of the object-side surface of the fifth lens element may be concave; the optical axis region of the image-side surface of the fifth lens element may be convex; the optical axis region the image-side surface of the sixth lens element may be concave; the optical axis region of the image-side surface of the seventh lens element may be concave. This may advantageously adjust longitudinal spherical aberrations and field curvature aberration, and reduce the distortion aberration. Moreover, the second lens element having negative refracting power may advantageously increase the field of view.

To achieve a shortened length of lens system while maintaining image quality, values of the air gap between lens elements or the thickness of each lens element may be shortened appropriately. To improve ease of manufacturing the optical imaging lens, an optical imaging lens of the present disclosure may also satisfy one or more of the inequalities below.

In some embodiment, an optical imaging lens may satisfy ALT/(T1+G23)≤5.000; a preferable range may be 2.600≤ALT/(T1+G23)≤5.000. In some embodiment, an optical imaging lens may satisfy AAG/(T1+T5)≤2.500; a preferable range may be 0.400≤AAG/(T1+T5)≤2.500. In some embodiment, an optical imaging lens may satisfy (T7+T8)/T6≤3.300; a preferable range may be 1.200≤(T7+T8)/T6≤3.300. In some embodiment, an optical imaging lens may satisfy (T4+G45+T5)/G34≥1.500; a preferable range may be 6.200≥(T4+G45+T5)/G34≥1.500. In some embodiment, an optical imaging lens may satisfy EFL/(T6+T7)≥3.900; a preferable range may be 8.000≥EFL/(T6+T7)≥3.900. In some embodiment, an optical imaging lens may satisfy TL/BFL≤5.500; a preferable range may be 4.400≤TL/BFL≤5.500. In some embodiment, an optical imaging lens may satisfy (T6+G67+T7+G78+T8)/(T1+G12+T2)≤2.200; a preferable range may be 1.000≤(T6+G67+T7+G78+T8)/(T1+G12+T2)≤2.200. In some embodiment, an optical imaging lens may satisfy (T3+G34)/(T2+G23)≤2.800; a preferable range may be 1.600≤(T3+G34)/(T2+G23)≤2.800. In some embodiment, an optical imaging lens may satisfy $(T1+G12)/(T5+G56) \leq 2.200$ a preferable range may be $0.700 \leq (T1+G12)/(T5+G56) \leq 2.200$. In some embodiment, an optical imaging lens may satisfy $T1/T8 \geq 1.200$; a preferable range may be $3.300 \geq T1/T8 \geq 1.200$. In some embodiment, an optical imaging lens may satisfy $TTL/ALT \leq 2.200$; a preferable range may be $1.300 \leq TTL/ALT \leq 2.200$. In some embodiment, an optical imaging lens may satisfy $AAG/(G12+G34) \geq 2.000$; a preferable range may be $3.300 \geq AAG/(G12+G34) \geq 2.000$. In some embodiment, an optical imaging lens may satisfy $T1/(G12+T2) \geq 1.300$; a preferable range may be $2.800 \geq T1/(G12+T2) \geq 1.300$. In some embodiment, an optical imaging lens may satisfy $(T3+T5)/T4 \geq 2.500$; a preferable range may be $7.000 \geq (T3+T5)/T4 \geq 2.500$. In some embodiment, an optical imaging lens may satisfy $(T6+T7)/T2 \leq 3.800$; a preferable range may be $2.300 \leq (T6+T7)/T2 \leq 3.800$. In some embodiment, an optical imaging lens may satisfy $EFL/AAG \geq 2.200$; a preferable range may be $4.700 \geq EFL/AAG \geq 2.200$. In some embodiment, an optical imaging lens may satisfy $(G34+G45)/G23 \leq 4.000$; a preferable range may be $1.600 \leq (G34+G45)/G23 \leq 4.000$. In some embodiment, an optical imaging lens may satisfy $(T1+T3)/G34 \geq 1.500$; a preferable range may be $6.500 \geq (T1+T3)/G34 \geq 1.500$. In some embodiment, an optical imaging lens may satisfy $ALT/AAG \geq 1.600$; a preferable range may be $4.700 \geq ALT/AAG \geq 1.600$.

Any one of the aforementioned inequalities may be selectively incorporated in other inequalities to apply to the present embodiments, and as such are not limiting.

According to above disclosure, the longitudinal spherical aberration, the field curvature aberration and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the 470 nm, 555 nm and 650 nm wavelengths may indicate that focusing ability and inhibiting ability for dispersion may be provided for different wavelengths.

In consideration of the non-predictability of the optical lens assembly, while the optical lens assembly may satisfy any one of inequalities described above, the optical lens assembly herein according to the disclosure may achieve a shortened length and smaller spherical aberration, field curvature aberration, and/or distortion aberration, provide an enlarged field of view, increase an imaging quality and/or assembly yield, and/or effectively improve drawbacks of a typical optical lens assembly.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through as well as an image-side surface facing toward the image side and allowing the imaging rays to pass through, the optical imaging lens comprises no other lens elements having refracting power beyond the first, second, third, fourth, fifth, sixth, seventh and eighth lens elements wherein:

an optical axis region of the image-side surface of the first lens element is concave;

the second lens element has negative refracting power;

a periphery region of the object-side surface of the fifth lens element is concave;

an optical axis region of the image-side surface of the fifth lens element is convex;

an optical axis region of the image-side surface of the sixth lens element is concave;

an optical axis region of the image-side surface of the seventh lens element is concave;

materials of the third lens element, the fourth lens element, and the eighth lens element are plastic;

a distance from the object-side surface of the first lens element to the image-side surface of the eighth lens element along the optical axis is represented by TL;

a distance from the image-side surface of the eighth lens element to an image plane along the optical axis is represented by BFL; and the optical imaging lens further satisfies an inequality: $TL/BFL \leq 5.500$.

2. The optical imaging lens according to claim 1, wherein a sum of thicknesses of the eight lens elements from the first lens element to the eighth lens element along the optical axis is represented by ALT, a thickness of the first lens element along the optical axis is represented by T1, a distance between the image-side surface of the second lens element and the object-side surface of the third lens element along the optical axis is represented by G23, and the optical imaging lens further satisfies an inequality: $ALT/(T1+G23) \leq 5.000$.

3. The optical imaging lens according to claim 1, wherein a sum of seven air gaps from the first lens element to the eighth lens elements along the optical axis is represented by MG, a thickness of the first lens element along the optical axis is represented by T1, a thickness of the fifth lens element along the optical axis is represented by T5, and the optical imaging lens further satisfies an inequality: AAG/(T1+T5)≤2.500.

4. The optical imaging lens according to claim 1, wherein a thickness of the sixth lens element along the optical axis is represented by T6, a thickness of the seventh lens element along the optical axis is represented by T7, a thickness of the eighth lens element along the optical axis is represented by T8, and the optical imaging lens further satisfies an inequality: (T7+T8)/T6≤3.300.

5. The optical imaging lens according to claim 1, wherein a thickness of the fourth lens element along the optical axis is represented by T4, a distance between the image-side surface of the fourth lens element and the object-side surface of the fifth lens element along the optical axis is represented by G45, a thickness of the fifth lens element along the optical axis is represented by T5, a distance between the image-side surface of the third lens element and the object-side surface of the fourth lens element along the optical axis is represented by G34, and the optical imaging lens further satisfies an inequality: (T4+G45+T5)/G34≥1.500.

6. The optical imaging lens according to claim 1, wherein an effective focal length of the optical imaging lens is represented by EFL, a thickness of the sixth lens element along the optical axis is represented by T6, a thickness of the seventh lens element along the optical axis is represented by T7, and the optical imaging lens further satisfies an inequality: EFL/(T6+T7)≥3.900.

7. The optical imaging lens according to claim 1, wherein a thickness of the sixth lens element along the optical axis is represented by T6, a distance between the image-side surface of the sixth lens element and the object-side surface of the seventh lens element along the optical axis is represented by G67, a thickness of the seventh lens element along the optical axis is represented by T7, a distance between the image-side surface of the seventh lens element and the object-side surface of the eighth lens element along the optical axisis represented by G78, a thickness of the eighth lens element along the optical axis is represented by T8, a thickness of the first lens element along the optical axis is represented by T1, a distance between the image-side surface of the first lens element and the object-side surface of the second lens element along the optical axis is represented by G12, a thickness of the second lens element along the optical axis is represented by T2, and the optical imaging lens further satisfies an inequality: (T6+G67+T7+G78+T8)/(T1+G12+T2)≤2.200.

8. The optical imaging lens according to claim 1, wherein a thickness of the third lens element along the optical axis is represented by T3, a distance between the image-side surface of the third lens element and the object-side surface of the fourth lens element along the optical axis is represented by G34, a thickness of the second lens element along the optical axis is represented by T2, a distance between the image-side surface of the second lens element and the object-side surface of the third lens element along the optical axis is represented by G23, and the optical imaging lens further satisfies an inequality: (T3+G34)/(T2+G23)≤2.800.

9. The optical imaging lens according to claim 1, wherein a thickness of the first lens element along the optical axis is represented by T1, a distance between the image-side surface of the first lens element and the object-side surface of the second lens element along the optical axis is represented by G12, a thickness of the fifth lens element along the optical axis is represented by T5, a distance between the image-side surface of the fifth lens element and the object-side surface of the sixth lens element along the optical axis is represented by G56, and the optical imaging lens further satisfies an inequality: (T1+G12)/(T5+G56)≤2.200.

10. The optical imaging lens according to claim 1, wherein a thickness of the first lens element along the optical axis is represented by T1, a thickness of the eighth lens element along the optical axis is represented by T8, and the optical imaging lens further satisfies an inequality: T1/T8≥1.200.

11. The optical imaging lens according to claim 1, wherein a distance from the object-side surface of the first lens element to an image plane along the optical axis is represented by TTL, a sum of thicknesses of the eight lens elements from the first lens element to the eighth lens element along the optical axis is represented by ALT, and the optical imaging lens further satisfies an inequality: TTL/ALT≤2.200.

12. The optical imaging lens according to claim 1, wherein a sum of seven air gaps from the first lens element to the eighth lens elements along the optical axis is represented by MG, a distance between the image-side surface of the first lens element and the object-side surface of the second lens element along the optical axis is represented by G12, a distance between the image-side surface of the third lens element and the object-side surface of the fourth lens element along the optical axis is represented by G34, and the optical imaging lens further satisfies an inequality: AAG/(G12+G34)≥2.000.

13. The optical imaging lens according to claim 1, wherein a thickness of the first lens element along the optical axis is represented by T1, a distance between the image-side surface of the first lens element and the object-side surface of the second lens element along the optical axis is represented by G12, a thickness of the second lens element along the optical axis is represented by T2, and the optical imaging lens further satisfies an inequality: T1/(G12+T2)≥1.300.

14. The optical imaging lens according to claim 1, wherein a thickness of the third lens element along the optical axis is represented by T3, a thickness of the fifth lens element along the optical axis is represented by T5, a thickness of the fourth lens element along the optical axis is represented by T4, and the optical imaging lens further satisfies an inequality: (T3+T5)/T4≥2.500.

15. The optical imaging lens according to claim 1, wherein a thickness of the sixth lens element along the optical axis is represented by T6, a thickness of the seventh lens element along the optical axis is represented by T7, a thickness of the second lens element along the optical axis is represented by T2, and the optical imaging lens further satisfies an inequality: (T6+T7)/T2≤3.800.

16. The optical imaging lens according to claim 1, wherein an effective focal length of the optical imaging lens is represented by EFL, a sum of seven air gaps from the first lens element to the eighth lens elements along the optical axis is represented by MG, and the optical imaging lens further satisfies an inequality: EFL/AAG≥2.200.

17. The optical imaging lens according to claim 1, wherein a distance between the image-side surface of the third lens element and the object-side surface of the fourth lens element along the optical axis is represented by G34, a distance between the image-side surface of the fourth lens element and the object-side surface of the fifth lens element along the optical axis is represented by G45, a distance between the image-side surface of the second lens element and the object-side surface of the third lens element along the optical axis is represented by G23, and the optical imaging lens further satisfies an inequality: (G34+G45)/G23≤4.000.

18. The optical imaging lens according to claim 1, wherein a thickness of the first lens element along the optical axis is represented by T1, a thickness of the third lens element along the optical axis is represented by T3, a distance between the image-side surface of the third lens element and the object-side surface of the fourth lens element along the optical axisis represented by G34, and the optical imaging lens further satisfies an inequality: (T1+T3)/G34≥1.500.

19. The optical imaging lens according to claim 1, wherein a sum of thicknesses of the eight lens elements from the first lens element to the eighth lens element along the optical axis is represented by ALT, a sum of seven air gaps from the first lens element to the eighth lens elements along the optical axis is represented by MG, and the optical imaging lens further satisfies an inequality: ALT/AAG≥1.600.

20. An optical imaging lens comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through as well as an image-side surface facing toward the image side and allowing the imaging rays to pass through, the optical imaging lens comprises no other lens elements having refracting power beyond the first, second, third, fourth, fifth, sixth, seventh and eighth lens elements wherein:
- the image-side surface of the first lens element is concave from an optical axis region to a periphery region without a transition point;
- the second lens element has negative refracting power;
- a periphery region of the object-side surface of the fifth lens element is concave;
- an optical axis region of the image-side surface of the fifth lens element is convex;
- an optical axis region of the image-side surface of the sixth lens element is concave;
- an optical axis region of the image-side surface of the seventh lens element is concave; and
- materials of the third lens element, the fourth lens element, and the eighth lens element are plastic.

* * * * *